(12) United States Patent
Singer

(10) Patent No.: US 11,375,844 B2
(45) Date of Patent: Jul. 5, 2022

(54) SINGLE-SERVE FORMED SOLUBLE COFFEE PRODUCT

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 16/156,970

(22) Filed: Oct. 10, 2018

(65) Prior Publication Data

US 2019/0282022 A1    Sep. 19, 2019

Related U.S. Application Data

(63) Continuation-in-part of application No. 16/040,491, filed on Jul. 19, 2018, now Pat. No. 10,588,447, which is a continuation-in-part of application No. 15/922,774, filed on Mar. 15, 2018, now Pat. No. 10,463,056.

(51) Int. Cl.
*A23L 2/395* (2006.01)
*A23L 3/44* (2006.01)
*A47J 31/02* (2006.01)
*A47J 31/44* (2006.01)

(52) U.S. Cl.
CPC ........... *A47J 31/02* (2013.01); *A47J 31/4403* (2013.01)

(58) Field of Classification Search
CPC ...... A23L 3/44; A23L 2/00; A23L 2/95; A23F 5/38
See application file for complete search history.

(56) References Cited

U.S. PATENT DOCUMENTS

| | | | |
|---|---|---|---|
| 3,421,901 A * | 1/1969 | Migdol | A23F 5/486 426/387 |
| 8,028,503 B2 | 10/2011 | Capodieci | |
| 8,268,374 B2 | 9/2012 | Capodieci | |
| 8,709,517 B2 | 4/2014 | Capodieci | |
| 9,167,845 B2 | 10/2015 | Capodieci | |
| 2005/0001340 A1 | 1/2005 | Page | |
| 2006/0024420 A1* | 2/2006 | Kessler | A23F 5/385 426/590 |
| 2007/0148231 A1* | 6/2007 | Bauer | A61K 9/0056 424/464 |
| 2008/0193533 A1* | 8/2008 | Kishimoto | A61K 9/2826 424/480 |
| 2011/0300271 A1 | 12/2011 | Capodieci | |
| 2012/0009304 A1 | 1/2012 | Perentes | |
| 2013/0118360 A1 | 5/2013 | Dogan et al. | |
| 2013/0309371 A1 | 11/2013 | Abegglen | |
| 2014/0299000 A1 | 10/2014 | Hanneson | |
| 2015/0327713 A1 | 11/2015 | Pruitt | |
| 2016/0044939 A1 | 2/2016 | Capodieci | |

OTHER PUBLICATIONS

Folgers Instant Coffee, www.folgerscoffee.com/coffees/instant-coffee-products [Retrieved from the Internet on Oct. 19, 2018].
"How Coffee Extraction Works," Clive Coffee, as early as Sep. 7, 2018, 4 pages [online]. Retrieved from the Internet: <URL: https://clivecoffee.com/blogs/learn/how-coffee-extraction-works#:~:text=Take%20the%20roasted%20coffee%2C%20grind,extract%20out%20the%20flavor%20compounds.&text=The%20first%20compounds%20extracted%20out%20of%20coffee%20are%20the%20acids%20and%20fats.&text=Eventually%2C%20the%20water%20will%20start,hold%20the%20ground%20coffee%20together.>.

\* cited by examiner

*Primary Examiner* — Hong T Yoo
(74) *Attorney, Agent, or Firm* — Klein, O'Neill & Singh, LLP

(57) ABSTRACT

A method for forming a dissolvable freeze dried coffee is disclosed. The method may comprise the steps of freezing a liquid coffee concentrate and freeze drying the frozen liquid coffee concentrate until a hard outer crust is formed which may have a hardness greater than or equal to an interior portion of the freeze dried coffee.

12 Claims, 38 Drawing Sheets

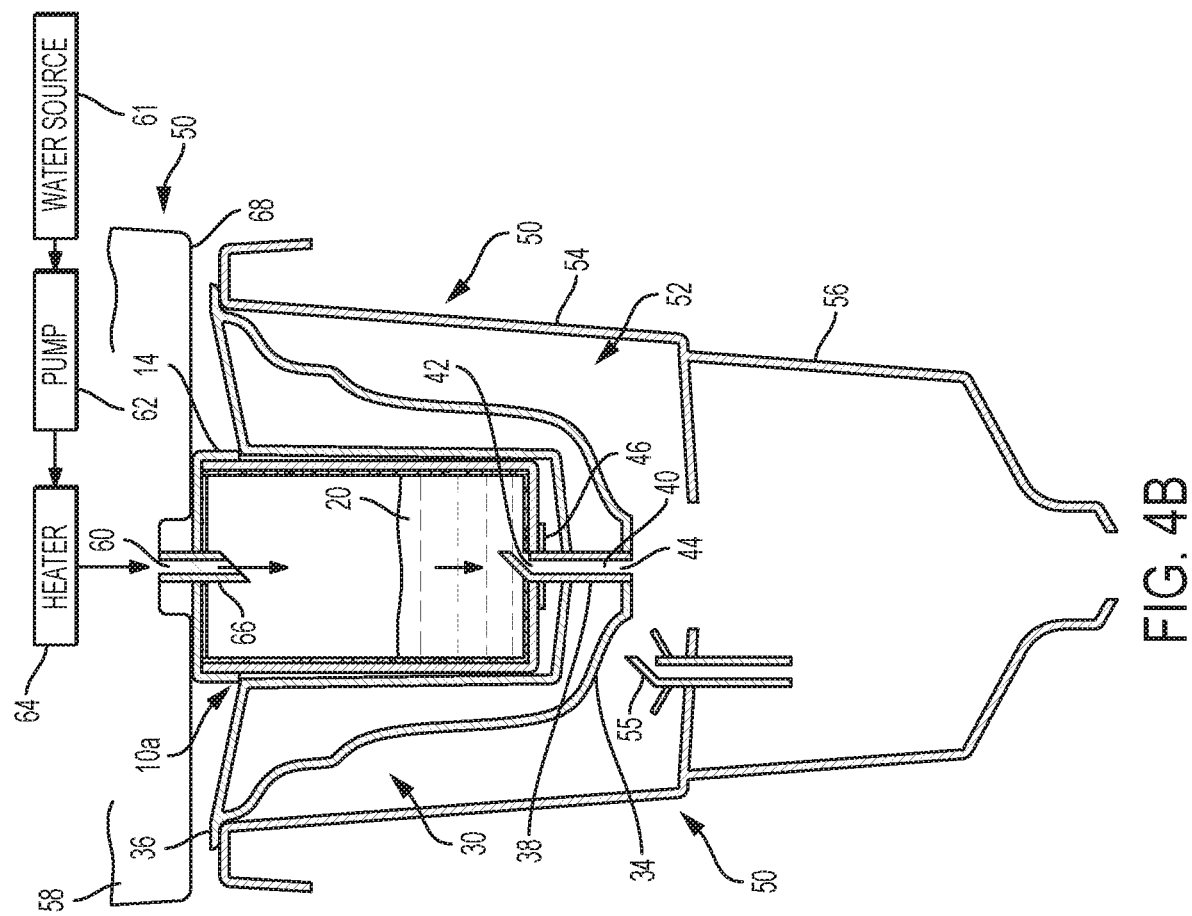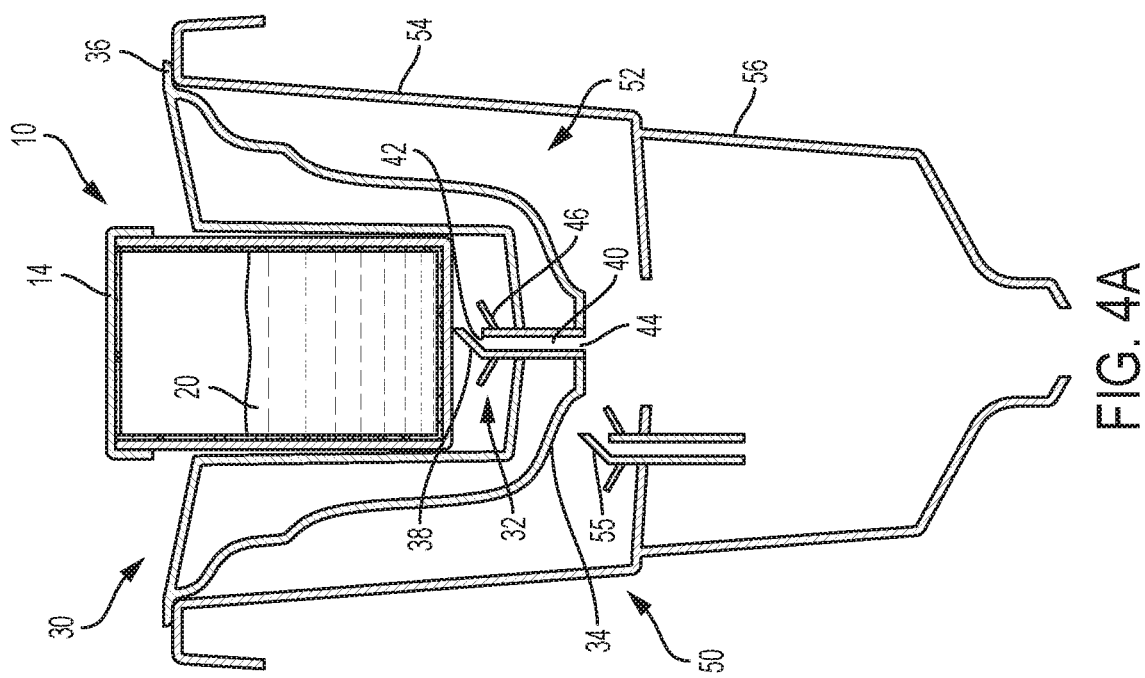

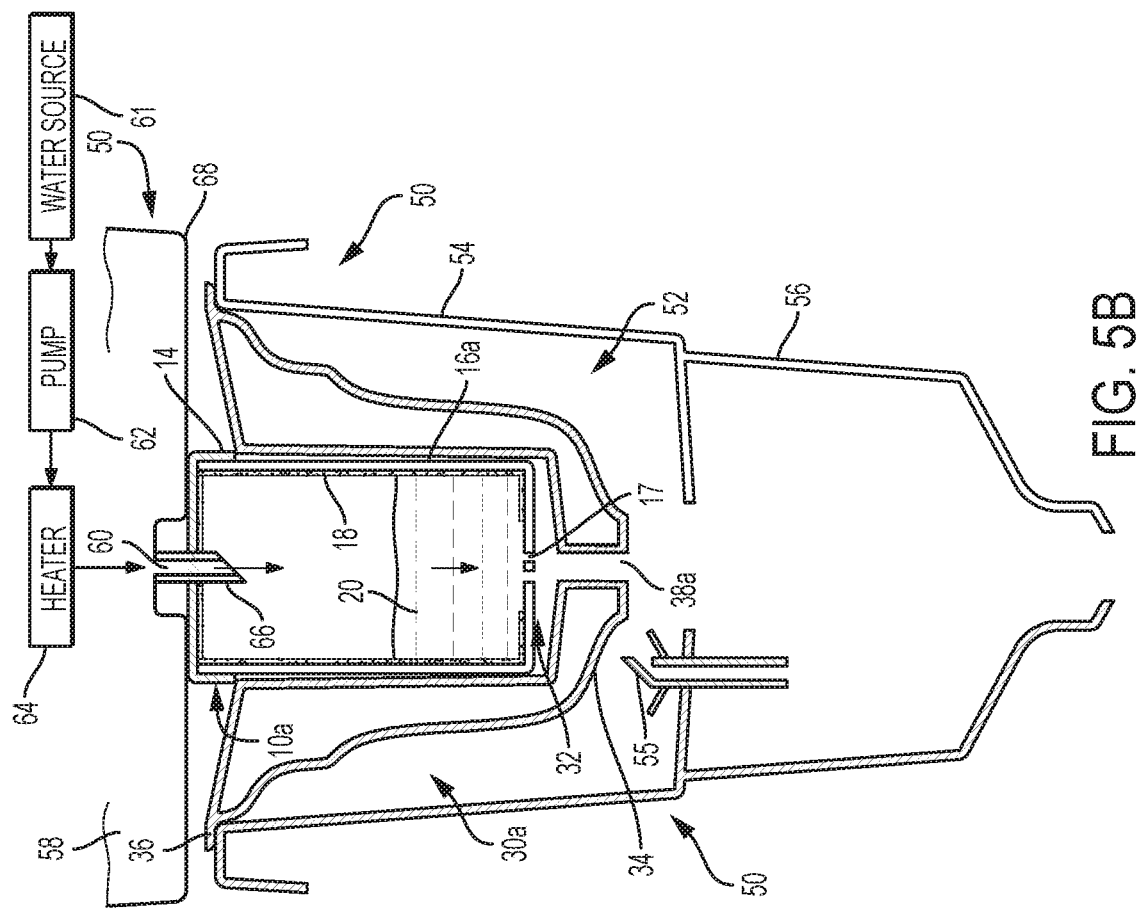
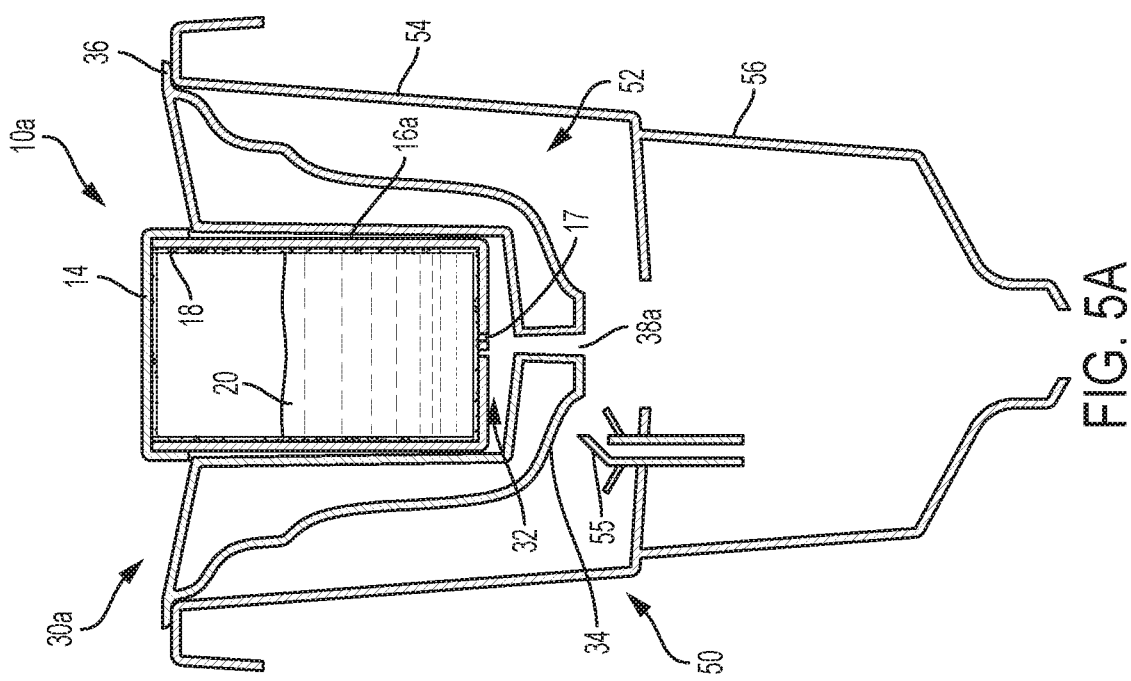

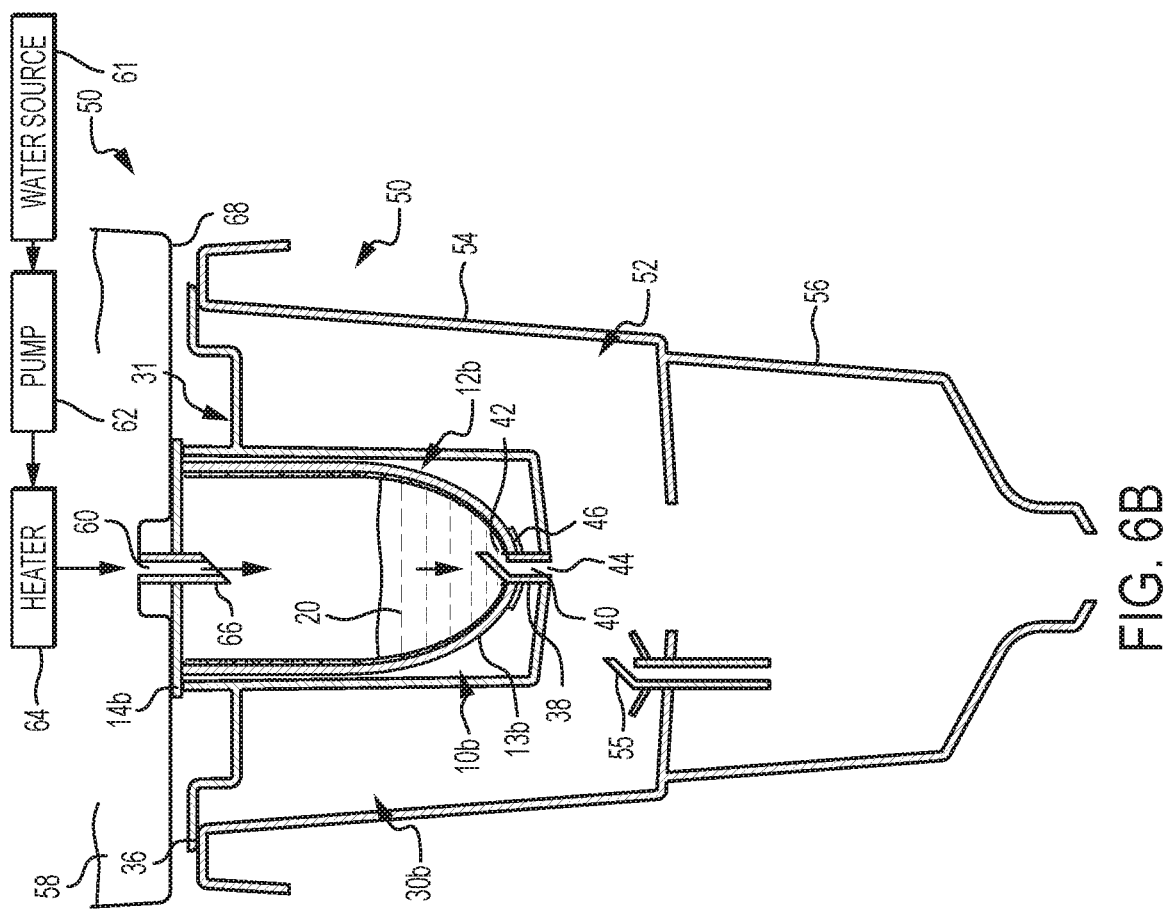
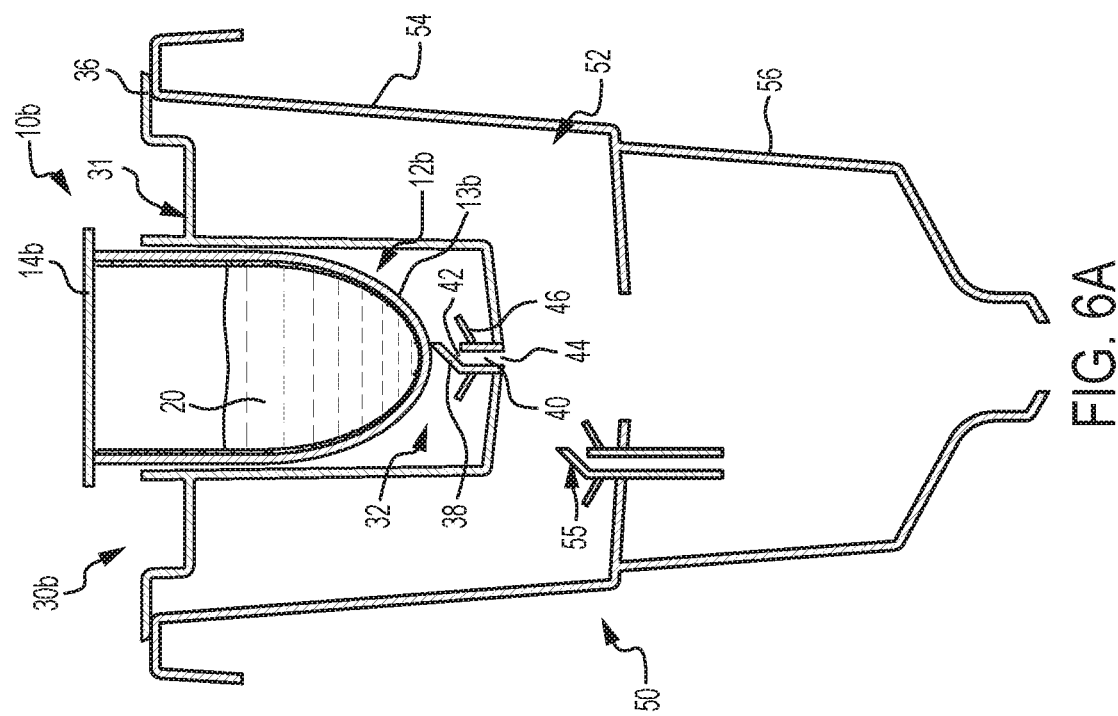
FIG. 6B
FIG. 6A

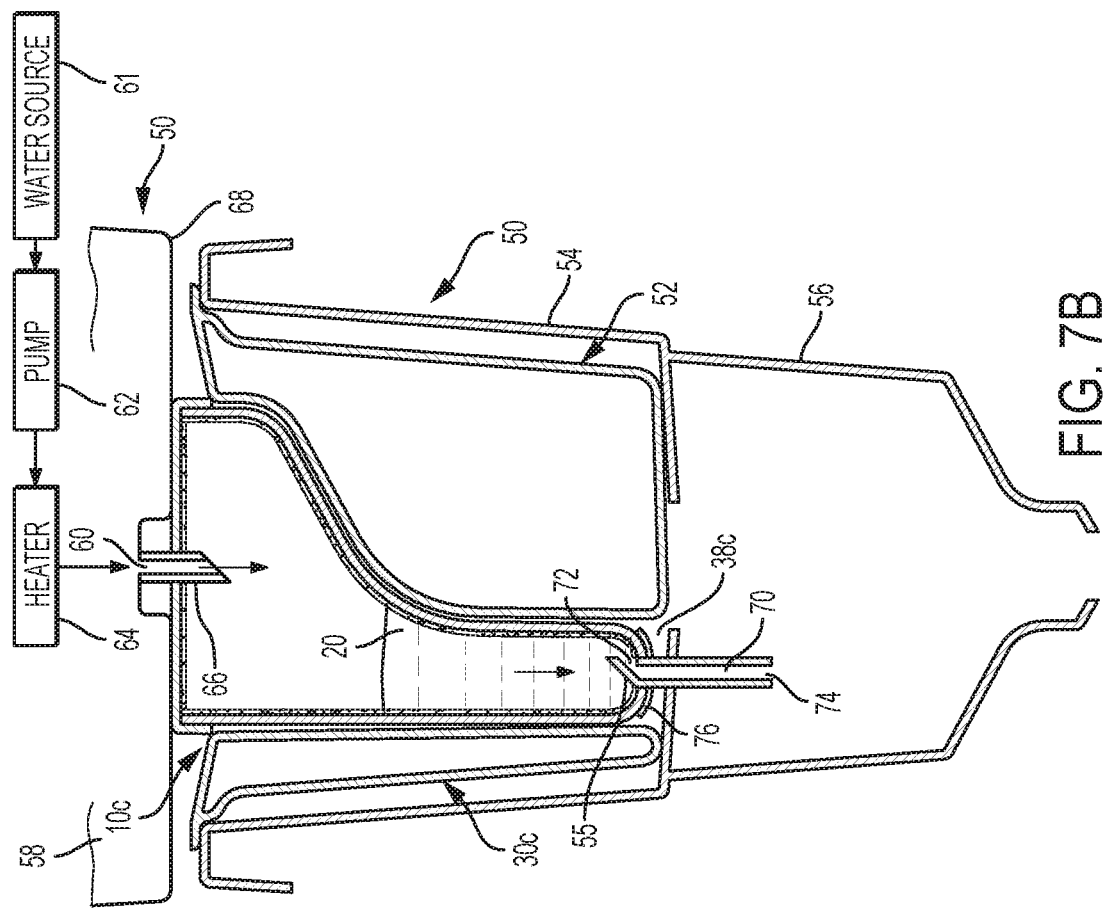
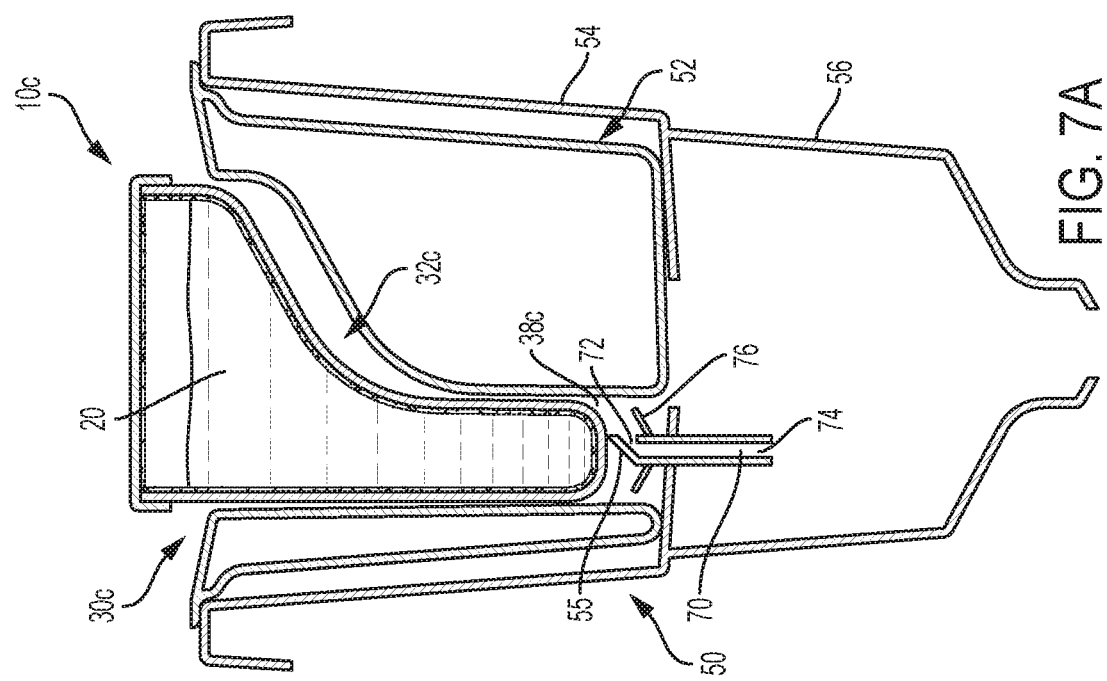

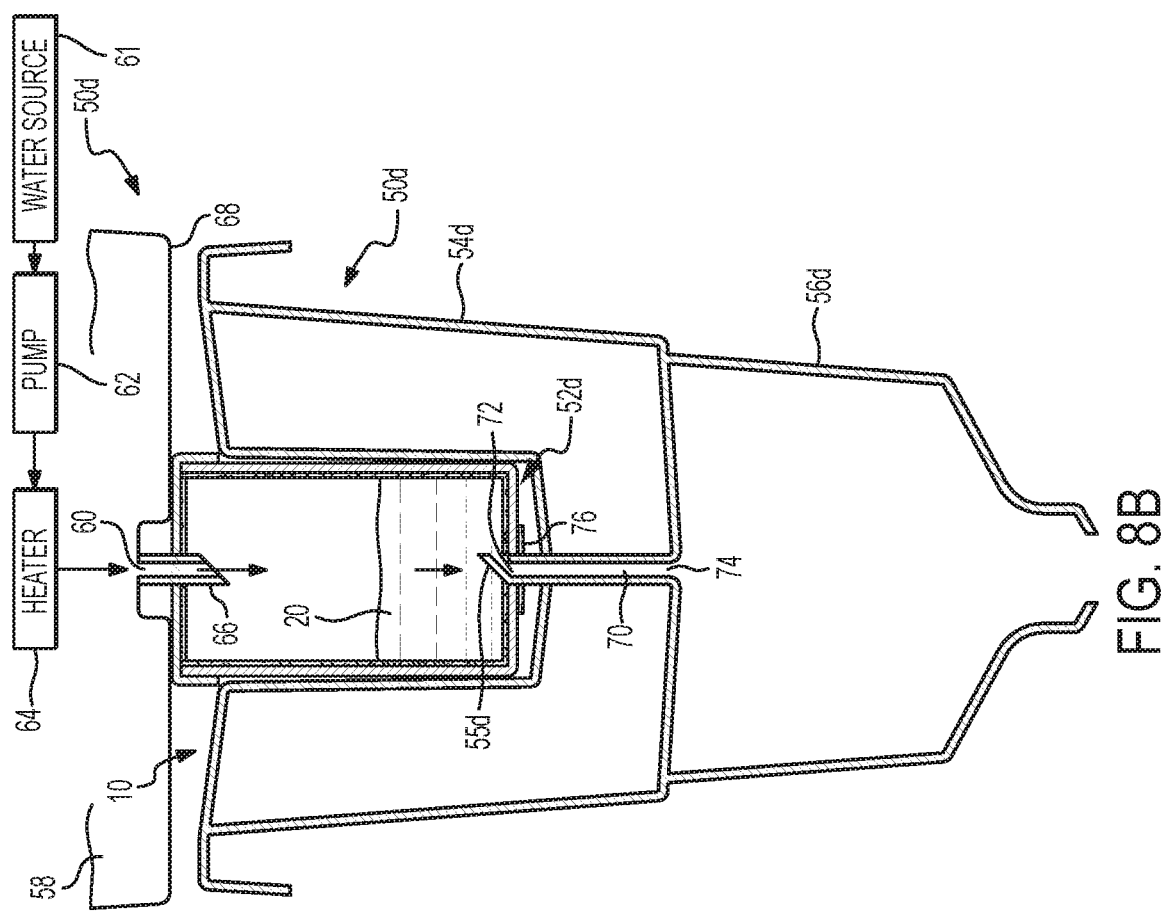
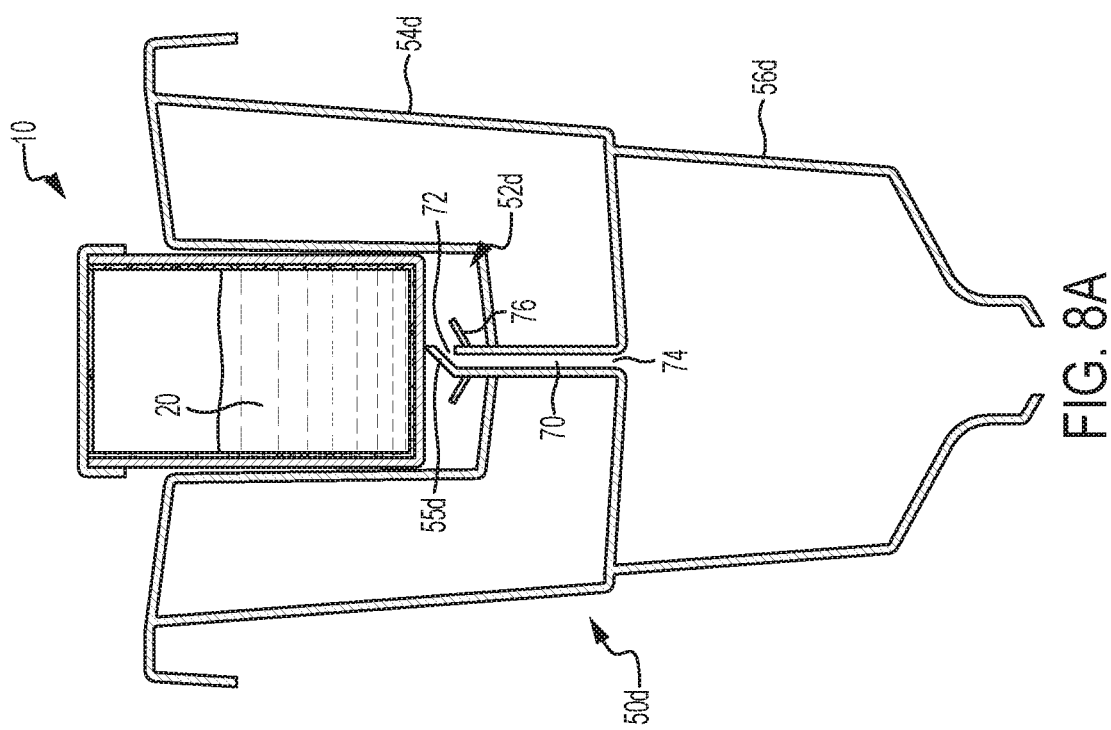

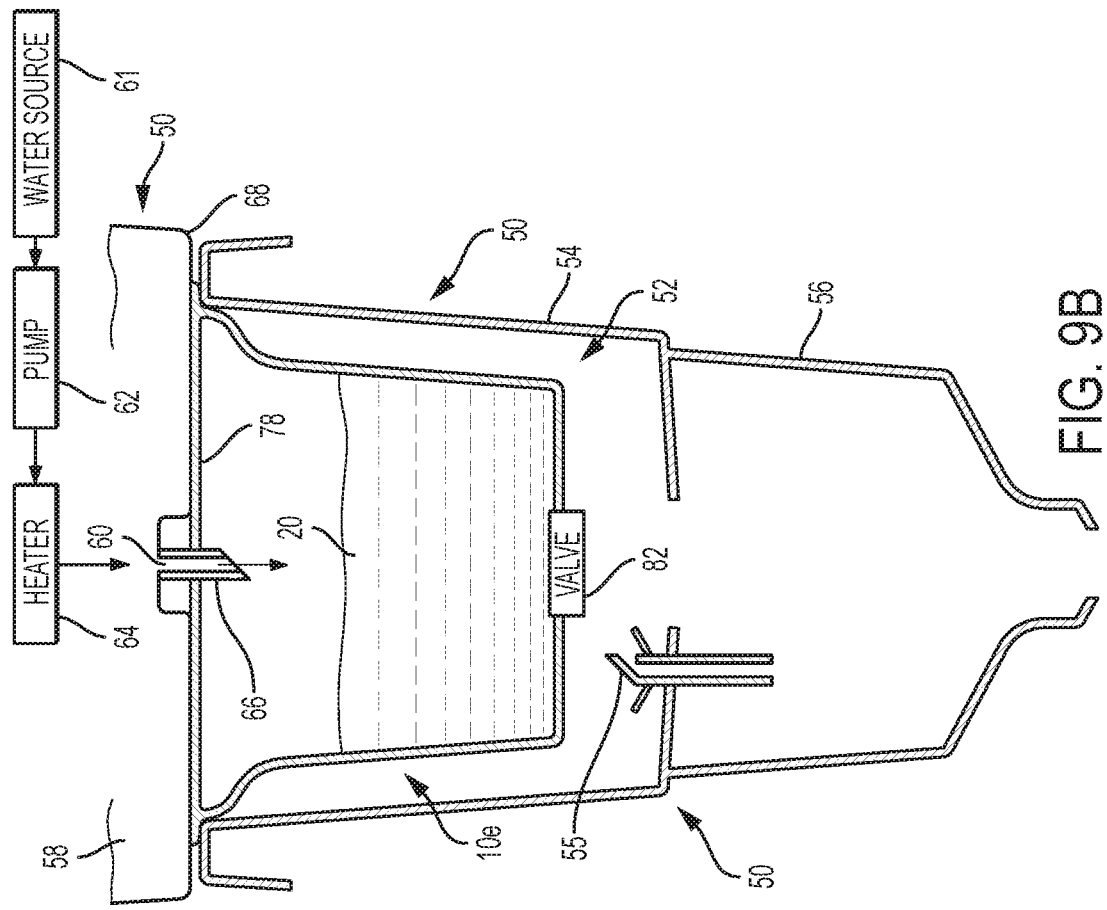
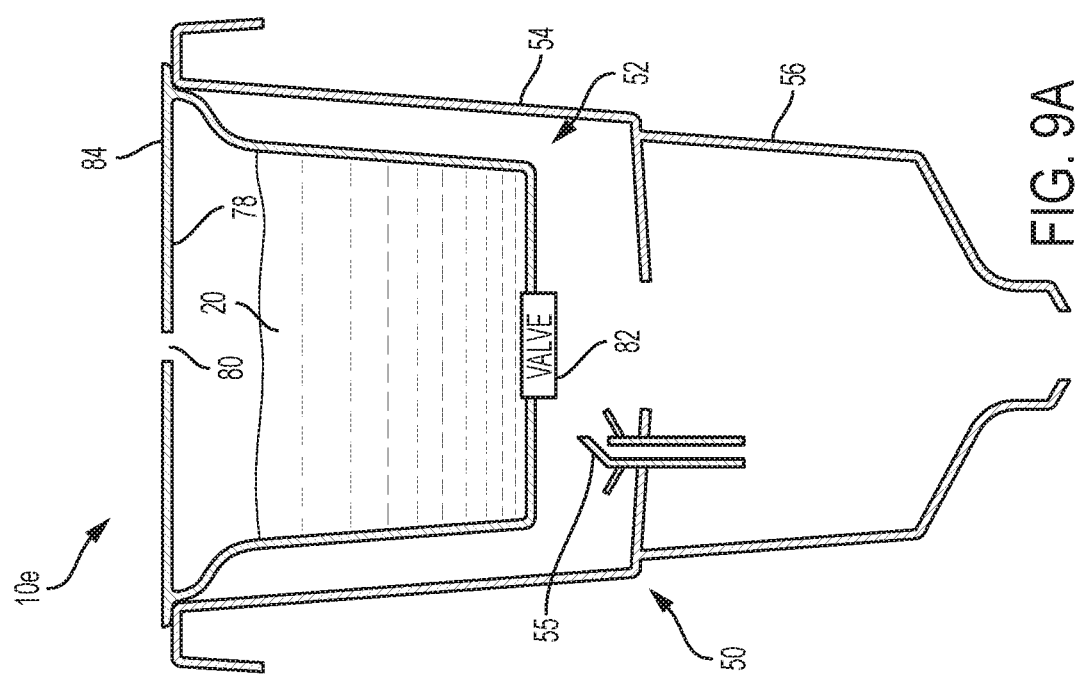

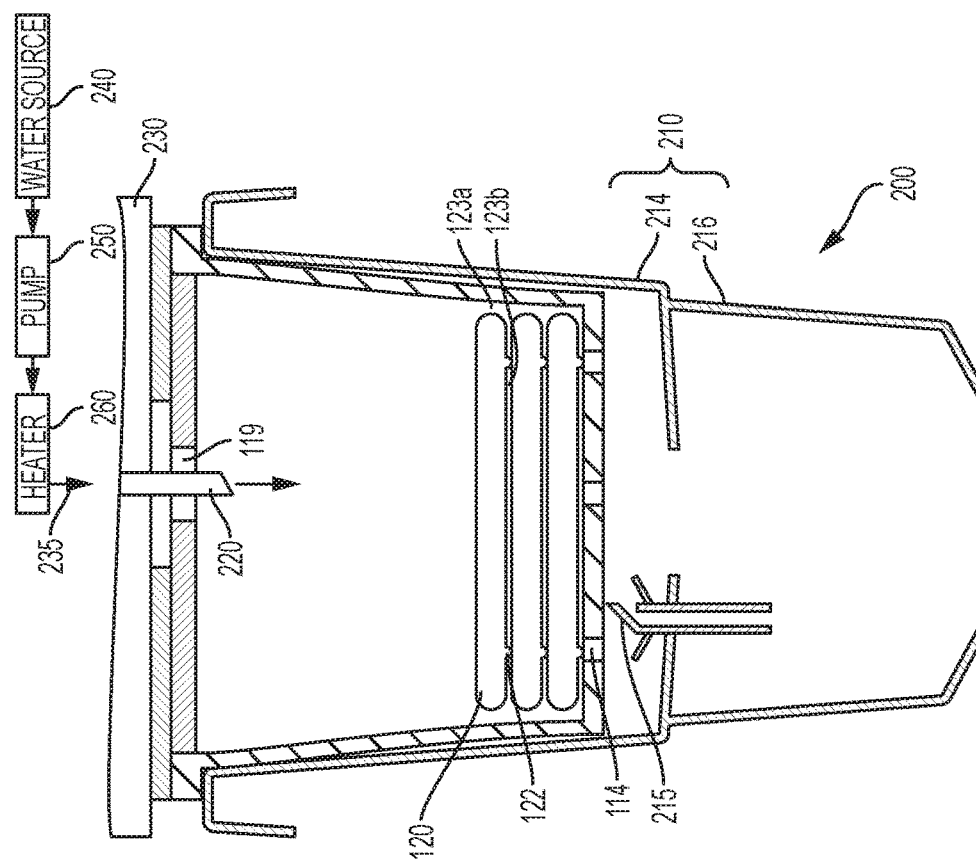
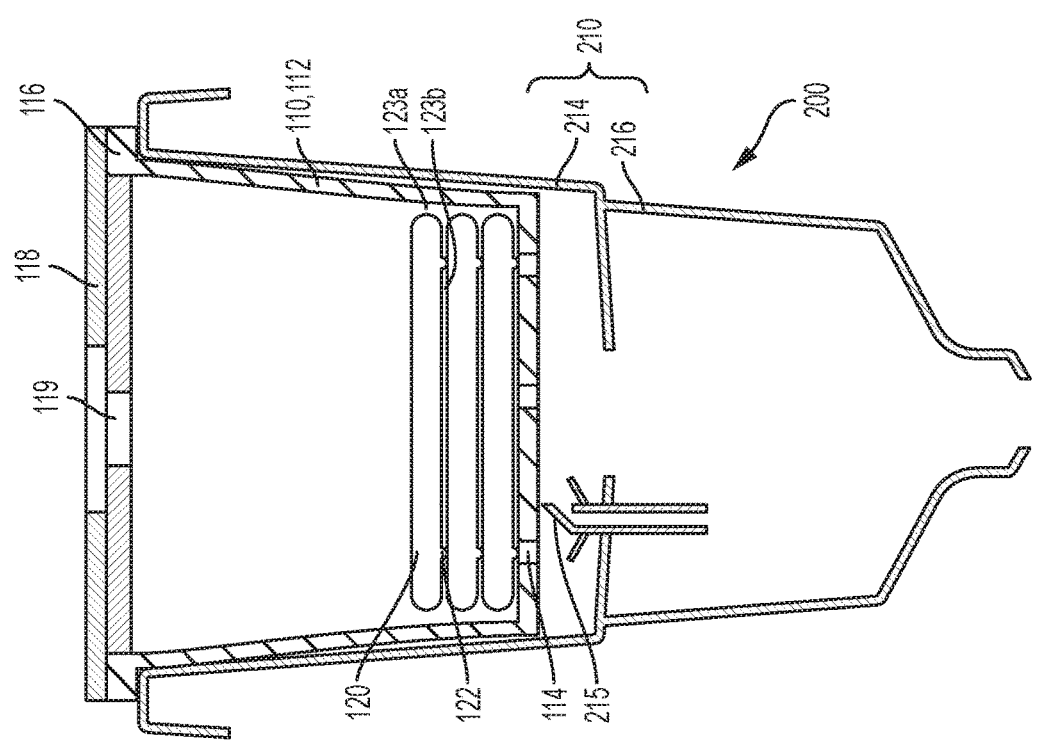

SINGLE-SERVE FORMED SOLUBLE COFFEE PRODUCT

CROSS-REFERENCE TO RELATED APPLICATIONS

This application is a continuation in part application of U.S. patent application Ser. No. 16/040,491, filed on Jul. 19, 2018, which is a continuation-in-part of U.S. patent application Ser. No. 15/922,774, filed Mar. 15, 2018, which are incorporated by reference herein in their entirety.

STATEMENT RE: FEDERALLY SPONSORED RESEARCH/DEVELOPMENT

Not Applicable

BACKGROUND

Many people enjoy drinking coffee as part of a daily routine. However, preparing coffee is time-consuming and can be an inefficient use of time and energy (including electrical energy) when only a single cup is to be prepared. Meanwhile, coffee makers that are designed to prepare a single cup of coffee using a single-serve ground coffee container (e.g. a Keurig® K-Cup® pod) produce an enormous amount of waste that is harmful to the environment. The result of single use K-Cup type pods is that the planet is literally being destroyed. Tens of billions of pods end up in landfills annually. If the discarded pods are placed end-to-end, they would circle the globe 12 times! This means that the waste problem is growing and will grow as more companies and unless mitigated will continue to cause problems exponentially for our planet.

BRIEF SUMMARY

The present disclosure contemplates various systems and methods for preparing an individual serving of coffee. By way of example in non-limitation, a liquid coffee concentrate may be disposed within a container (i.e., pod). The container may be fabricated from a plastic material or a food grade biodegradable paper. With the pod being sized and configured to be insertable into a single serve coffee maker such a Keurig, the waste (i.e., plastic housing) coffee pod is minimal or less than that of a traditional Keurig coffee pod because less volume of liquid coffee concentrate is required to make a single cup of coffee compared to the volume required to brew coffee from coffee grinds as is the case with the Keurig pods, and thus, the coffee pod with the liquid coffee concentrate can be smaller and produce less waste. As will be discussed herein, because the coffee pod with the liquid coffee concentrate is smaller compared to the Keurig coffee pod, an adapter may be used to allow the smaller sized coffee pod with the liquid coffee concentrate to be used within a traditional single serve coffee maker such as a Keurig.

Alternatively, it is also contemplated that in lieu of a coffee pod with a liquid coffee concentrate, a freeze-dried coffee product can be inserted into the adapter or holder where the coffee pod would normally sit. When the hot water is running through the single serve coffee maker, the hot water dissolves the dissolvable coffee product first to brew the coffee. A first portion of the volume of the hot water dissolves the dissolvable coffee product. However, a later second portion of the volume of the hot water may sanitize and clean the interior surfaces of the holder or adapter so that the user does not have to clean the holder or adapter or remove any remaining portion of the coffee product from the single serve coffee maker. This as a level of convenience to the user, which has not been previously achieved by the traditional single serve coffee makers.

More particularly, an amount of liquid coffee concentrate to prepare an individual serving of coffee is packaged in a sealed food grade paper container. Unlike single-serve ground coffee containers like Keurig® K-Cup® pods, the sealed food grade paper container of liquid coffee concentrate does not need to contain a filter since the process of preparing coffee from a liquid coffee concentrate involves no brewing and produces no used coffee grounds. Due to the absence of a filter and the concentrated nature of liquid coffee concentrate, the sealed food grade paper container of liquid coffee concentrate can be very small, for example, sized to contain about 5-10 mL of liquid coffee concentrate. A single sealed food grade paper container of liquid coffee concentrate can be used to prepare a serving of coffee using an existing coffee maker (e.g. a Keurig® coffee maker) designed for single-serve ground coffee containers (e.g. Keurig® K-Cup® pods). An adapter may be provided for receiving the sealed food grade paper container of liquid coffee concentrate and positioning the sealed food grade paper container in the coffee maker. When the coffee maker is operated, an upper portion of the sealed food grade paper container may be pierced by a needle of the coffee maker to allow heated water to flow into the sealed food grade paper container. A lower portion of the sealed food grade paper container may be pierced by a needle of the adapter or may be otherwise compromised to allow the combined liquid coffee concentrate and hot water to flow out of the sealed food grade paper container and into a user's coffee cup.

In accordance with one embodiment, there is a system for preparing an individual serving of coffee using a liquid coffee concentrate. The system includes a sealed food grade paper container containing an amount of liquid coffee concentrate for the preparation of an individual serving of coffee and a coffee maker operable to prepare a single serving of coffee from the liquid coffee concentrate contained in the sealed food grade paper container. The coffee maker includes a coffee maker recess for receiving the sealed food grade paper container, a first coffee maker needle for piercing an entrance hole in an upper portion of the sealed food grade paper container while the sealed food grade paper container is in the coffee maker recess, a water conduit by which water from a water source flows into the sealed food grade paper container through the entrance hole, and a heater for heating the water.

The system may include an adapter for receiving the sealed food grade paper container and positioning the sealed food grade paper container in the coffee maker recess, the coffee maker recess receiving the sealed food grade paper container while the sealed food grade paper container is in the adapter. The adapter may include an adapter recess for receiving the sealed food grade paper container, and an exterior sized to fit the coffee maker recess. The adapter may include an adapter needle for piercing an exit hole in a lower portion of the sealed food grade paper container when the sealed food grade paper container is pressed into the adapter recess by operation of a lid of the coffee maker being closed down on the sealed food grade paper container. A combination of the water and the liquid coffee concentrate may flow out of the sealed food grade paper container through the exit hole.

The sealed food grade paper container may include a shell having one or more holes in a lower portion thereof, and a coating that covers the one or more holes and melts when contacted by water that has been heated by the heater. A combination of the water and the liquid coffee concentrate may flow out of the sealed food grade paper container through the one or more holes. The shell may be made from a durable paper and the coating may be made from a waterproof wax, plastic, or parchment.

The coffee maker may include a second coffee maker needle for piercing an exit hole in a lower portion of the sealed food grade paper container when the sealed food grade paper container is pressed into the coffee maker recess by operation of a lid of the coffee maker being closed down on the sealed food grade paper container. A combination of the water and the liquid coffee concentrate may flow out of the sealed food grade paper container through the exit hole.

The sealed food grade paper container may contain about 5-10 mL of liquid coffee concentrate.

The sealed food grade paper container may be have an exterior volume of less than 25 mL.

In accordance with another embodiment, there is a system for preparing an individual serving of coffee using a liquid coffee concentrate and a coffee maker having a coffee maker recess for receiving a single-serve ground coffee container. The system includes a sealed food grade paper container containing an amount of liquid coffee concentrate for the preparation of an individual serving of coffee, and an adapter for receiving the sealed food grade paper container and positioning the sealed food grade paper container in the coffee maker recess. The adapter includes an upper portion having an adapter recess for receiving the sealed food grade paper container, and an exterior sized to fit the coffee maker recess.

The adapter may include an adapter needle for piercing an exit hole in a lower portion of the sealed food grade paper container when the sealed food grade paper container is pressed into the adapter recess by operation of a lid of the coffee maker being closed down on the sealed food grade paper container. A combination of the liquid coffee concentrate and water from the coffee maker may flow out of the sealed food grade paper container through the exit hole.

The sealed food grade paper container may include a shell having one or more holes in a lower portion thereof, and a coating that covers the one or more holes and melts when contacted by water that has been heated by a heater of the coffee maker. A combination of the water and the liquid coffee concentrate may flow out of the sealed food grade paper container through the one or more holes. The shell may be made from a durable paper and the coating may be made from a waterproof wax, plastic, or parchment.

The sealed food grade paper container may contain about 5-10 mL of liquid coffee concentrate.

The sealed food grade paper container may have an exterior volume of less than 25 mL.

In accordance with another embodiment, there is a system for preparing an individual serving of coffee using a liquid coffee concentrate. The system includes a sealed food grade paper container, and liquid coffee concentrate inside the sealed food grade paper container in an amount for the preparation of an individual serving of coffee.

The sealed food grade paper container may include a shell having one or more holes in a lower portion thereof, and a coating that covers the one or more holes and melts when contacted by water that has been heated by a heater of a coffee maker. A combination of the water and the liquid coffee concentrate may flow out of the sealed food grade paper container through the one or more holes. The shell may be made from a durable paper and the coating may be made from a waterproof wax, plastic, or parchment.

The sealed food grade paper container may contain about 5-10 mL of liquid coffee concentrate.

The sealed food grade paper container may have an exterior volume of less than 25 mL.

Another aspect of the present disclosure contemplates systems and methods for preparing an individual serving of coffee using a formed (e.g. molded or otherwise given some shape on a scale larger than a particle or granule) soluble coffee product. A formed soluble coffee product is prepared in the shape of a wafer, ball, or other shape, including an amount of soluble coffee (i.e. instant coffee) to prepare an individual serving of coffee. The formed soluble coffee product is placed in a food grade paper container having one or more holes in a lower portion thereof, and the food grade paper container is placed in a coffee maker, such as an existing coffee maker (e.g. a Keurig® coffee maker) designed for single-serve ground coffee containers (e.g. Keurig® K-Cup® pods). A cap with an orifice may be provided that fits on the food grade paper container. When the coffee maker is operated, the orifice in the cap may receive a needle of the coffee maker to allow heated water to flow into the food grade paper container. As the heated water dissolves the formed soluble coffee product, the combined soluble coffee and hot water may flow out of the food grade paper container via the one or more holes and into a user's coffee cup. The process of preparing coffee from the formed soluble coffee product involves no brewing and produces no used coffee grounds, and the food grade paper container need not be pierced by a needle or otherwise compromised when dissolving the formed soluble coffee product. Therefore, the process produces no waste. Moreover, unlike single-serve ground coffee containers like Keurig® K-Cup® pods, the food grade paper container holding the formed soluble coffee product does not need to contain a filter (since the process of preparing coffee from soluble coffee involves no brewing and produces no used coffee grounds). Due to the absence of a filter and the concentrated nature of soluble coffee, the food grade paper container can be sized to receive more than one formed soluble coffee products and/or formed soluble flavor or creamer additive products, allowing the user to mix and match to suit his/her taste and desired coffee strength.

According to one embodiment, there is a system for preparing an individual serving of coffee. The system includes one or more formed soluble coffee products and a food grade paper container having one or more holes in a lower portion thereof, the one or more holes sized to prevent the one or more formed soluble coffee products from passing therethrough when the one or more formed soluble coffee products are placed in the food grade paper container. The system may further include a coffee maker operable to prepare a single serving of coffee from the one or more formed soluble coffee products, the coffee maker including a recess for receiving the food grade paper container, a water conduit by which water from a water source flows into the food grade paper container while the food grade paper container is in the recess, and a heater for heating the water.

Each of the formed soluble coffee products may have one or more protrusions arranged to produce a gap between adjacent formed soluble coffee products when at least two of the one or more formed soluble coffee products are stacked in the food grade paper container.

Each of the one or more formed soluble coffee products may have a dimension that completely covers the one or more holes when the one or more formed soluble coffee products are placed in the food grade paper container.

The food grade paper container may include one or more stoppers that extend laterally outward from the food grade paper container in an upper portion thereof, the one or more stoppers preventing the food grade paper container from falling into the recess of the coffee maker. The recess of the coffee maker may include an exit needle positioned to pierce single-serve ground coffee food grade paper container when a single-serve ground coffee food grade paper container is placed in the coffee maker, and the one or more stoppers may prevent the food grade paper container from being pierced by the exit needle.

The system may include a lid that fits on the food grade paper container and includes an orifice. The water conduit of the coffee maker may include an entrance needle that fits into the orifice of the cap.

The system may include one or more formed soluble flavor or creamer additive products. The one or more holes of the food grade paper container may be sized to prevent the one or more formed soluble flavor or creamer additive products from passing therethrough when the one or more formed soluble flavor or creamer additive products are placed in the food grade paper container.

According to another embodiment, there is a method of preparing an individual serving of coffee. The method includes placing one or more formed soluble coffee products in a food grade paper container having one or more holes in a lower portion thereof, the one or more holes sized to prevent the one or more formed soluble coffee products from passing therethrough when the one or more formed soluble coffee products are placed in the food grade paper container. The method may further include placing the food grade paper container in a recess of a coffee maker and operating the coffee maker to cause hot water to flow into the food grade paper container until the one or more formed soluble coffee products are completely dissolved.

Placing one or more formed soluble coffee products in the food grade paper container may include stacking at least two of the one or more formed soluble coffee products in the food grade paper container. Each of the formed soluble coffee products may have one or more protrusions arranged to produce a gap between adjacent formed soluble coffee products when the at least two formed soluble coffee products are stacked in the food grade paper container.

Each of the one or more formed soluble coffee products may have a dimension that completely covers the one or more holes when the one or more formed soluble coffee products are placed in the food grade paper container.

The food grade paper container may include one or more stoppers that extend laterally outward from the food grade paper container in an upper portion thereof, the one or more stoppers preventing the food grade paper container from falling into the recess of the coffee maker.

The method may include fitting a cap on the food grade paper container, the cap including an orifice, and inserting an entrance needle of the coffee maker into the orifice of the cap. Operating the coffee maker may cause the hot water to flow into the food grade paper container via the entrance needle.

The method may include dipping at least one of the one or more formed soluble coffee products in a flavor or creamer additive.

The method may include placing one or more formed soluble flavor or creamer additive products in the food grade paper container. The one or more holes of the food grade paper container may be sized to prevent the one or more formed soluble flavor or creamer additive products from passing therethrough when the one or more formed soluble flavor or creamer additive products are placed in the food grade paper container.

According to another embodiment, there is a method of manufacturing a formed soluble coffee product. The method includes pouring coffee into a mold, pouring a flavor or creamer additive into the mold, and freeze drying the combined coffee and additive while the coffee and additive are in the mold.

The method may include brewing the coffee from ground coffee beans. The method may include grinding roasted coffee beans to produce the ground coffee beans. The method may include roasting coffee beans to produce the roasted coffee beans.

The coffee may be a liquid coffee concentrate.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 4A and 4B are schematic representations of a coffee maker including cross-sectional views of the sealed food grade paper container placed inside the adapter with the adapter placed inside the coffee maker, with FIG. 4A showing the coffee maker in an open position and FIG. 4B showing the coffee maker in a closed position;

FIGS. 5A and 5B are schematic representations of a coffee maker including cross-sectional views of a sealed food grade paper container placed inside an adapter with the adapter placed inside the coffee maker according to another embodiment of the present disclosure, with FIG. 5A showing the coffee maker in an open position and FIG. 5B showing the coffee maker in a closed position;

FIGS. 6A and 6B are schematic representations of a coffee maker including cross-sectional views of a sealed food grade paper container placed inside an adapter with the adapter placed inside the coffee maker according to another embodiment of the present disclosure, with FIG. 6A showing the coffee maker in an open position and FIG. 6B showing the coffee maker in a closed position;

FIGS. 7A and 7B are schematic representations of a coffee maker including cross-sectional views of a sealed food grade paper container placed inside an adapter with the adapter placed inside the coffee maker according to another embodiment of the present disclosure, with FIG. 7A showing the coffee maker in an open position and FIG. 7B showing the coffee maker in a closed position;

FIGS. 8A and 8B are schematic representations of a coffee maker including cross-sectional views of the sealed food grade paper container of FIGS. 1A-4B placed inside the coffee maker without an adapter, with FIG. 8A showing the coffee maker in an open position and FIG. 8B showing the coffee maker in a closed position;

FIGS. 9A and 9B are schematic representations of the coffee maker of FIGS. 4A-7B, including cross-sectional views of a reusable food grade paper container placed inside the coffee maker without an adapter, with FIG. 9A showing the coffee maker in an open position and FIG. 9B showing the coffee maker in a closed position;

FIGS. 14A and 14B are schematic representations of the coffee maker of FIGS. 13A, 13B, and 13C including cross-sectional views of the food grade paper container placed inside the coffee maker with the formed soluble coffee product(s) and/or additive product(s) placed inside the food grade paper container and the cap on the food grade paper container, with FIG. 14A showing the coffee maker in an open position and FIG. 14B showing the coffee maker in a closed position;

DETAILED DESCRIPTION

Figure 1A:
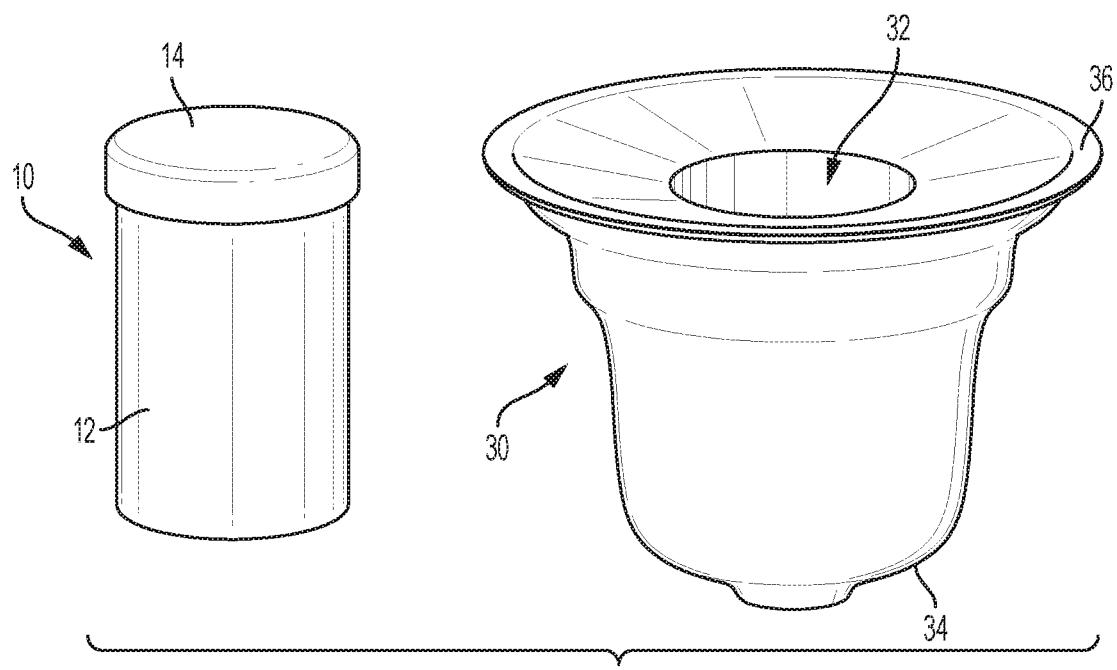
FIG. 1A is a perspective view of a sealed food grade paper container of liquid coffee concentrate and an adapter according to an embodiment of the present disclosure.

The present disclosure encompasses various embodiments of systems and methods for preparing an individual serving of coffee using a liquid coffee concentrate. A person wishing to make a single serving of coffee takes a sealed food grade paper container 10 of liquid coffee concentrate 20 and places it in a coffee maker 50. The sealed food grade paper container 10 of liquid coffee concentrate 20 may be very small (e.g. sized to contain about 5-10 mL of liquid coffee concentrate) in comparison to single-serve ground coffee containers like Keurig® K-Cup® pods or Nespresso® capsules. The coffee maker 50 may be a Keurig®, Nespresso® or other coffee maker that is designed to be used with single-serve ground coffee containers. The sealed food grade paper container 10 may be placed inside an adapter 30 that positions the sealed food grade paper container 10 in the coffee maker 50. The person then closes the lid 58 of the coffee maker 50 down on the sealed food grade paper container 10, causing a needle 66 of the coffee maker 50 to puncture an upper portion of the sealed food grade paper container 10 and allowing heated water to flow into the sealed food grade paper container 10 through the puncture hole. A needle 38 of the adapter 30 may puncture a bottom portion of the sealed food grade paper container 10, or the sealed food grade paper container 10A may be designed to burst open in the bottom portion when filled with hot water, allowing the combined liquid coffee concentrate 20 and heated water to flow down into the person's coffee cup. Afterward, the sealed food grade paper container 10, which is now punctured or otherwise compromised, may be thrown away or recycled, depending on its material composition. In either case, little waste is produced because the sealed food grade paper container 10 needs no internal filter and may contain only the liquid coffee concentrate, making it much smaller than a single-serve ground coffee food grade paper container such as a Keurig® K-Cup® pod or a Nespresso® capsule.

Figure 1B:
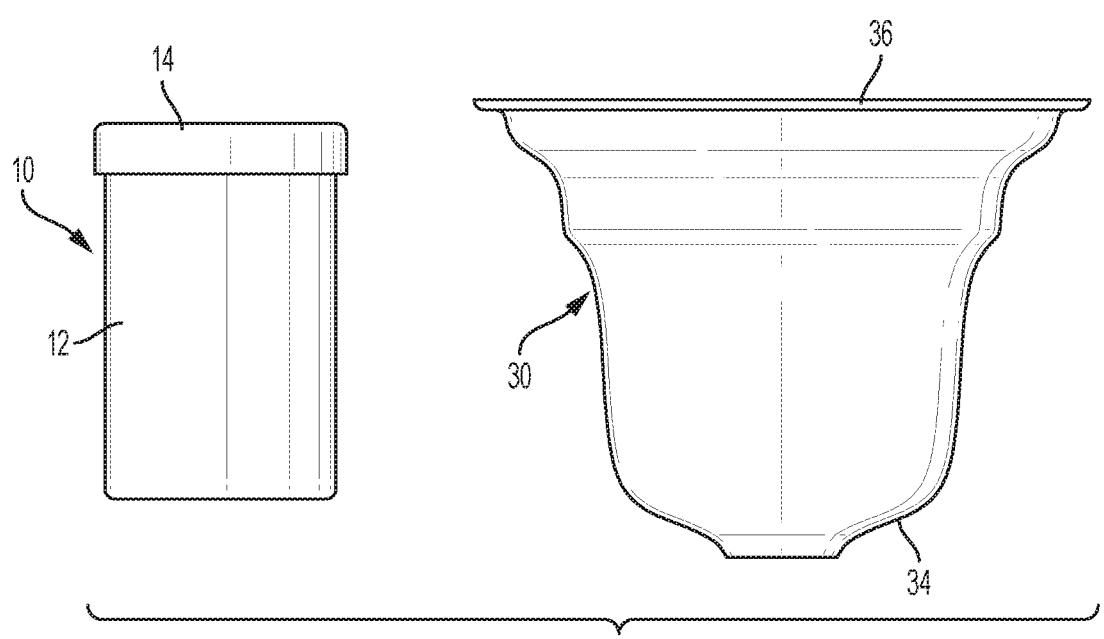
FIG. 1B is a side view of the sealed food grade paper container and the adapter.
Figure 2:
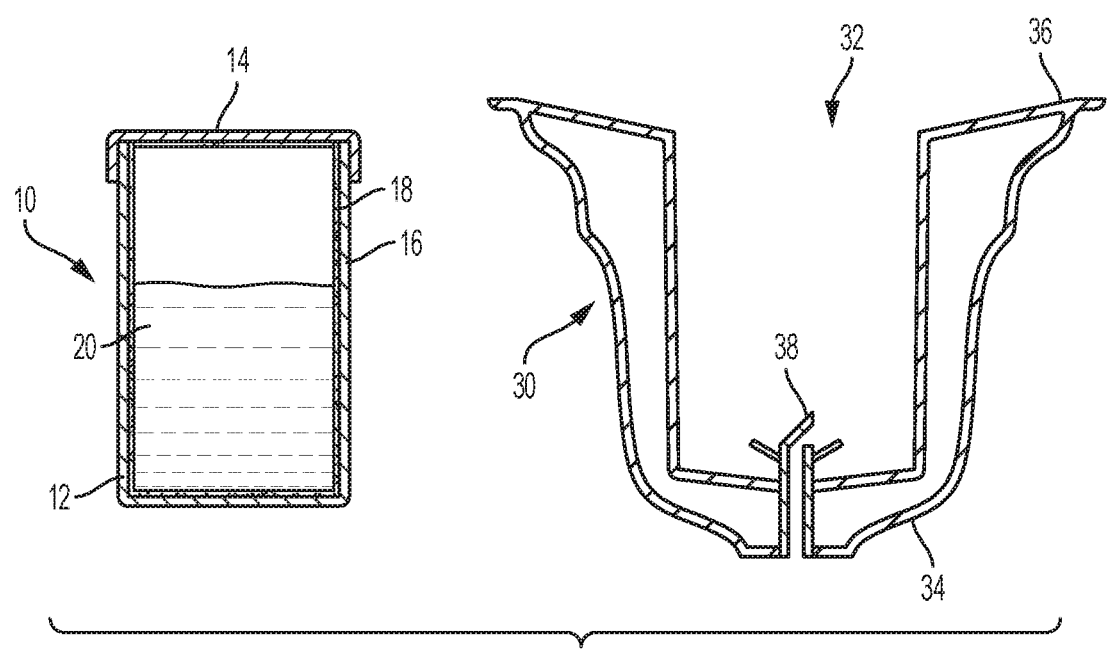
FIG. 2 is a cross-sectional view of the sealed food grade paper container and the adapter.

FIGS. 1A, 1B, and 2 are a perspective view, a side view, and a cross-sectional view, respectively, of a sealed food grade paper container 10 of liquid coffee concentrate 20 and an adapter 30 according to an embodiment of the present disclosure. The sealed food grade paper container 10 may contain an amount of liquid coffee concentrate 20 for the preparation of an individual serving of coffee, e.g. 5-10 mL of liquid coffee concentrate 20. The sealed food grade paper container 10 may have a generally cylindrical body 12 as shown with a protruding cap 14 that extends laterally outward relative to the body 12 (e.g. by 2-10 mm). When the sealed food grade paper container 10 is inserted into the adapter 30, the body 12 may fit inside a recess 32 of the adapter 30 while the protruding cap 14 does not fit inside the recess 32. In this way, the protruding cap 14 may prevent the sealed food grade paper container 10 from being inserted too far into the recess 32 and may provide a convenient handhold for a person removing the sealed food grade paper container 10 after it has been used.

The sealed food grade paper container 10 may be made of a recyclable or biodegradable material or combination of materials. For example, as shown in FIG. 2, the sealed food grade paper container 10 may include an exterior shell 16 made of a durable paper (e.g. lightweight cardboard) that is coated with an interior coating 18 such as a waterproof wax (e.g. paraffin wax), plastic (e.g. polyethylene), or parchment. For example, the body 12 and protruding cap 14 of the sealed food grade paper container 10 may be cut, rolled, and/or folded from a sheet of the exterior shell 16 and interior coating 18 materials. The durable paper may be durable enough to allow the exterior shell 16 to maintain its form while being handled in the ordinary usage of the sealed food grade paper container 10. The body 12 and the protruding cap 14 may both include a portion of the exterior shell 16 and a portion of the interior coating 18. The interior coating 18 may prevent the liquid coffee concentrate 20 from degrading the exterior shell 16, thus allowing the exterior shell 16 to be made from a durable paper such as cardboard. In some cases, the interior coating 18 may not be as recyclable or biodegradable as the exterior shell 16 and may instead melt off the exterior shell 16 and into the coffee as the coffee is prepared from hot water mixing with the liquid coffee concentrate 20. In such cases, the interior coating 18 may be made of a material that is harmless when ingested and does not appreciably affect the taste of the coffee.

As noted above, the sealed food grade paper container 10 may contain, for example, 5-10 mL of liquid coffee concentrate 20. The overall capacity of the sealed food grade paper container 10 may be equal to the amount of liquid coffee concentrate 20 contained in the sealed food grade paper container 10, or may be greater, with the remaining space filled with a quantity of air. The capacity of the sealed food grade paper container 10 may range from the minimum capacity needed to contain the desired amount of liquid coffee concentrate 20 (e.g. 5 mL, but may be lower depending on the concentration of the liquid coffee concentrate 20 and the desired strength of the coffee) up to a maximum capacity depending on the size of the coffee maker that the sealed food grade paper container 10 will be used with. For example, if the sealed food grade paper container 10 will be inserted in an adapter 30 inside a Keurig® coffee maker, a relatively large sealed food grade paper container 10 may have a capacity of around 40 mL. In the interest of minimizing the size of the sealed food grade paper container 10, the capacity of the sealed food grade paper container 10 may be less than 20 mL, preferably less than 15 mL, more preferably less than 10 mL.

Accounting for the material(s) of the sealed food grade paper container 10 itself, the sealed food grade paper container 10 may have an exterior volume that is slightly greater than its capacity, where the exterior volume is defined as the total volume of liquid displaced when the sealed food grade paper container 10 is submerged in the liquid. Such exterior volume may similarly range between low values around 5 mL and relatively high values around 40 mL, with the exterior volume greater than the capacity of the sealed food grade paper container 10 by an amount defined by the volume displaced by the material(s) of the sealed food grade paper container 10. For example, assuming the material(s) of the sealed food grade paper container 10 displace 5 mL, the exterior volume of the sealed food grade paper container 10 may be less than 25 mL, preferably less than 20 mL, more preferably less than 15 mL.

The recess 32 of the adapter 30 may be generally cylindrical to match the shape of the sealed food grade paper container 10 and may be wider (e.g. having a greater diameter) than the sealed food grade paper container 10, except that the recess 32 may be narrower (e.g. having a smaller diameter) than the protruding cap 14 of the sealed food grade paper container 10. In this way, the recess 32 may be shaped to prevent the sealed food grade paper container 10 from being inserted too far into the adapter 30 and becoming irretrievable. The exterior of the adapter 30 may be shaped to fit inside an existing coffee maker in the same way that a single-serve ground coffee container fits inside the coffee maker. Thus, for example, the exterior of the adapter 30 may be shaped like a Keurig® K-Cup® pod, a Nespresso® capsule, etc., depending on which existing coffee maker the adapter 30 is designed for. It is also contemplated that the adapter 30 may be designed to universally match two or more such existing coffee makers (e.g. by matching a height dimension of one and a width dimension of another).

In some cases, an existing coffee maker may have a needle positioned to pierce a lower portion of a single-serve ground coffee container. For example, a Keurig® coffee maker may have a part known as a K-Cup® holder that functions as a recess for receiving a K-Cup® pod, and the K-Cup® holder may have a part known as an exit needle that is positioned to pierce the bottom of the K-Cup® pod at a peripheral region of the K-Cup® pod. The adapter 30 may be shaped so as to avoid touching or pressing hard against such needle as shown in FIGS. 4A and 4B. In this regard, the adapter 30 may have a reduced height relative to the recess of the coffee maker, so as not to extend deeply enough into the recess to reach the needle, or the adapter 30 may have an exterior contour with a sloped or stepped region 34 in a lower portion thereof that slopes or steps inward to avoid the needle. Such reduced height and/or sloped or stepped region 34 may symmetrically define the exterior of the adapter 30 or may occur only in a portion of the adapter 30, e.g. as a dedicated slot to receive the needle. Meanwhile, the upper portion of the adapter 30 may have an outwardly extending lip 36 that extends laterally outward from the recess 32 in the upper portion of the adapter 30. In this way, just as the protruding cap 14 of the sealed food grade paper container 10 may prevent the sealed food grade paper container 10 from being inserted too far into the recess 32 of the adapter 30, the lip 36 of the adapter may prevent the adapter 30 from being inserted too far into the recess of the coffee maker. By holding the adapter 30 at the top of the recess of the coffee maker, the lip 36 may allow the adapter 30 to avoid the needle of the coffee maker.

As shown in FIG. 2, the interior of the adapter 30 may include a hollow adapter needle 38 that acts as a fluid conduit between the recess 32 of the adapter 30 and the bottom of the adapter 30. The adapter needle 38 may have a sharp point at the top and be positioned to puncture the bottom portion of the sealed food grade paper container 10 when the sealed food grade paper container 10 is pressed down into the recess 32 of the adapter 30.

The adapter 30 may be made of a hard plastic such as polypropylene and may be manufactured by injection molding, with the adapter needle 38 made of a metal alloy such as stainless steel or carbon steel.

Figure 3:
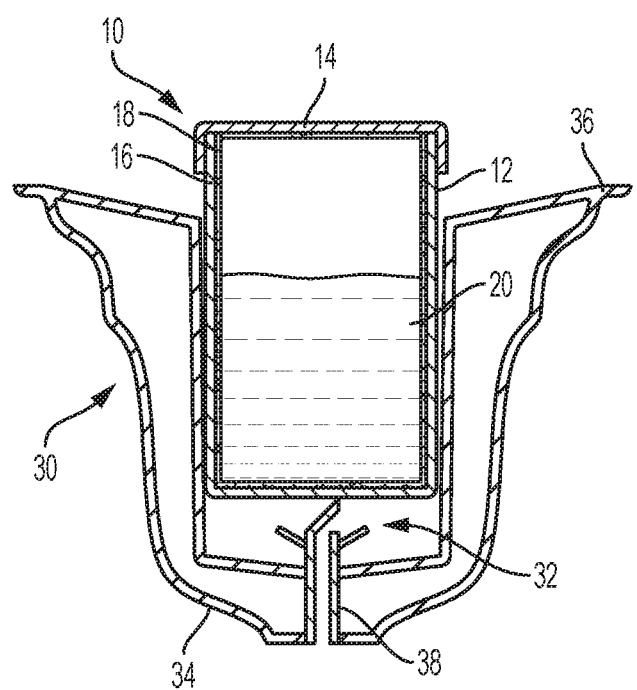
FIG. 3 is a cross-sectional view of the sealed food grade paper container and the adapter with the sealed food grade paper container placed inside the adapter.

FIG. 3 is a cross-sectional view of the sealed food grade paper container 10 and the adapter 30 with the sealed food grade paper container 10 placed inside the adapter 30. As shown in FIG. 3, the sealed food grade paper container 10 may fit snugly in the recess 32 of the adapter 30, with the recess 32 of the adapter 30 slightly larger than the sealed food grade paper container 10. In the case of a cylindrical sealed food grade paper container 10 and a cylindrical recess 32, the recess 32 may have an inner diameter that is slightly greater (e.g. 2-10 mm) than the exterior diameter of the sealed food grade paper container 10. When the sealed food grade paper container 10 is placed inside the recess 32 of the adapter 30, the sealed food grade paper container 10 may initially come to rest on top of the adapter needle 38 without being punctured. In this way, the sealed food grade paper container 10 may be positioned in the adapter 30 (before or after the adapter is placed inside the coffee maker) without prematurely releasing the liquid coffee concentrate 20 from the sealed food grade paper container 10.

FIGS. 4A and 4B are schematic representations of a coffee maker 50 including cross-sectional views of the sealed food grade paper container 10 placed inside the adapter 30 with the adapter 30 placed inside the coffee maker 50, with FIG. 4A showing the coffee maker 50 in an open position and FIG. 4B showing the coffee maker 50 in a closed position. In FIG. 4A, the sealed food grade paper container 10 is resting on top of the adapter needle 38 as in FIG. 3. Meanwhile, the entire adapter 30 is positioned inside a recess 52 of the coffee maker 50. The illustrated recess 52 is a K-Cup® holder as used in Keurig® coffee makers, including an exit needle part 54 (e.g. a Keurig® portion pack holder) and a funnel part 56. As can be seen, the adapter 30 is positioned in the recess 52 so as to avoid an exit needle 55 of the exit needle part 54. In the example of FIGS. 4A and 4B, the full height of the adapter 30 is great enough to extend down past the tip of the exit needle 55 while the lip 36 of the adapter 30 rests on the outside of the recess 52. In this example, the adapter 30 can still avoid the exit needle 55 due to its exterior contour having a sloped region 34 that slopes inward to avoid the exit needle 55 as shown.

In addition to the recess 52 (having the exit needle part 54 and the funnel part 56), the coffee maker 50 shown in FIGS. 4A and 4B has a lid 58 (see FIG. 4B), a water conduit 60, a pump 62, and a heater 64. The water conduit 60 provides water for making a cup of coffee. For example, water from a water source 61 may flow through the water conduit 60 and into the sealed food grade paper container 10 as described in more detail below. The water source 61 may be, for example, a fillable water tank of the coffee maker 60. The pump 62 may pump the water from the water source 61 to the sealed food grade paper container 10 via the water conduit 60, and the heater 64 may heat the water. For example, the heater 64 may heat the water while the water is at the water source 61 (e.g. in a water tank) or while the water is en route to the sealed food grade paper container 10 (e.g. as the water flows through piping or tubing or one or more heating tanks of the water conduit 60). Thus, the heater 64 may heat only the amount of water needed for an individual cup of coffee or may heat a larger batch of water. The heater 64 may be an electric heater that heats the water by Joule heating.

It is also contemplated that the water source 61 may be a connection to a cold water line of a building, similar to that used by a refrigerator that has a water dispenser or ice maker. In this case, the pump 62 may be omitted as the pressure in the water line is used to bring the water to the sealed food grade paper container 10 via the water conduit 60.

The lid 58 of the coffee maker 50 has an entrance needle 66 for piercing a hole in an upper portion of the sealed food grade paper container 10 while the sealed food grade paper container 10 is in the recess 52 of the coffee maker 50. The entrance needle 66 may be hollow and act as a part of the water conduit 60 (e.g. with an upper end of the entrance needle 66 connected to tubing or piping of the water conduit 60). In this way, the water from the water source 61 may flow through the water conduit 60 and into the sealed food grade paper container 10 through the tip of the entrance needle 66 after the entrance needle 66 punctures the hole in the sealed food grade paper container 10. To this end, the entrance needle 66 may have a sharp point at the bottom and be positioned to puncture the top portion of the sealed food grade paper container 10 when the lid 58 is pressed down onto the sealed food grade paper container 10 sitting into the recess 32 of the adapter 30. As the lid 58 is pressed down onto the sealed food grade paper container 10, a bottom face 68 of the lid 58 may abut against the sealed food grade paper container 10 to press the sealed food grade paper container 10 down into the recess 32 of the adapter 30. In this way, the action of the lid 58 may, in addition to causing the entrance needle 66 to pierce the upper portion of the sealed food grade paper container 10, cause the sealed food grade paper container 10 to press against the tip of the adapter needle 38 so that the adapter needle 38 punctures the lower portion of the sealed food grade paper container 10.

The adapter needle 38 may have an internal passage 40 with an inlet 42 near the point of the adapter needle 38 where the adapter needle 38 punctures the sealed food grade paper container 10 and an outlet 44 at the bottom of the adapter 30. When the adapter needle 38 punctures the sealed food grade paper container 10, a combination of the liquid coffee concentrate 20 and heated water may flow into the inlet 42, through the internal passage 40, and out of the outlet 44 and into the person's coffee cup where additional mixing of the liquid coffee concentrate 20 and heated water may occur. Just below the inlet 42, a gasket 46 may be provided to function as a seal around the adapter needle 38. The gasket 46 may prevent the liquid coffee concentrate 20 and heated water from escaping around the outside of the adapter needle 38 through the puncture hole created by the adapter needle 38. The gasket 46 may be angled upward so as to function as a funnel that directs any fluid leaving through the puncture hole into the inlet 42 of the internal passage 40 of the adapter needle 38. The gasket 46 may also function as a seal against the sealed food grade paper container 10. For example, the sealed food grade paper container 10 and adapter 30 may be designed so that the height of the sealed food grade paper container 10 below the protruding cap 14 matches the depth of the gasket 46 within the recess 32 of the adapter 30. More specifically, the gasket 46 may be made of a flexible material (e.g. rubber) that is capable of bending downward as the sealed food grade paper container 10 presses down on it, so as to remain in contact with the sealed food grade paper container 10 for a range of depths (spanning 1-5 mm, for example). The sealed food grade paper container 10 and adapter 30 may be designed so that the bottom of the sealed food grade paper container 10 falls within this range of depths when the protruding cap 14 rests on the adapter 30 outside the recess 32. In this way, it may be assured that the bottom of the sealed food grade paper container 10 presses against the gasket 46, with the gasket 46 functioning as a seal between the adapter needle 38 and the sealed food grade paper container 10. The gasket 46 may thus prevent the liquid coffee concentrate 20 and heated water from escaping around the outside of the adapter needle 38 and gasket 46 through the puncture hole created by the adapter needle 38.

FIGS. 5A and 5B are schematic representations of the coffee maker 50 including cross-sectional views of a sealed food grade paper container 10*a* placed inside an adapter 30*a* with the adapter 30*a* placed inside the coffee maker 50 according to another embodiment of the present disclosure, with FIG. 5A showing the coffee maker 50 in an open position and FIG. 5B showing the coffee maker 50 in a closed position. The coffee maker 50 may be the same as the coffee maker 50 described in relation to FIGS. 4A and 4B. FIGS. 5A and 5B differ from FIGS. 4A and 4B in the features of the sealed food grade paper container 10*a* and adapter 30*a*. The sealed food grade paper container 10*a* may be the same as the sealed food grade paper container 10 except that the exterior shell 16*a* of the sealed food grade paper container 10*a* includes one or more holes 17 in a lower portion thereof, with the interior coating 18 covering the one or more holes 17. The one or more holes 17 may be used to allow a mixture of liquid coffee concentrate 20 and heated water to burst out from the sealed food grade paper container 10 when preparing a serving of coffee. To this end, the adapter 30*a* may be the same as the adapter 30 except that the adapter 30*a* omits the adapter needle 38, including, in its place, a borehole 38*a* extending from the recess 32 of the adapter 30*a* to the bottom of the adapter 30*a*. The borehole 38*a* may be present in the adapter 30 as well, with the only difference being the presence of the adapter needle 38 filling the borehole 38*a* in the adapter 30.

As described above, water from the water source 61 may be pressurized by the pump 62 and heated by the heater 64 as it flows through the water conduit 60. When the heated and pressurized water flows from the water conduit 60 into the sealed food grade paper container 10*a*, the added heat and/or pressure of the water shooting into the sealed food grade paper container 10*a* and against the bottom of the sealed food grade paper container 10*a* may melt or otherwise degrade the interior coating 18 covering the one or more holes 17, allowing the combined water and liquid coffee concentrate 20 to flow out of the sealed food grade paper container 10*a* through the one or more holes 17. Along the same lines, instead of the one or more holes 17, the exterior shell 16*a* may have a kiss cut or other perforation or weakening in the lower portion thereof (preferably bottom exterior side), in the shape of a starburst for example. In this case, the pressure of the water shooting into the sealed food grade paper container 10*a* may blow out the exterior shell 16*a* itself, rather than only the interior coating 18. In either case, the combined water and liquid coffee concentrate 20 may then flow through the borehole 38*a* of the adapter 30*a* and down into the person's coffee cup. It should be noted that the pressure of water and/or steam required to burst through the interior coating 18 and/or exterior shell 16*a* of the sealed food grade paper container 10*a* should be less than the threshold pressure of any pressure shutoff switch of the pump 62.

In the case of the sealed food grade paper container 10*a* and adapter 30*a*, there is no adapter needle 38 that punctures the bottom of the sealed food grade paper container 10*a*. Therefore, there is no danger of premature puncturing by the adapter needle 38, and the sealed food grade paper container 10*a* may be completely inserted into the adapter 30*a* at an initial stage as shown in FIG. 5A without needing to be pressed farther into the recess 32 of the adapter 30*a* by the lid 58 of the coffee maker 50. That is, the sealed food grade paper container 10*a* may always come to rest with the protruding cap 14 against the top of the adapter 30*a* (preventing the sealed food grade paper container 10*a* from falling too far into the recess 32 of the adapter 30*a*) as shown in FIG. 5A, never in an elevated position resting on the adapter needle 38 as in the case of the sealed food grade paper container 10 and adapter 30 as shown in FIG. 4A.

FIGS. 6A and 6B are schematic representations of the coffee maker 50 including cross-sectional views of a sealed food grade paper container 10*b* placed inside an adapter 30*b* with the adapter 30*b* placed inside the coffee maker 50 according to another embodiment of the present disclosure, with FIG. 6A showing the coffee maker 50 in an open position and FIG. 6B showing the coffee maker 50 in a closed position. The coffee maker 50 may be the same as the coffee maker 50 described in relation to FIGS. 4A and 4B. FIGS. 6A and 6B differ from FIGS. 4A and 4B in the features of the sealed food grade paper container 10*b* and adapter 30*b*. The sealed food grade paper container 10*b* may be the same as the sealed food grade paper container 10 except that, unlike the body 12 of the sealed food grade paper container 10, the body 12*b* of the sealed food grade paper container 10*b* has a rounded bottom 13*b*. In other respects, the body 12*b* may be the same as the body 12 and may be, for example, generally cylindrical like the body 12. The rounded bottom 13*b* may advantageously act as a funnel within the sealed food grade paper container 10*b*, aiding the flow of all of the liquid coffee concentrate 20 and heated water contained in the sealed food grade paper container 10*b* to the same part of the sealed food grade paper container 10*b* for efficient flow out of the sealed food grade paper container 10*b*. For example, if the adapter needle 38 is positioned to puncture the center of the sealed food grade paper container 10*b*, the rounded bottom 13*b* may be structured to funnel the contents of the sealed food grade paper container 10*b* to a point at the center of the sealed food grade paper container 10*b* where a hole is punctured by the adapter needle 38. Similarly, in a case where there is no adapter needle 38 and the sealed food grade paper container 10*b* has holes 17 or other burst-through mechanism like the sealed food grade paper container 10*a* of FIGS. 5A and 5B, the rounded bottom 13*b* may be structured to funnel the contents of the sealed food grade paper container 10*b* to the vicinity of the one or more holes 17 or other mechanism. The rounded bottom 13*b* may also allow for easy manufacture of the sealed food grade paper container 10*b*, e.g., as it may be produced from a single sheet of material. The rounded bottom 13*b* may be half-spherical or exhibit any other curvature. The rounded bottom 13*b* may include portions that are not curved, such as a central flat portion allowing the sealed food grade paper container 10*b* to be placed upright without falling over.

The sealed food grade paper container 10*b* may also differ from the sealed food grade paper container 10 in that the sealed food grade paper container 10*b* may have a protruding film 14*b* in place of the protruding cap 14. The protruding film 14*b* may be made of an easily puncturable material such as aluminum foil or a laminate of aluminum foil and paper or plastic, which may cause the entrance needle 66 of the coffee maker 50 to degrade less quickly as it is repeatedly used to pierce sealed food grade paper containers 10*b*.

The protruding film 14b may obviate the need for the interior coating 18 to extend beyond the body 12b (e.g. to the protruding cap 14 described above), as the protruding film 14b itself may be made of a material that is resistant to degradation caused by the liquid coffee concentrate 20. The protruding film 14b may also allow for easy manufacture of the sealed food grade paper container 10b, e.g. as the protruding film 14b may be produced as a single sheet and without folded portions.

The adapter 30b may be the same as the adapter 30 or the adapter 30a. The adapter 30b shown in FIGS. 6A and 6B differs from the adapter 30 and 30a to illustrate some modifications in design that may be applied to any of the adapters 30, 30a, 30b. For example, the adapter 30b has an annular depression 31 around the recess 32 in place of a sloping region of the adapters 30 and 30a. The depression 31 is especially useful in the case of the sealed food grade paper container 10b because the protruding film 14b may have much less height than the protruding cap 14. Without the depression 31, it might be difficult to retrieve the sealed food grade paper container 10b from the recess 32 of the adapter 30b after use, since the protruding film 14b might be almost flush against the top of the adapter 30b. The depression 31 provides a place for a person's finger to go when grabbing the sealed food grade paper container 10b, making retrieval of the sealed food grade paper container 10b from the adapter 30b easier. The adapter 30b also illustrates an example in which the overall reduced height of the adapter 30b relative to the recess 52 of the coffee maker 50, rather than the exterior contour of the adapter 30b having a sloped or stepped region 34, may be used to avoid the exit needle 55 of the coffee maker 50.

FIGS. 7A and 7B are schematic representations of the coffee maker 50 including cross-sectional views of a sealed food grade paper container 10c placed inside an adapter 30c with the adapter 30c placed inside the coffee maker 50 according to another embodiment of the present disclosure, with FIG. 7A showing the coffee maker 50 in an open position and FIG. 7B showing the coffee maker 50 in a closed position. The coffee maker 50 may be the same as the coffee maker 50 described in relation to FIGS. 4A and 4B. FIGS. 7A and 7B differ from FIGS. 4A and 4B in the features of the sealed food grade paper container 10c and adapter 30c. The sealed food grade paper container 10c and adapter 30c may be the same as the sealed food grade paper container 10 and adapter 30a except that, as shown in FIGS. 7A and 7B, the sealed food grade paper container 10c and adapter 30c may be shaped to take advantage of the existing exit needle 55 of the exit needle part 54 of the coffee maker 50. As such, rather than having a sloped region 34 that slopes inward to avoid the exit needle 55 as described in relation to FIGS. 4A and 4B, the exterior contour of the adapter 30c may remain wide enough in the vicinity of the exit needle 55 so as to allow the exit needle 55 to extend into a borehole 38c of the adapter 30c. In this regard, the borehole 38c may be structurally the same as the borehole 38a described in relation to FIGS. 5A and 5B, with the difference being its positioning in relation to the exit needle 55.

With the borehole 38c positioned to correspond to the exit needle 55, which is off-center, the recess 32c may similarly be provided off-center in the adapter 30c. More particularly, the recess 32c may have a shape that is off-center toward the bottom while being centered in the adapter 30c toward the top. As shown in FIGS. 7A and 7B, for example, the recess 32c may have a generally upside-down L-shaped profile that diminishes in cross-sectional area from the top to the bottom of the adapter 30c. By providing such an adapter 30c, a correspondingly shaped sealed food grade paper container 10c may be placed in the recess 32c such that the top of the sealed food grade paper container 10c may be punctured by a central entrance needle 66 and the bottom of the sealed food grade paper container 10c may be punctured by an off-center exit needle 55. In this way, both the needles 66, 55 of the existing coffee maker 50 may be used and the adapter needle 38 is not required. Heated water may flow from the water conduit 60 into the sealed food grade paper container 10c through the entrance needle 66, and the combined heated water and liquid coffee concentrate 20 may flow out of the sealed food grade paper container 10c through the exit needle 55 and down into the person's coffee cup. More specifically, the exit needle 55 may have an internal passage 70 with an inlet 72 near the point of the exit needle 55 where the exit needle 55 punctures the sealed food grade paper container 10c and an outlet 74 that feeds into the funnel part 56 of the coffee maker 50. When the exit needle 55 punctures the sealed food grade paper container 10c, a combination of the liquid coffee concentrate 20 and heated water may flow into the inlet 72, through the internal passage 70, and out of the outlet 74. Just below the inlet 72, a gasket 76 may be provided to function as a seal around the exit needle 55 in the same way that the gasket 46 may function as a seal around the adapter needle 38.

FIGS. 8A and 8B are schematic representations of a coffee maker 50d including cross-sectional views of the sealed food grade paper container 10 of FIGS. 1-4B placed inside the coffee maker 50d without an adapter 30, with FIG. 8A showing the coffee maker 50d in an open position and FIG. 8B showing the coffee maker 50d in a closed position. The coffee maker 50d may differ from the coffee maker 50 described above in that the coffee maker 50d may be specifically designed for use with the sealed food grade paper container 10, i.e. with no adapter 30 necessary. In this regard, the coffee maker 50d may be the same as the coffee maker 50 in all respects except for the recess 52. Whereas the recess 52 includes an exit needle part 54 with an off-center exit needle 55, the recess 52d of FIGS. 8A and 8B includes an exit needle part 54d with an exit needle 55d that is located in the center. The recess 52d may further include a funnel part 56d that is the same as the funnel part 56 except that it is designed to align with the centered exit needle 55d of the exit needle part 54d rather than the off-center exit needle 55 of the exit needle part 54. The recess 52d may further differ from the recess 52 in that it may have a generally smaller interior than the recess 52 of an existing coffee maker 50 (e.g. a Keurig® coffee maker). This is because, as described above, the sealed food grade paper container 10 may be significantly smaller than a single-serve ground coffee container like a Keurig® K-Cup® pod. In use, heated water may flow from the water conduit 60 into the sealed food grade paper container 10 through the entrance needle 66, and the combined heated water and liquid coffee concentrate 20 may flow out of the sealed food grade paper container 10 through the exit needle 55d and down into the person's coffee cup.

Alternatively, the coffee maker 50d may omit the exit needle 55d, having only a borehole similar to the borehole 38a but extending downward from the recess 52d of the coffee maker 55d rather than from the recess 32 of the adapter 30a. Such a modified coffee maker 55d could be used with the sealed food grade paper container 10a having the one or more holes 17. The combined liquid coffee concentrate 20 and heated water may burst from the sealed food grade paper container 10 as the interior coating 18 covering the one or more holes 17 melts (or as the sealed food grade paper container 10 itself bursts open as described above), thereafter flowing down through the borehole 38a and into the person's coffee cup.

In the example of the dedicated coffee maker 50d of FIGS. 8A and 8B, a funnel part 56d is included, corresponding to the funnel part 56 of the coffee maker 50 of FIGS. 4A-7B. The funnel part 56 of FIGS. 4A-7B is a feature some existing coffee makers (e.g. Keurig® coffee makers) and therefore is depicted in FIGS. 4A-7B, which may represent embodiments in the context of existing coffee makers. On the other hand, the coffee maker 50d shown in FIGS. 8A and 8B represents a coffee maker 50d that is designed for use with the sealed food grade paper containers 10, 10a, etc. of the present disclosure. Thus, the funnel part 56d can be omitted.

FIGS. 9A and 9B are schematic representations of the coffee maker 50 of FIGS. 4A-7B, including cross-sectional views of a food grade paper container 10e placed inside the coffee maker 50 without an adapter 30, with FIG. 9A showing the coffee maker 50 in an open position and FIG. 9B showing the coffee maker 50 in a closed position. The food grade paper container 10e may be a reusable container rather than a disposable container and may differ from the food grade paper container 10, 10a, etc. described above in several respects. First, the food grade paper container 10e may have an open or openable top 78 in place of a sealing cap 14 or film 14b. As shown in FIGS. 9A and 9B, for example, the top 78 of the food grade paper container 10e may contain a central opening 80, but it is also contemplated that the top 78 may be openable, e.g. by a hinge. Second, the food grade paper container 10e may have a pressure relief valve 82 at the bottom. The pressure relief valve 82, illustrated schematically in FIGS. 9A and 9B, may be of any known construction that is capable of opening in response to a buildup of pressure in the food grade paper container 10e or in the bottom region thereof. In a simple construction, the pressure relief valve 82 may be a flap or door that is biased in a closed position to seal against the food grade paper container 10e and opens downward when pushed from above. Third, the overall size and shape of the food grade paper container 10e may be somewhat larger than that of the food grade paper container 10, 10a, etc. described above and may, for example, be shaped and sized similarly to a Keurig® K-Cup® pod or other single-serve ground coffee container and designed to fit directly in an exit needle part 54 (e.g. a Keurig® portion pack holder) of the recess 52 of the coffee maker 50 without an adapter 30 similar to how the adapter 30 fits in the exit needle part 54 in FIGS. 4A and 4B. For example, an outwardly extending lip 84 of the food grade paper container 10e may function just like the lip 36 to allow the food grade paper container 10e to rest on the exit needle part 54 of the coffee maker 50 without falling in or touching the needle 55. Since the food grade paper container 10e may be reusable and not disposable, there is less concern about trash than in the case of the food grade paper container 10, 10a, etc. and it is not as important to achieve a small size.

When a person wishes to use the food grade paper container 10e, he/she may pump (e.g. from a pump bottle) or otherwise dispense liquid coffee concentrate 20 into the food grade paper container 10e through the top 78 (e.g. via the opening 80). The person may then place the food grade paper container 10e inside the recess 52 of the coffee maker 50 as shown in FIG. 9A and lower the lid 58 of the coffee maker 50 as shown in FIG. 9B. Heated water may then flow from the water conduit 60 into the food grade paper container 10e through the entrance needle 66, and the combined heated water and liquid coffee concentrate 20 may flow out of the food grade paper container 10e through the valve 82 and down into the person's coffee cup. In this regard, the valve 82 may be configured to remain closed under the pressure of the liquid coffee concentrate 20 (i.e. after dispensing liquid coffee concentrate 20 into the reusable food grade paper container 10D) and to open under the pressure of the flow of water from the water conduit 60. It should also be noted that the pressure of water and/or steam required to open the pressure relief valve 82 should be less than the threshold pressure of any pressure shutoff switch of the pump 62. When the coffee making process is completed, it may be unnecessary to clean the food grade paper container 10e, as the heated water from the coffee maker 50 may sufficiently clean the inside of the food grade paper container 10e as the water flows through the reusable food grade paper container 10e. Thus, one may immediately reuse the food grade paper container 10e.

Figure 10B:
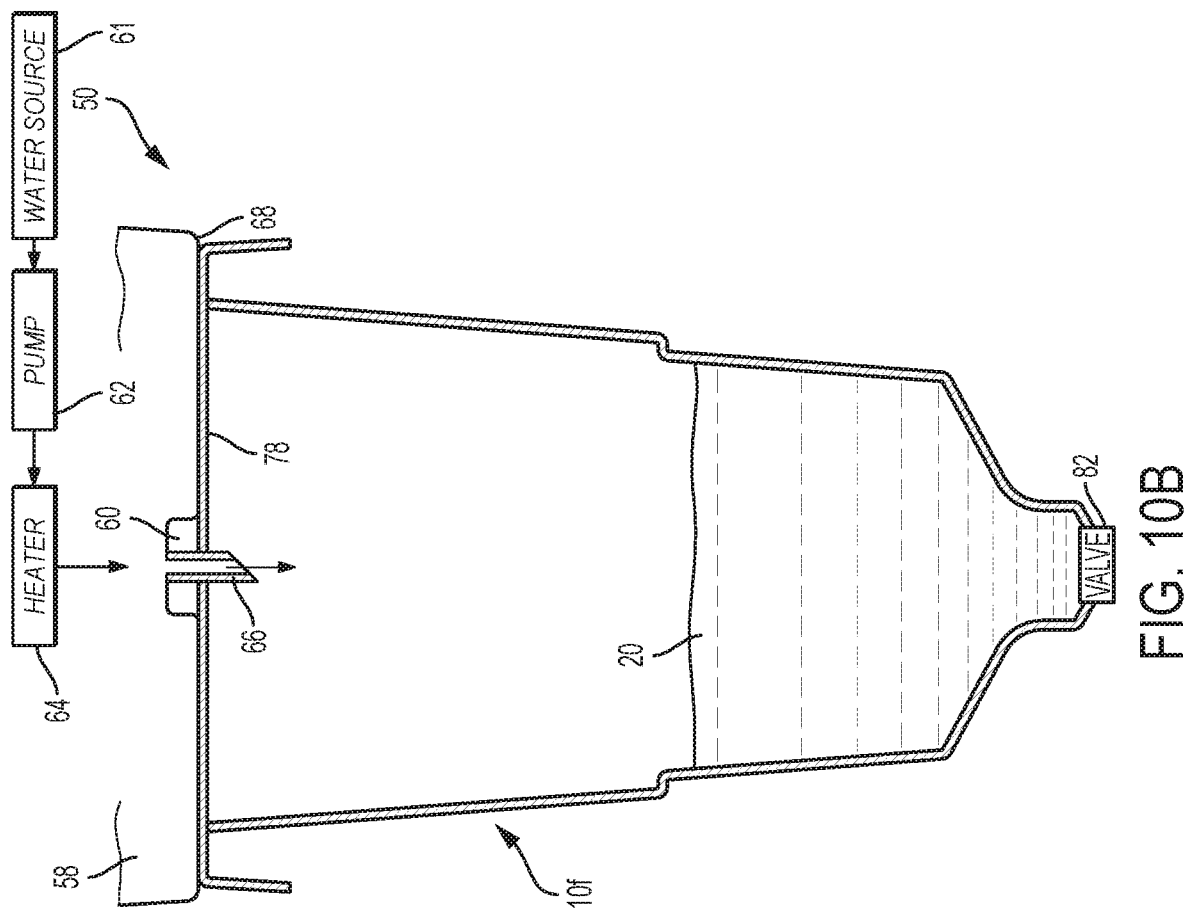
FIGS. 10A and 10B are schematic representations of the coffee maker of FIGS. 4A-7B, 9A, and 9B including cross-sectional views of another reusable food grade paper container placed inside the coffee maker without an adapter, with FIG. 10A showing the coffee maker in an open position and FIG. 10B showing the coffee maker in a closed position.
Figure 10A:
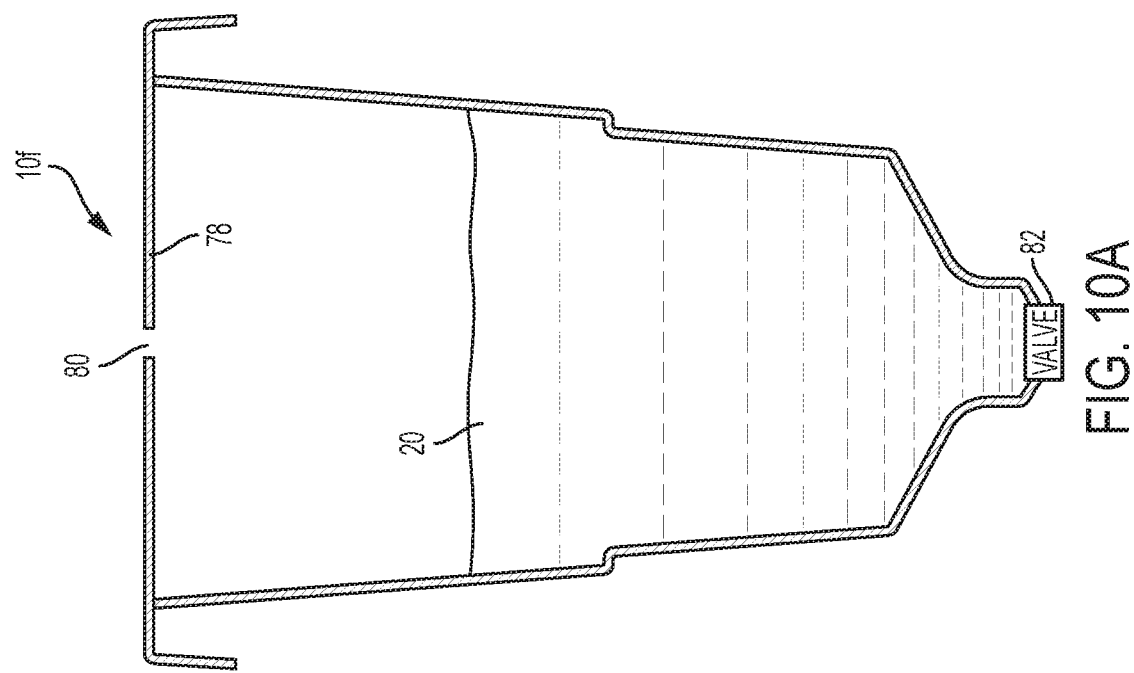

FIGS. 10A and 10B are schematic representations of the coffee maker 50 of FIGS. 4A-7B, 9A, and 9B, including cross-sectional views of another food grade paper container 10f placed inside the coffee maker 50 without an adapter 30, with FIG. 10A showing the coffee maker 50 in an open position and FIG. 10B showing the coffee maker 50 in a closed position. The food grade paper container 10f may be the same as the food grade paper container 10e and may similarly be reusable, except that the food grade paper container 10f may be shaped and sized similarly to an exit needle part 54 (e.g. a Keurig® portion pack holder) of the recess 52 of the coffee maker 50. Thus, in a case where the coffee maker 50 is a Keurig® coffee maker, an example of the shape and size of the food grade paper container 10f is the My K-Cup® reusable coffee filter by Keurig®. Like the food grade paper container 10e, since the food grade paper container 10f may be reusable and not disposable, there is less concern about trash than in the case of the food grade paper container 10, 10a, etc. and it is not as important to achieve a small size.

When a person wishes to use the food grade paper container 10f, he/she may pump (e.g. from a pump bottle) or otherwise dispense liquid coffee concentrate 20 into the food grade paper container 10f through the top 78 (e.g. via the opening 80). The person may then replace the exit needle part 54 and funnel part 56 of the coffee maker 50 with the food grade paper container 10f as shown in FIGS. 9A and 9B (e.g. in the case of a Keurig® coffee maker 50, the Keurig® portion pack holder may be pushed up from below and removed, and the food grade paper container 10f may be placed in the resulting recess just like a My K-Cup® reusable coffee filter). With the lid 58 of the coffee maker 50 lowered as shown in FIG. 10B, heated water may then flow from the water conduit 60 into the food grade paper container 10f through the entrance needle 66, and the combined heated water and liquid coffee concentrate 20 may flow out of the food grade paper container 10f through the valve 82 and down into the person's coffee cup. As in the case of the food grade paper container 10e, when the coffee making process is completed, it may be unnecessary to clean the food grade paper container 10f, as the heated water from the coffee maker 50 may sufficiently clean the inside of the food grade paper container 10f as the water flows through the reusable food grade paper container 10f.

In the above examples, water and liquid coffee concentrate 20 (and combined water and liquid coffee concentrate 20) are described as flowing through hollow needles 38, 55, 55d, 66. However, it is also contemplated that the needle 38, 55, 55d, 66 may instead only pierce the sealed food grade paper container 10, 10a, etc. without additionally functioning as a conduit for the water and/or liquid coffee concentrate 20. For example, the needle 38, 55, 55*d*, 66 may retract subsequent to puncturing the sealed food grade paper container 10, 10*a*, etc. or be structured to allow the water and/or liquid coffee concentrate 20 to flow adjacent to or around the outside of the needle 38, 55, 55*d*, 66.

In the above examples, the top and bottom of the water and/or liquid coffee concentrate 20 enters or exits the sealed food grade paper container 10, 10*a*, etc. through the top or bottom of the sealed food grade paper container 10, 10*a*, etc. Other points of entry or exit are also contemplated, such as the side.

In the above examples, generally cylindrical shapes are depicted for the sealed food grade paper container 10, 10*a*, etc. However, other shapes are contemplated as well, such as balls, boxes, etc., and it is contemplated that adapters 30, 30*a*, etc. may be designed to accommodate such shapes. It is similarly envisioned that the exterior of the adapter 30, 30*a*, etc. may be designed to fit inside any single-serve coffee maker, e.g. coffee makers by Keurig®, Nespresso®, Mr. Coffee®, Cuisinart®, Presto® MyJo™, Bunn®, etc., and may be designed to fit universally inside more than one coffee maker.

The present disclosure further encompasses various embodiments of systems and methods for preparing an individual serving of coffee using a formed (e.g. molded or otherwise given some shape on a scale larger than a particle or granule) soluble coffee product. A person wishing to make a single serving of coffee takes a food grade paper container 110 and places it in a coffee maker 200. Before or after placing the food grade paper container 110 in the coffee maker 200, the person may place one or more formed soluble coffee products 120 in the food grade paper container 110, optionally along with one or more formed soluble flavor or creamer additive products (throughout this disclosure, descriptions/drawings of formed soluble coffee products 120 may also describe/represent formed soluble flavor or creamer additive products). Unlike single-serve ground coffee containers like Keurig® K-Cup® pods or Nespresso® capsules, the person may thus mix and match coffees, flavors, etc. to suit his/her taste and desired coffee strength. The person may then close the food grade paper container 110 with a cap 118 having an orifice 119. The coffee maker 200 may be a Keurig®, Nespresso®, or other coffee maker that is designed to be used with single-serve ground coffee containers. The person then closes the lid 230 of the coffee maker 50 down on the food grade paper container 110, causing a needle 220 of the coffee maker 200 to enter the orifice 119 of the cap 118 and allowing heated water to flow into the food grade paper container 110 through the orifice 119. The heated water may flow against, around, and between the formed soluble coffee product(s) 120 and any additive products in the food grade paper container 110, and the combined soluble coffee etc. and heated water may flow out of the food grade paper container 110 through holes 114 and into the person's coffee cup. As in the case of the food grade paper containers 10*e* and 10*f*, when the coffee making process is completed, it may be unnecessary to clean the food grade paper container 110, as the heated water from the coffee maker 200 may sufficiently clean the inside of the food grade paper container 110 as the water flows through the food grade paper container 110. Afterward, the food grade paper container 110 may immediately be reused and need not be taken out of the coffee maker 200. Unlike using Keurig® K-Cup® pods or Nespresso® capsules, using the food grade paper container 110 produces no waste.

Figure 11A:
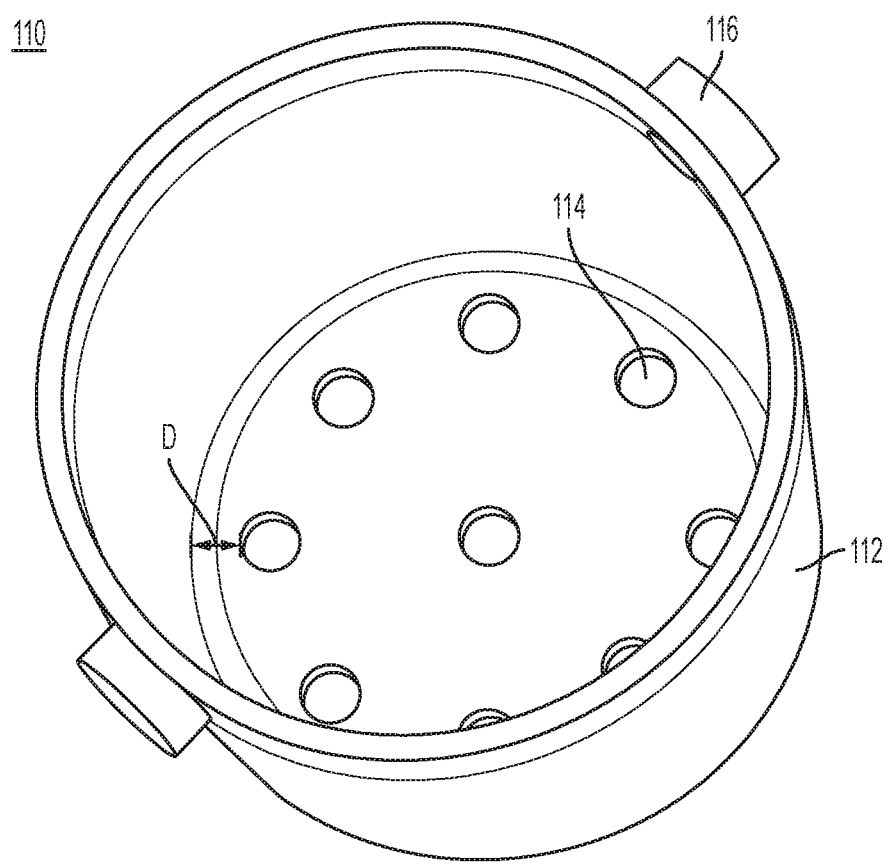
FIGS. 11A, 11B, and 11C are perspective, side, and top views, respectively, of a food grade paper container for holding a formed soluble coffee product according to an embodiment of the present disclosure.
Figure 11B:
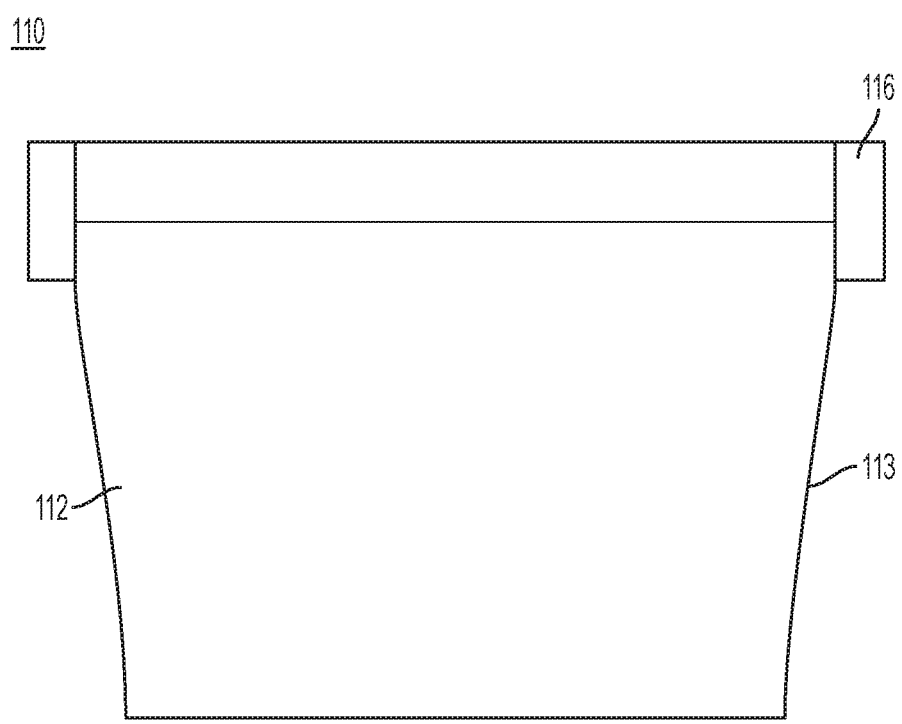
Figure 11C:
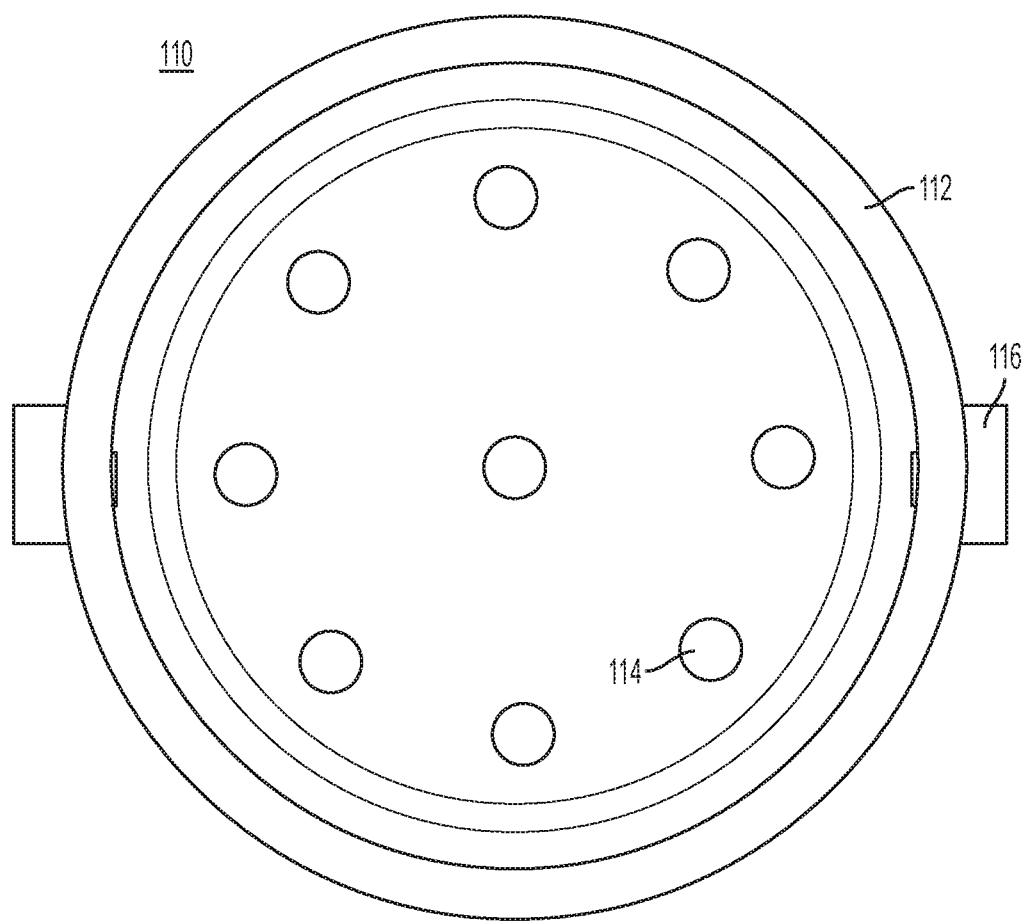

FIGS. 11A, 11B, 11C are a perspective view, a side view, and a top view, respectively, of a food grade paper container 110 according to an embodiment of the present disclosure. The food grade paper container 110 may be filled with one or more formed soluble coffee products 120 (see FIGS. 13B, 14A, 14B, and 15) and closed with a cap 118 (see FIGS. 12A, 12B, 13C, 14A, and 14B), with each formed soluble coffee product 120 containing an amount of soluble coffee for the preparation of an individual serving of coffee, e.g. 1 teaspoon of soluble coffee. The food grade paper container 110 may have a generally cylindrical body 112 as shown with one or more stoppers 116 that extend laterally outward from the food grade paper container 110 in an upper portion thereof relative to the body 112 (e.g. by 2-10 mm). When the food grade paper container 110 is inserted into the recess 210 of the coffee maker 200 (see FIG. 13A), the body 112 of the food grade paper container 110 may fit inside the recess 210 while the stoppers 116 do not fit inside the recess 210. In this way, the stoppers 116 may prevent the food grade paper container 110 from being inserted too far into the recess 210 of the coffee maker 200 and may provide a convenient handhold for a person removing the food grade paper container 110 from the coffee maker 200. The stoppers 116 may be a separate piece as shown in FIGS. 11A and 11C (e.g. attached by adhesive or a rivet or other fastener) or may be integrally formed with the body 112 of the food grade paper container 110 (see FIGS. 14A and 14B).

Like the sealed food grade paper container 10 described above, the food grade paper container 110 may be made of a recyclable or biodegradable material or combination of materials (and may be made by the same manufacturing methods). However, since the food grade paper container 110 may be reusable and the moldable soluble coffee product is completely dissolved after the coffee is made, no trash is generated when using the soluble coffee product. Therefore, the food grade paper container 110 may alternatively be made of a material that is not recyclable or biodegradable, such as plastics including non-recyclable plastics. For example, the body 112 (including stopper 116) and cap 118 of the food grade paper container 110 may be made of a hard plastic such as polypropylene and may be manufactured by injection molding.

The overall capacity of the food grade paper container 110 may be great enough to contain one or more of the formed soluble coffee products 120 and/or formed soluble flavor or creamer additive products. Depending on the coffee maker 200 that the food grade paper container 110 is to be used with, multiple size settings may be available for dispensing different amounts of heated water (e.g. small, medium, and large). In some cases, a user of the food grade paper container 110 may want a large cup of coffee without sacrificing coffee strength and may therefore desire to place more formed soluble coffee products 120 in the food grade paper container 110 when using larger size settings. The user may further wish to add formed soluble flavor and/or creamer additive products to suit his/her taste. Due to the absence of a filter in the food grade paper container 110 (unlike a Keurig® K-Cup® pod) and the concentrated nature of soluble coffee, the food grade paper container 110 can be relatively large compared to the size of an individual formed soluble coffee product 120 while the formed soluble coffee product 120 is still large enough to contain an amount suitable for a single cup of coffee. In this way, the food grade paper container 110 may be sized to fit three, four, five, six, or more formed soluble coffee products 120 and/or formed soluble additive products. The capacity of the food grade paper container 110 may range from a minimum capacity needed to contain a single formed soluble coffee product 120 (e.g. 5 mL, but may be lower depending on the concentration of the formed soluble coffee product 120 and the desired strength of the coffee) up to a maximum capacity depending on the size of the coffee maker that the food grade paper container 110 will be used with. For example, if the food grade paper container 110 will be inserted in a Keurig® coffee maker, a relatively large food grade paper container 110 may have a capacity of around 40 mL. In the interest of maximizing the size of the food grade paper container 110 to allow for multiple formed soluble coffee products 120 and additive products, the capacity of the food grade paper container 110 may be greater than 20 mL, preferably greater than 25 mL, more preferably greater than 30 mL.

Accounting for the material(s) of the food grade paper container 110 itself, the food grade paper container 110 may have an exterior volume that is slightly greater than its capacity, where the exterior volume is defined as the total volume of liquid displaced when the food grade paper container 110 is submerged in the liquid. Such exterior volume may similarly range between low values around 5 mL and relatively high values around 40 mL, with the exterior volume greater than the capacity of the food grade paper container 110 by an amount defined by the volume displaced by the material(s) of the food grade paper container 110.

The exterior of the food grade paper container 110 may be shaped to fit inside an existing coffee maker 200 in the same way that a single-serve ground coffee container fits inside the coffee maker 200. Thus, for example, the exterior of the food grade paper container 110 may be shaped like a Keurig® K-Cup® pod, a Nespresso® capsule, etc., depending on which existing coffee maker 200 the food grade paper container 110 is designed for. It is also contemplated that the food grade paper container 110 may be designed to universally match two or more such existing coffee makers (e.g. by matching a height dimension of one and a width dimension of another).

In some cases, an existing coffee maker 200 may have a needle 215 (see FIGS. 14A and 14B) positioned to pierce a lower portion of a single-serve ground coffee container. For example, a Keurig® coffee maker may have a part known as a K-Cup® holder that functions as a recess 210 for receiving a K-Cup® pod, and the K-Cup® holder may have a part known as an exit needle 215 that is positioned to pierce the bottom of the K-Cup® pod at a peripheral region of the K-Cup® pod. The food grade paper container 110 may be shaped so as to avoid touching or pressing hard against such needle 215 as shown in FIGS. 14A and 14B. In this regard, the food grade paper container 110 may have a reduced height relative to the recess 210 of the coffee maker 200, so as not to extend deeply enough into the recess to reach the needle 215, or the food grade paper container 110 may have an exterior contour with a sloped or stepped region 113 (see FIG. 11B) in a lower portion thereof that slopes or steps inward to avoid the needle 215. The outer diameter at the bottom of the food grade paper container 110 may be about 70-95% of the outer diameter at the top of the food grade paper container 110 (excluding the stoppers 116), more preferably 80-90%. For example, the outer diameter at the bottom of the food grade paper container 110 may be around 3.5-4.0 cm while the outer diameter at the top of the food grade paper container 110 is around 4.0-4.5 cm. In addition to helping to avoid the needle 215, such reduced diameter at the bottom of the food grade paper container 110 may make it easier to insert the food grade paper container 110 into the coffee maker 200. Such reduced height and/or sloped or stepped region 113 may symmetrically define the exterior of the food grade paper container 110 or may occur only in a portion of the food grade paper container 110, e.g. as a dedicated slot to receive the needle 215. In combination with the stoppers 116 described above, the reduced height and/or sloped or stepped region 113 may prevent the food grade paper container 110 from being inserted too far into the recess 210 of the coffee maker 200 and may allow the food grade paper container 110 to avoid the needle 215.

As shown in FIGS. 11A, 11C, 13A, 14A, and 14B, the food grade paper container 110 may have one or more holes 114 in a lower portion (e.g. a lower half, quarter, etc.) thereof. The one or more holes 114 may be used to allow a mixture of soluble coffee and heated water to flow out from the food grade paper container 110 as the heated water dissolves the formed soluble coffee product 120. Because the formed soluble coffee product 120 should remain inside the food grade paper container 110 until it is dissolved, the one or more holes 114 are sized to prevent the formed soluble coffee product 120 from passing therethrough when the formed soluble coffee product 120 is placed in the food grade paper container 110. The size (e.g. diameter) of each hole 114 may be, for example, 0.5 to 5 millimeters, preferably 1 to three millimeters, more preferably 1.5 to 2.5 millimeters. If the one or more holes 114 are too small, the flow of dissolved coffee and heated water out of the food grade paper container 110 will be prevented or slowed. The number of holes 114 may range upward from 1 hole, with a greater number of holes used in the case of smaller holes and with fewer holes used in the case of larger holes. For example, in the case of 2 mm diameter holes, there may be 4 to 14 holes, more preferably 8 to 10 holes. In order to avoid pooling of liquid against the wall of the food grade paper container 110, the distance D (see FIG. 11A) between one or more of the holes 114 and the wall of the food grade paper container 110 may be under 10 mm, preferably under 5 mm, and may be equal to 0 (i.e. one or more of the holes 114 are located at the wall).

Figure 12A:
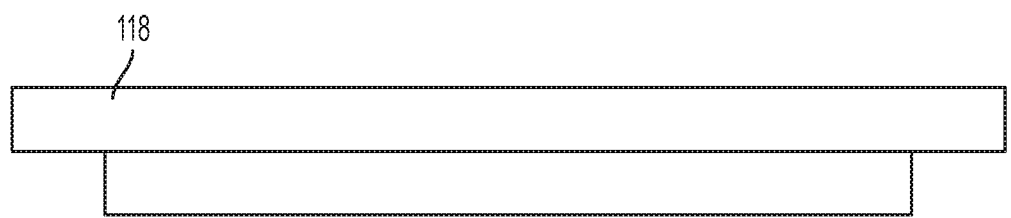
FIGS. 12A and 12B are side and top views, respectively, of a cap that fits on the food grade paper container of FIGS. 11A, 11B, and 11C.
Figure 12B:
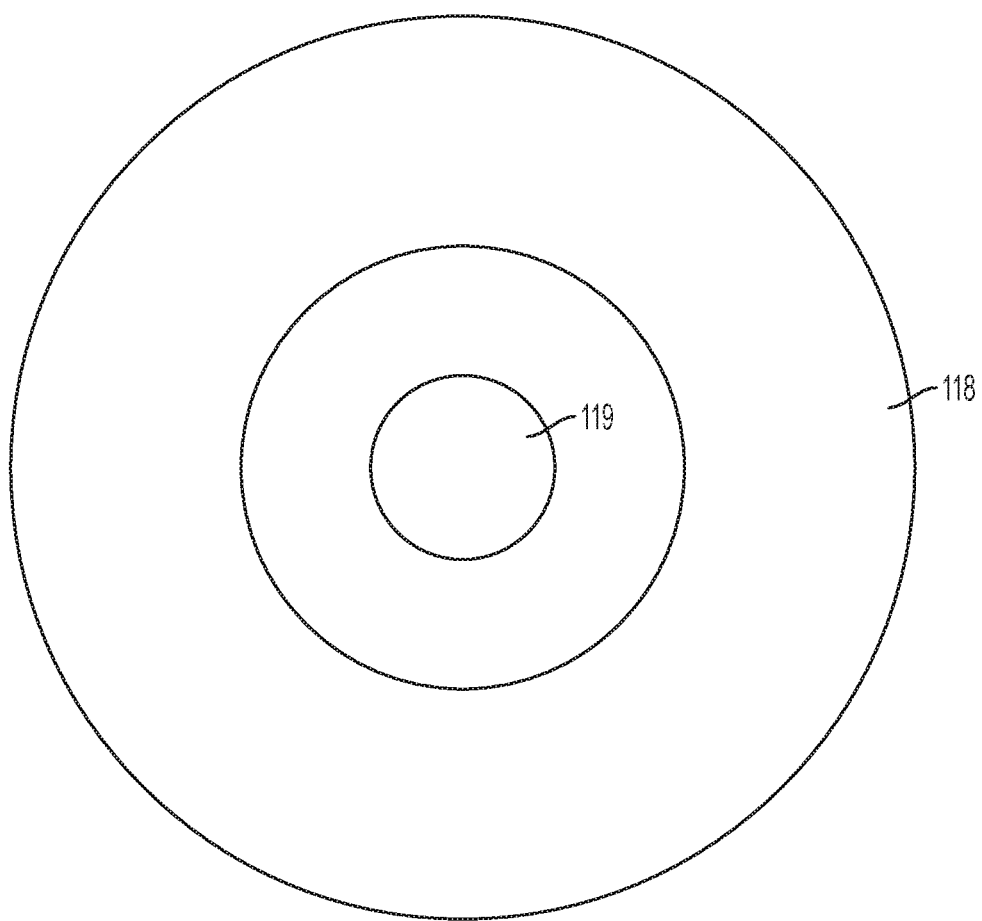

As shown in FIGS. 12A and 12B, the cap 118 may have a circular shape to fit on a cylindrical food grade paper container 110, with an orifice 119 in the middle thereof. The cap 118 may have a stepped structure in which only a reduced-diameter lower part of the cap 118 fits within the interior of the food grade paper container 110 to produce a snug fit between the food grade paper container 110 and the cap 118. It is also contemplated that the cap 118 may be attached to the food grade paper container 110 by a hinge.

Figure 13A:
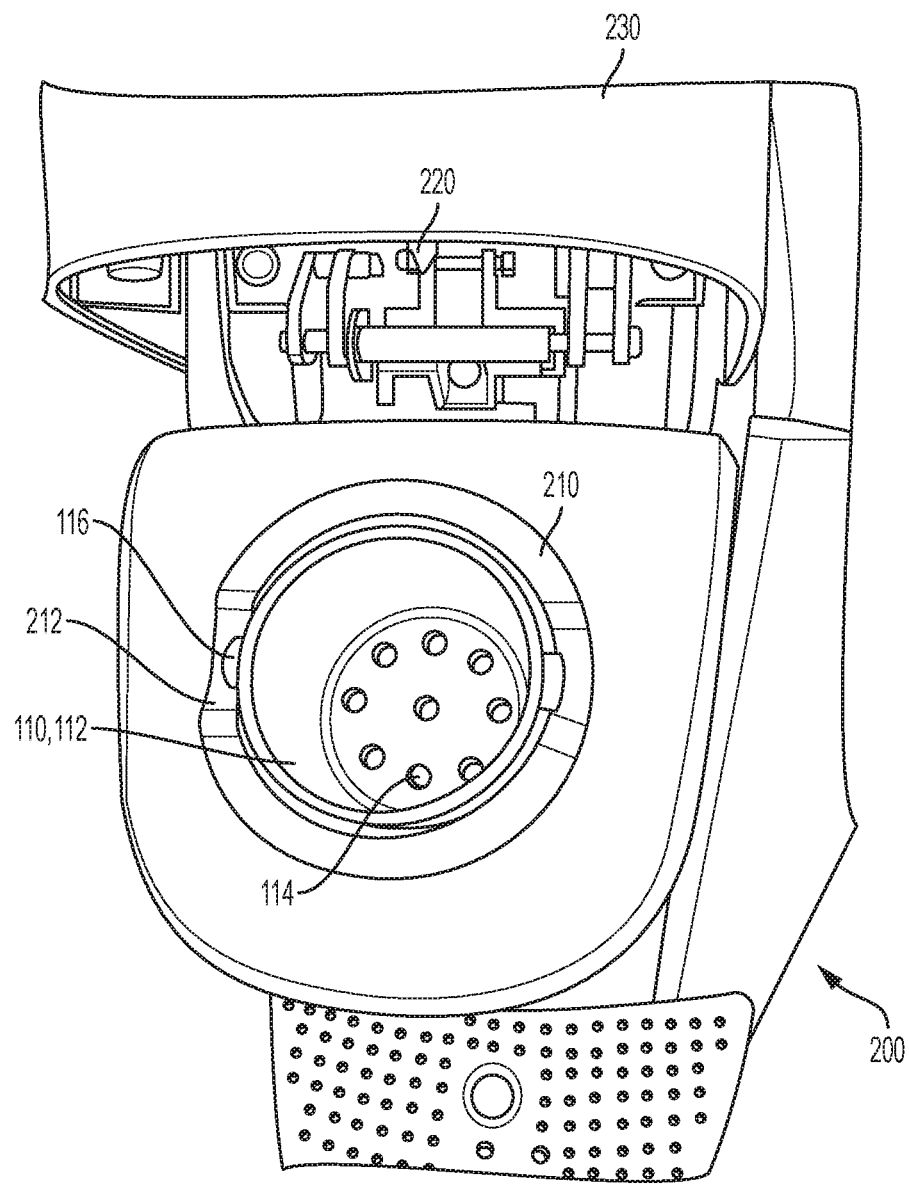
FIGS. 13A, 13B, and 13C are perspective views of a coffee maker with the food grade paper container of FIGS. 11A, 11B, and 11C placed in a recess thereof, showing, in sequence, the food grade paper container placed in the coffee maker, a formed soluble coffee product placed in the food grade paper container, and the cap placed on the food grade paper container, respectively.
Figure 13B:
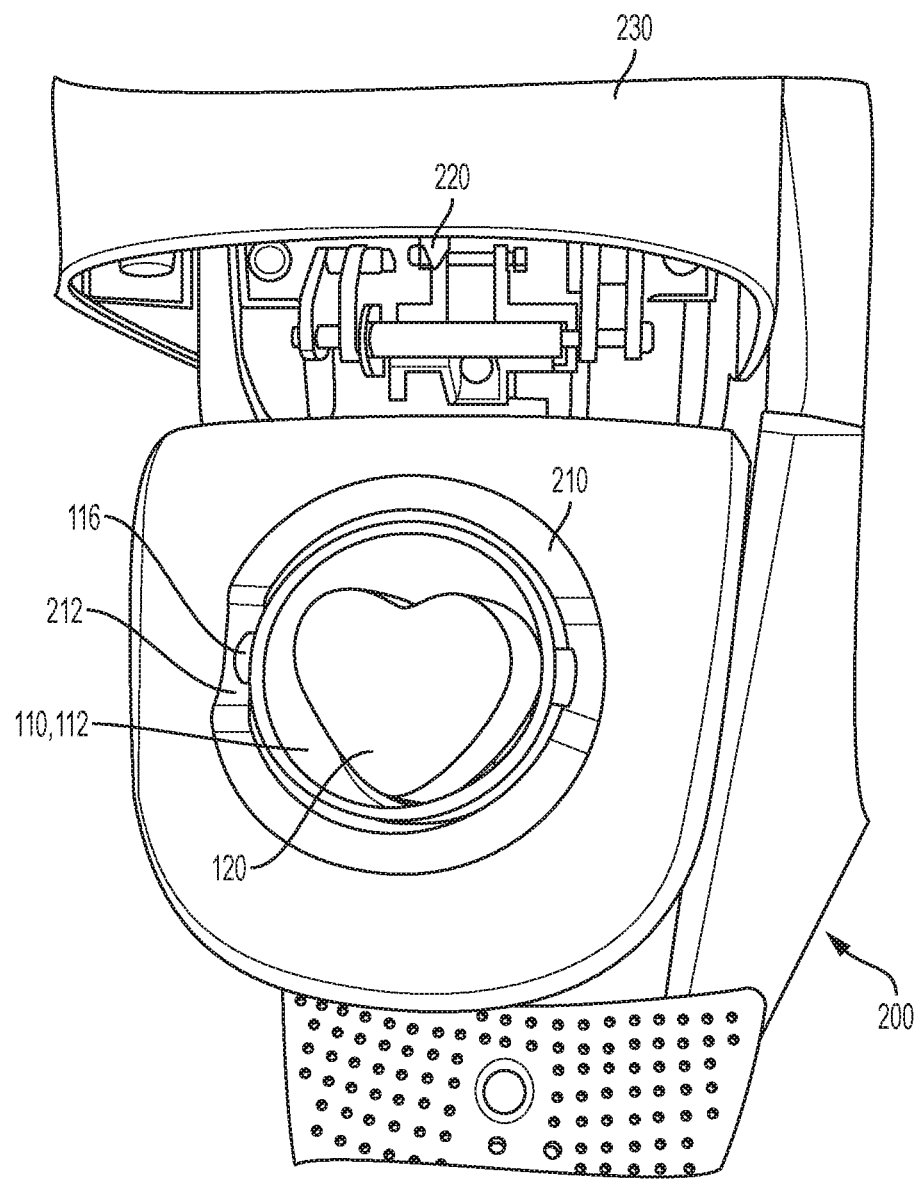
Figure 13C:
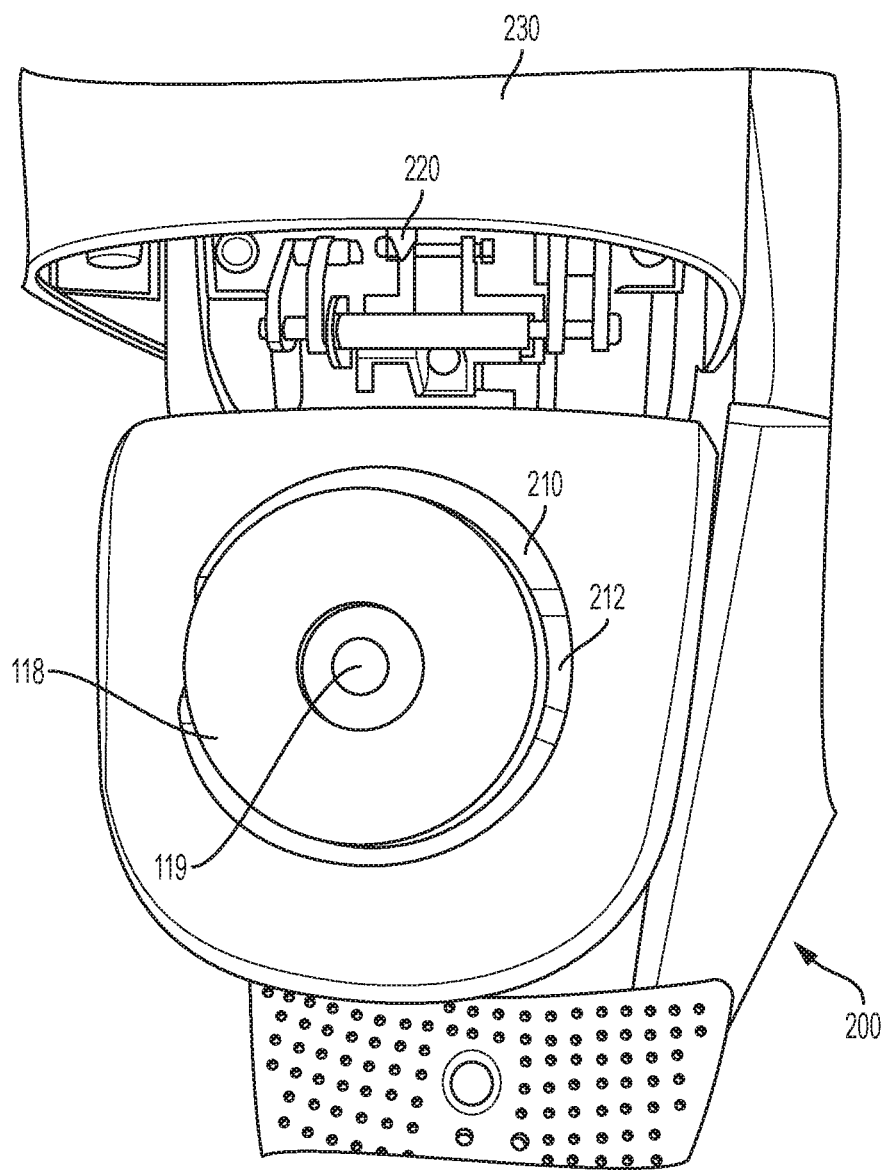

FIGS. 13A, 13B, and 13C are perspective views of a coffee maker 200 with the food grade paper container 110 placed in a recess 210 thereof. In a case where the coffee maker 200 is a Keurig® coffee maker, the recess 210 may be a K-Cup® holder (which itself may be removable). As shown in FIG. 13A, the food grade paper container 110 may be placed in the recess 210 with the stoppers 116 positioned within grooves 212 of the recess 210. In this regard, the stoppers 116 may be disposed on the food grade paper container 110 so as to align with the grooves 212 and may be, for example, a pair of coaxially arranged stoppers 116. The shape of each stopper 116 may conform to the shape of each groove 212. For example, in the case of a curved groove 212, the bottom surface of each stopper 116 may be curved to match the curve of the groove 212 (e.g. with the same or smaller radius curvature). The stoppers 116 may, for example, be cylindrical. Matching the shape of the stoppers 116 to the shape of the grooves 212 may allow for a snug fit to help ensure that the food grade paper container 110 does not abut too far out of the recess 210 so that the lid 230 of the coffee maker 200 can open and close completely. The reduced height of the food grade paper container 110 and/or sloped or stepped region 113 may be designed to prevent the food grade paper container 110 from touching or pressing hard against an exit needle (not shown) of the coffee maker 220 while the stoppers 116 are positioned within the grooves 212.

FIG. 13B shows the same view as FIG. 13A, but with one or more formed soluble coffee products 120 placed in the food grade paper container 110. As can be seen, the formed soluble coffee product 120 visible in FIG. 13B (a heart-shaped wafer) completely covers the holes 114 of the food grade paper container 110. In this respect, the formed soluble coffee products 120 may have a dimension (e.g. a bottom surface in the case of a wafer shape) that completely covers the one or more holes 114 when placed in the food grade paper container 110. As described below in more detail this may improve the efficiency of the process of dissolving the formed soluble coffee products 120, ensuring that no waste is produced and that the food grade paper container 110 comes out clean when the process is over.

FIG. 13C shows the same view as FIGS. 13A and 13B, but with the cap 118 placed on the food grade paper container 110. The orifice 119 of the cap 118 may be positioned such that an entrance needle 220 in a lid 230 of the coffee maker 200 aligns with the orifice 119 and enters the orifice 119 as the lid 230 is moved from an open position (see FIG. 14A) to a closed position (see FIG. 14B).

FIGS. 14A and 14B are schematic representations of the coffee maker 200 including cross-sectional views of the food grade paper container 110 placed inside the coffee maker 200, with FIG. 14A showing the coffee maker 200 in an open position and FIG. 14B showing the coffee maker 200 in a closed position. As shown, the food grade paper container 110 is shaped and sized to fit directly in the recess 210 of the coffee maker 200 with the one or more stoppers 116 preventing the food grade paper container 110 from falling into the recess 210. The illustrated recess 210 is a K-Cup® holder as used in Keurig® coffee makers, including an exit needle part 214 (e.g. a Keurig® portion pack holder) and a funnel part 216. As can be seen, the food grade paper container 110 is positioned in the recess 210 so as to avoid an exit needle 215 of the exit needle part 214. In the example of FIGS. 14A and 14B, the full height of the food grade paper container 110 is short enough to prevent the food grade paper container 110 from touching (or at least prevent the food grade paper container 110 from pressing hard against) the needle 215 while the one or more stoppers 116 rests within grooves 212 of the recess 210 (see FIG. 13A). As such, damage to the food grade paper container 110 can be avoided.

In addition to the recess 210 (having the exit needle part 214 and the funnel part 216), the coffee maker 200 shown in FIGS. 14A and 14B has a lid 230 (see FIG. 14B as well as FIGS. 13A, 13B, and 13C), a water conduit 235, a pump 250, and a heater 260. The water conduit 235 provides water for making a cup of coffee. For example, water from a water source 240 may flow through the water conduit 235 and into the food grade paper container 110 as described in more detail below. The water source 240 may be, for example, a fillable water tank of the coffee maker 200. The pump 250 may pump the water from the water source 240 to the food grade paper container 110 via the water conduit 235, and the heater 260 may heat the water. For example, the heater 260 may heat the water while the water is at the water source 240 (e.g. in a water tank) or while the water is en route to the food grade paper container 110 (e.g. as the water flows through piping or tubing or one or more heating tanks of the water conduit 235). Thus, the heater 260 may heat only the amount of water needed for an individual cup of coffee or may heat a larger batch of water. The heater 260 may be an electric heater that heats the water by Joule heating.

As in the case of the coffee maker 50 and related embodiments described above, it is also contemplated that the water source 240 of the coffee maker 200 may be a connection to a cold water line of a building, similar to that used by a refrigerator that has a water dispenser or ice maker. In this case, the pump 250 may be omitted as the pressure in the water line is used to bring the water to the food grade paper container 110 via the water conduit 235.

The lid 230 of the coffee maker 200 may have an entrance needle 220 that is inserted into the orifice 119 of the cap 118 when the coffee maker 200 is in the closed position as shown in FIG. 14B. In the case of an existing coffee maker 200 (e.g. a Keurig® coffee maker), the entrance needle 220 may typically be used for piercing a hole in the top of a K-Cup® pod when the lid 230 is pressed down onto the K-Cup® pod. To this end, the entrance needle 220 may have a sharp point at the bottom. The entrance needle 220 may also be hollow and act as a part of the water conduit 235 (e.g. with an upper end of the entrance needle 220 connected to tubing or piping of the water conduit 235). As the lid 230 is pressed down onto the food grade paper container 110, a bottom face of the lid 230 may abut against the food grade paper container 110 and the entrance needle 220 may enter the orifice 119. In this way, the water from the water source 240 may flow through the water conduit 235 and into the food grade paper container 110 through the tip of the entrance needle 220.

When a person wishes to use the food grade paper container 110 to make a cup of coffee, he/she may place one or more formed soluble coffee products 120 into the food grade paper container 110, along with any desired formed soluble flavor or creamer additive products, and place the cap 118 on the food grade paper container 110. The person may then place the food grade paper container 110 inside the recess 210 of the coffee maker 200 as shown in FIG. 14A and lower the lid 230 of the coffee maker 200 as shown in FIG. 14B. Heated water may then flow from the water conduit 235 into the food grade paper container 110 through the entrance needle 220, which may work to dissolve the contents of the food grade paper container 110 (e.g. soluble coffee, flavor, etc.), and the combined heated water and dissolved soluble coffee (along with any dissolved additives) may flow out of the food grade paper container 110 through the one or more holes 114 and down into the person's coffee cup. The entire process may produce no waste. Moreover, when the coffee making process is completed, it may be unnecessary to clean the food grade paper container 110, as the heated water from the coffee maker 200 may sufficiently clean the inside of the food grade paper container 110 as the water flows through the food grade paper container 110. For example, the coffee making process may have a first part where the heated water dissolves all of the soluble coffee (along with any soluble additives) and a second part where the heated water continues to flow through the food grade paper container 110 to rinse out and disinfect the food grade paper container 110. During the second part of the coffee making process, any remaining coffee that remains between or around the holes 114 may be forced out of the food grade paper container 110 by the flow of water. Thus, one may immediately reuse the food grade paper container 110. For example, in a case where the entire coffee making process involves flowing twelve ounces of water through the food grade paper container 110, the formed soluble coffee product (s) 120 and food grade paper container 110 may be designed such that the first 3-11 ounces (preferably 9-11 ounces, e.g. 10 ounces) of water completely dissolve the formed soluble coffee product(s) 120 while the final 1-9 ounces (preferably 1-3 ounces, e.g. 2 ounces) of water rinse the food grade paper container 110.

As shown in FIGS. 14A and 14B, a plurality of formed soluble coffee products 120 and soluble flavor or creamer additive products may be placed in the food grade paper container 110. In the example of FIGS. 14A and 14B, any of the three formed soluble coffee products 120 may be a formed soluble flavor or creamer additive product, which may be used in the same way and may be structurally the same. Specifically, three formed soluble coffee products 120 and/or additive products (hereinafter formed soluble coffee products 120) are shown in a stacked arrangement. When preparing a desired combination of contents for his/her cup of coffee, a user may simply stack additional formed soluble coffee products 120 one on top of the other. As shown, the formed soluble coffee products 120 completely cover the holes 114. As a result, water in a peripheral region within the food grade paper container 110 between the formed soluble coffee products 120 and the wall of the food grade paper container 110 (which has in most cases already flowed against the formed soluble coffee products 120 to reach the peripheral region of the food grade paper container 110) may flow against the underside of the formed soluble coffee products 12 as it passes from the peripheral region of the food grade paper container 110 to the holes 114. This may result in an efficient dissolving process as the amount of times the water flows against the formed soluble coffee product 120 may be maximized. This may help ensure that no waste is produced and that the food grade paper container 110 is clean when the process ends.

The efficiency of the dissolving process may be further improved by the existence of gaps 123a, 123b around the sides of as well as between the stacked formed soluble coffee products 120, which allow water to flow down, around, and between the stacked formed soluble coffee products 120 to maximize the surface area across which the hot water contacts and the dissolving process takes place. Such gaps 123a around the sides of the formed soluble coffee products 120 are due to the relative size of the formed soluble coffee products 120 and the food grade paper container 110, which may be selected accordingly. In order for there to be gaps 123b between the formed soluble coffee products 120, each of the formed soluble coffee products 120 may have one or more protrusions 122 (e.g. on bottoms thereof) to produce a gap 123b between adjacent formed soluble coffee products 120. As can be seen, such protrusions 122 may act as spacers to prevent the formed soluble coffee products 120 from lying flush against each other while stacked, thus allowing for water to pass through the gap 123b between the formed soluble coffee products 120. By maximizing the surface area for dissolving in these ways, the efficiency of the dissolving process may be improved. This may help ensure that no waste is produced and that the food grade paper container 110 is clean when the process ends.

Figure 15:
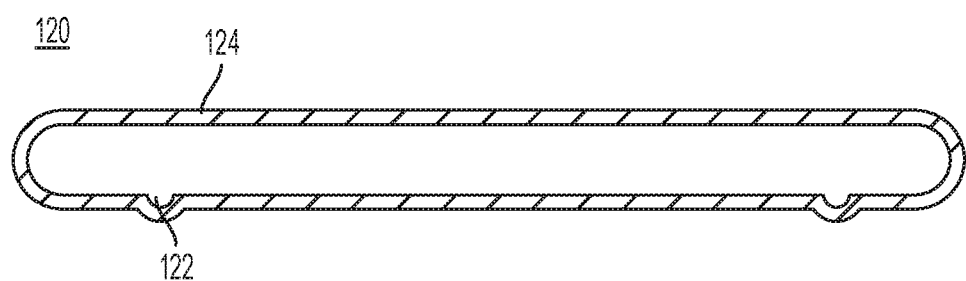
FIG. 15 is a side view of a single formed soluble coffee product.

FIG. 15 is a side view of a single formed soluble coffee product 120 (which may also serve as an illustration of a formed soluble flavor or creamer additive product). The formed soluble coffee product 120 may be made by a freeze-drying process or a spray-drying process. For example, coffee (e.g. brewed coffee or liquid coffee concentrate, which may itself be produced by dehydrating brewed coffee) may be poured into a mold (e.g. a silicon mold, which may withstand cold temperature (e.g., between −50° F. and −32° F., and more particularly as low as −20° F.), and optionally a flavor or creamer additive may be poured into the mold together with the coffee. In this regard, manufacturing the formed soluble coffee product 120 may optionally begin with one or more preliminary steps such as brewing the coffee, dehydrating the coffee to produce a liquid coffee concentrate, grinding roasted coffee beans to produce coffee grounds for brewing, and roasting the coffee beans. The mold may have a desired shape, e.g. a wafer, a ball, or any other shape, including "fun" shapes such as stars, hearts, animals, etc. The coffee and optional additive may then be freeze-dried (e.g. at −20° F. under pressure for 24 hours) while in the mold to produce the formed soluble coffee product 120. Alternatively, or additionally, ultrasonic energy may be applied to the contents of the mold (e.g. having a frequency between 20 Khz to 35 Khz and more preferably between 27 Khz to 33 Khz). The ultrasonic energy may fuse the contents of the mold to produce the formed soluble coffee product 120. As another alternative to freeze-drying or ultrasonic energy, or in addition, a water-soluble binder (e.g. sodium bicarbonate, stearic acid, and/or magnesium stearate) may be added to the mold together with the coffee and optional additive. A press may compress the contents of the mold including the binder to form the formed soluble coffee product 120. It is also contemplated that, in some cases, powdered or granulated soluble coffee, e.g. already freeze-dried soluble coffee, rather than brewed coffee or liquid coffee concentrate, may be placed in the mold to be pressed into the formed soluble coffee product 120.

In the above process, the freeze-drying may be performed in two stages: a pre-freeze stage and a refreeze stage. In the pre-freeze stage, the coffee and optional additive may be frozen in the mold (e.g. at −20° F. In the refreeze stage, the pre-frozen product may be popped out of the mold and allowed to continue the freeze-drying process outside of the mold (e.g. on a tray). Letting the freeze-drying process occur outside of the mold allows the product to breathe and helps remove all of the remaining moisture, which might otherwise be trapped in on by the mold.

In addition to one or more protrusions 122 as described above (which may be formed by the shape of the mold), the formed soluble coffee product 120 may have a dissolvable coating or wrapper 124. The dissolvable coating or wrapper 124 may be an edible liquid cellulose coating that protects the formed soluble coffee product 120 from breaking apart while it is handled. The dissolvable coating or wrapper 124 may dissolve in water. The dissolvable coating or wrapper 124 may also prevent moisture from entering the formed soluble coffee product 120. The formed soluble coffee product 120 may be packaged in the dissolvable coating or wrapper 124 after the formed soluble coffee product 120 is manufactured. For example, the newly manufactured formed soluble coffee product 120 may be wrapped in or otherwise surrounded by a sheet of the coating/wrapper material on two or more sides, and the ends of the sheet(s) may then be fused together by the application of heat to create a sealed dissolvable coating or wrapper 124. Alternatively, the dissolvable coating or wrapper 124 may be a cellulose spray that is sprayed onto the newly manufactured formed soluble coffee product 120 after the freeze-drying process described above. In lieu of cellulose, the material may be pullulan, pectin, starch, polyvinyl acetate, sodium alginate or combinations and a combination with cellulose with any one of the listed materials. The dissolvable coating or wrapper 124 may have a thickness of 0.001 inches to 0.010 inches. The dissolvable coating or wrapper 124 may be sufficiently thin to dissolve fast enough so that hot water dissolves through the dissolvable coating or wrapper 124 and the formed soluble coffee product 120 during the first part of the first part of the coffee making process (i.e. prior to the second part in which the food grade paper container 110 is rinsed with the remaining water). It is also contemplated that a user may dip a formed soluble coffee product 120 in a dissolvable coating 124 such as a flavor or creamer additive (e.g. powder, liquid) prior to placing the formed soluble coffee product 120 in the food grade paper container 110. Such a dissolvable coating 124 may be separately packaged in a container with a suitably sized opening for dipping or with other dispensing means (e.g. a squeeze or pump bottle).

The size of the formed soluble coffee product 120 may be predetermined to correspond to a single cup of coffee. Alternatively, the size of the formed soluble coffee product 120 may be predetermined to correspond to less than a single cup of coffee, e.g. a half a cup of coffee or a third of a cup of coffee, in order to encourage mixing and matching of formed soluble coffee products 120. For example, in some cases, a single cup of coffee of a single type (e.g. flavor, decaf) may be made using three of the same type of formed soluble coffee product 120, while a single cup of coffee of a mixed type may be made using two formed soluble coffee products 120 of one type and one formed soluble coffee products 120 of another.

The size as well as the shape (e.g. surface area) of the formed soluble coffee product 120 may further be predetermined to correspond to an amount of heated water associated with the coffee maker 200. In this way, it can be ensured that the amount of heated water dispensed by the coffee maker 200 is enough to dissolve the formed soluble coffee product 120 completely, preferably with some additional heated water left over to rinse any remaining residue from the food grade paper container 110 and ensure that no waste is produced. For example, as noted above, a given coffee maker 200 may have multiple size settings for dispensing different amounts of heated water (e.g. small, medium, and large). The formed soluble coffee product 120 may be sized and shaped such that a single formed soluble coffee product 120 is dissolved completely (with some leftover water) by the "small" size setting.

Figure 16:
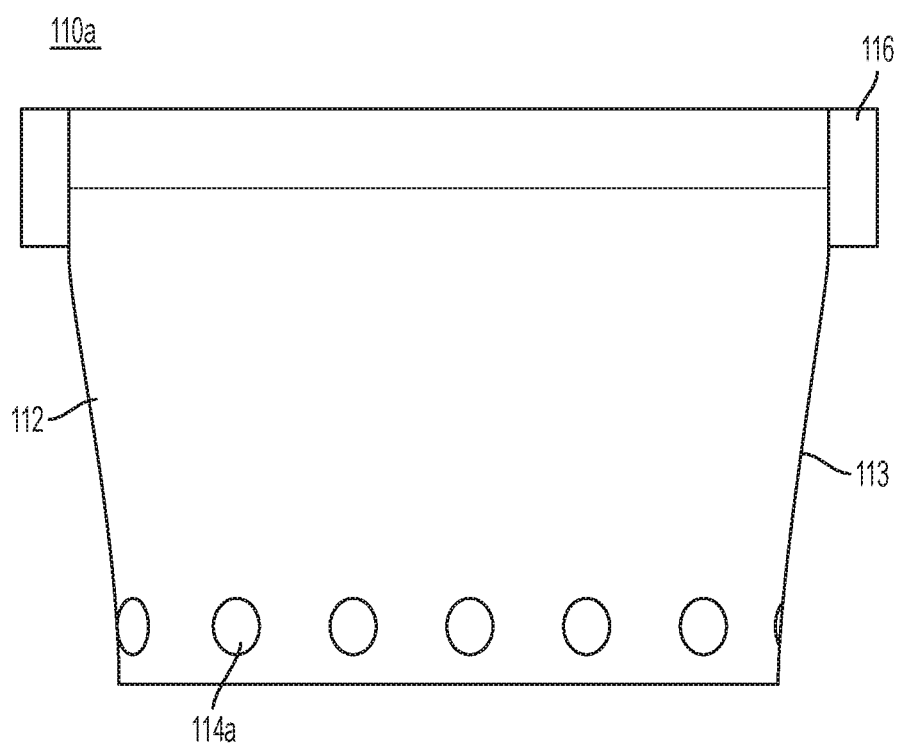
FIG. 16 is a side view of a variant of the food grade paper container of FIGS. 11A, 11B, and 11C.

FIG. 16 is a side view of a food grade paper container 110*a*, which is a variant of the food grade paper container 110 shown in FIGS. 11A, 11B, and 11C. As described above, one or more holes 114 may be provided in a lower portion of the food grade paper container 110 in order to allow the combined soluble coffee and heated water to pass through the food grade paper container 110 and into a user's cup. In this regard, the placement of the holes 114 is not limited to the bottom of the food grade paper container 110 as shown in FIGS. 11A and 11C. For example, as shown in FIG. 16, a food grade paper container 110*a* may be provided that is the same as the food grade paper container 110 except that holes 114*a* are provided on the side walls of the food grade paper container 110*a* instead of holes 114 provided on the bottom (or in addition to holes 114 provided on the bottom). Placing the holes 114*a* on the side walls and not on the bottom may help prevent residue from the formed soluble coffee product(s) 120 from escaping out the bottom of the food grade paper container 110*a* prior to the dissolving process (e.g. as the user handles the food grade paper container 110*a*). In a case where the holes 114*a* are provided on the side walls of the food grade paper container 110*a* and not on the bottom, it is contemplated that the bottom of the food grade paper container 110*a* may be sloped in the direction of the holes to aid in removal of the combined soluble coffee and heated water during use, i.e. to avoid pooling in the bottom of the food grade paper container 110.

Figure 17:
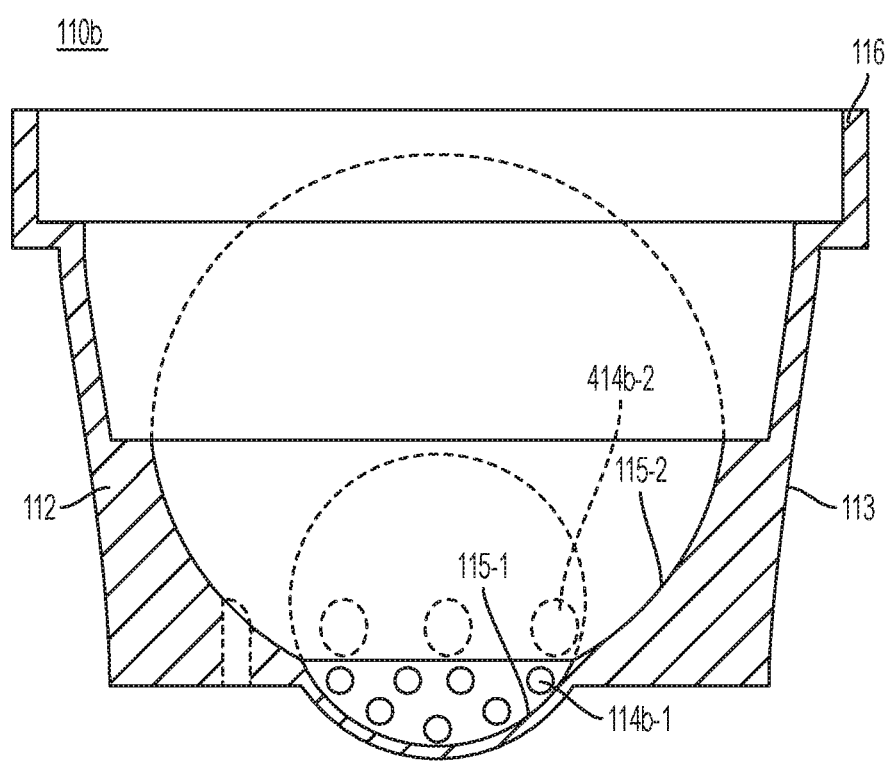
FIG. 17 is a cross-sectional view of another variant of the food grade paper container of FIGS. 11A, 11B, and 11C.

FIG. 17 is a cross-sectional view of a food grade paper container 110*b*, which is another variant of the food grade paper container 110 shown in FIGS. 11A, 11B, and 11C. The food grade paper container 110*b* may be the same as the food grade paper container 110 except that the food grade paper container 110*b* may be designed to receive multiple predetermined sizes and/or shapes of formed soluble coffee products 120 (e.g. corresponding to desired strengths and/or coffee maker size settings). To this end, the interior of the food grade paper container 110*b* may have two or more nested receptacles 115-1, 115-2. In the example of FIG. 17, the receptacles 115-1, 115-2 are contoured to fit spherical (or at least partially spherical) formed soluble coffee products 120 (e.g. coffee balls), with the lower receptacle 115-1 sized to fit a small coffee ball and the upper receptacle 115-2 designed to fit a large coffee ball. It is contemplated that additional nested receptacles 115-3, 115-4, etc. may be provided as well, possibly fitting three, four, five, six, or more such coffee balls (or formed soluble coffee products 120 of other shapes). Each of the nested receptacles 115-1, 115-2 may include one or more holes 114*b*-1, 114*b*-2, which may be the same as the holes 114, 114*a* described above except that they may be arranged in sets corresponding to the receptacles 115-1, 115-2 as shown. In the example of FIG. 17, the set of holes 114*b*-2 corresponding to the upper receptacle 115-2 (for the large coffee ball) provides passage of the combined heated water and soluble coffee for some distance before reaching the exterior of the body 112 of the food grade paper container 110*b*. To this end, the holes 115*b*-2 may have an elongated geometry to serve as tunnels from the interior to the exterior of the food grade paper container 110*b* as shown. In some cases, only a single set of holes 114*b*-1 corresponding to the lowest of the nested receptacles 115-1 may be exist. The other holes 114*b*-2, etc. do not exist. In this way, when the lowest receptacle 115-1 is used (e.g. for a small coffee ball), it can be ensured that the heated water does not flow out of any holes 114*b*-2 corresponding to upper receptacles 115-2. Meanwhile, when the upper receptacle 115-2 is used (e.g. for a large coffee ball), the water must flow beside and under the coffee balls to dissolve the same. Plus, the lower holes 114*b*-1 may still adequately function to allow the heated water and soluble coffee to flow out of the food grade paper container 110*b*.

In the figures and description, the nested shapes are shaped to match a spherical ball shape for the dissolvable coffee product. However, other shapes are also contemplated such as pyramidal, football, egg shaped for the dissolvable coffee product and the nested shapes.

It is noted that a coffee ball shape for the formed soluble coffee product 120 may be advantageous in that, owing to its spherical shape, it may roll against the interior of the food grade paper container 110*b* to auto-locate at the correct receptacle 115 without getting stuck in the wrong position or in the wrong orientation (e.g. as a wafer-shaped formed soluble coffee product 120 might get stuck on its end or leaned up against the interior of the food grade paper container 110). This may help ensure that the coffee ball covers the holes 114*b*, improving the efficiency of the dissolving process as the water must flow against the coffee ball to exit through the holes 114*b*.

In the above examples, the heated water enters the food grade paper container 110, 110*a*, 110*b* through the top of the food grade paper container 110, 110*a*, 110*b*. Other points of entry are also contemplated, such as the side.

In the above examples, generally cylindrical shapes are depicted for the food grade paper container 110, 110a, 110b. However, other shapes are contemplated as well, such as balls, boxes, etc., and it is contemplated that coffee makers 200 may be designed to accommodate such shapes. It is similarly envisioned that the exterior of the food grade paper container 110, 110a, 110b may be designed to fit inside any single-serve coffee maker, e.g. coffee makers by Keurig®, Nespresso®, Mr. Coffee®, Cuisinart®, Presto® MyJo™, Bunn®, etc., and may be designed to fit universally inside more than one coffee maker.

Figure 18:
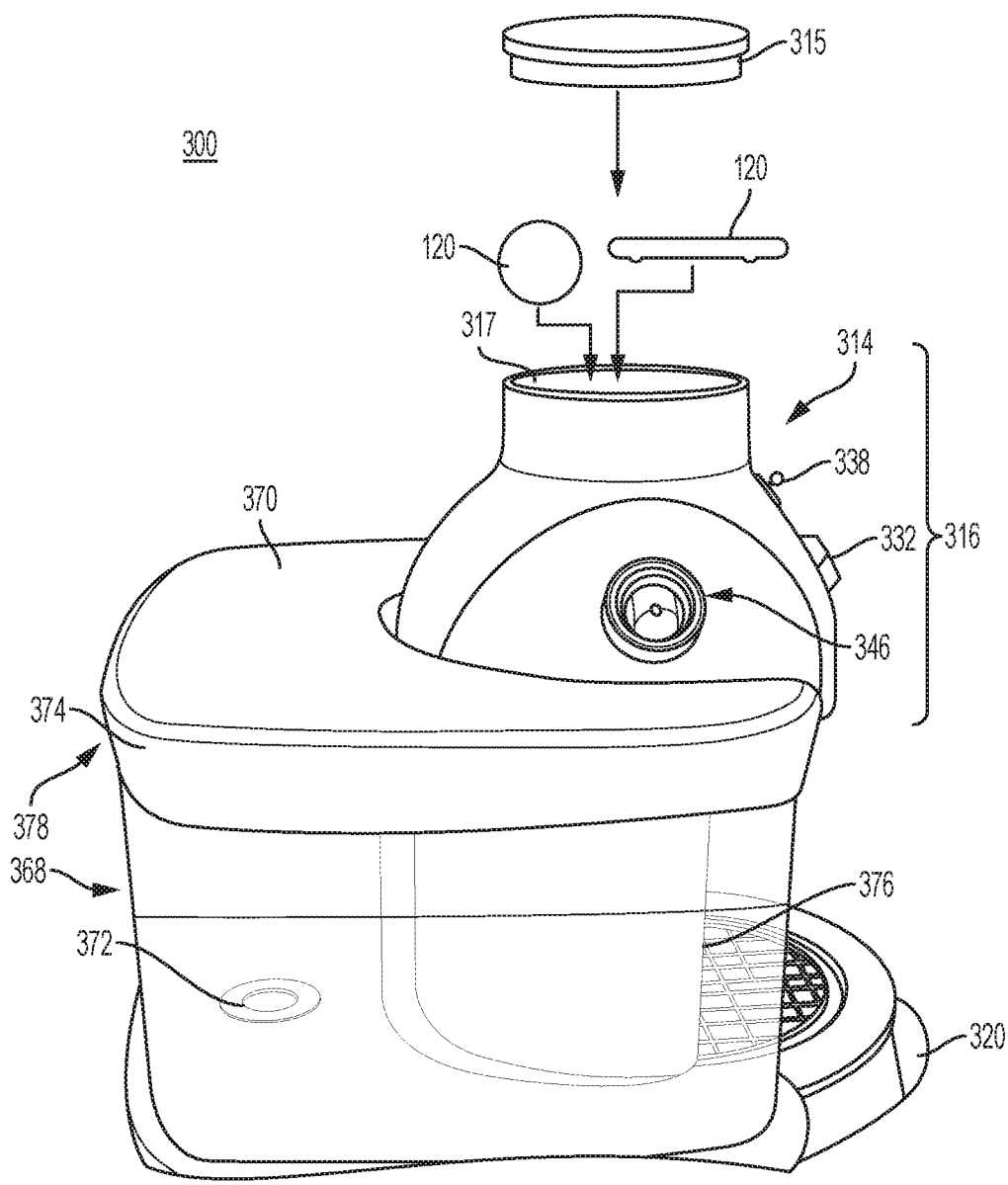
FIG. 18 is a perspective view of a coffee maker according to an embodiment of the present disclosure, together with formed soluble coffee products to be used with the coffee maker.
Figure 19:
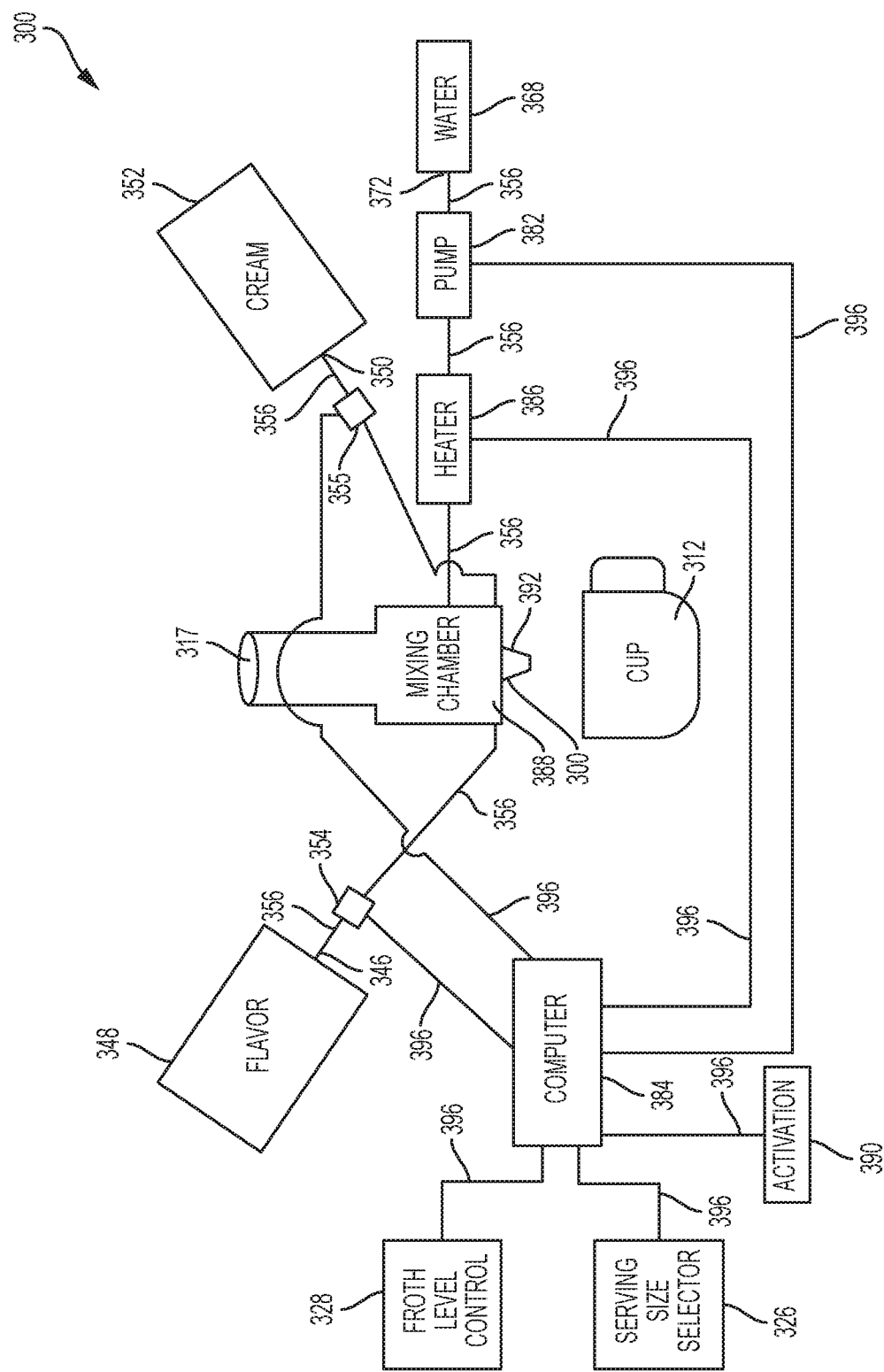
FIG. 19 is a schematic view of the coffee maker of FIG. 18.

FIG. 18 is a perspective view of a coffee maker 300 according to an embodiment of the present disclosure, together with formed soluble coffee products 120 to be used with the coffee maker 300. FIG. 19 is a schematic view of the coffee maker 300. Except for differences described below, the coffee maker 300 may be the same as the coffee dispenser 10, 10a, 110, 210 (preferably 10, 10a) described in U.S. patent application Ser. No. 16/040,470 (the '470 Application), which is incorporated by reference here in entirety. For example, the coffee maker 300 may include a housing 314, upper portion 316, base 320, serving size selector 326, froth level control 328, rotatable knob 332, horizontal slider 338, flavor concentrate port 346, flavor concentrate container 348, cream concentrate port 350, cream concentrate container 352, flavor port valve 354, cream port valve 355, tubing or piping 356, water reservoir 368 with sides 376 and open end 378, lid 370 with sides 374, intake 372, pump 382, computer 384, boil chamber 386, mixing chamber 388, outlet port valve 392, and wired 396 or wireless connections that are respectively the same as the housing 14, upper portion 16, base 20, serving size selector 26, froth level control 28, rotatable knob 32, horizontal slider 38, flavor concentrate port 46, flavor concentrate container 48, cream concentrate port 50, cream concentrate container 52, flavor port valve 54, cream port valve 55, tubing or piping 56, water reservoir 68 with sides 76 and open end 78, lid 70 with sides 74, intake 72, pump 82, computer 84, boil chamber 86, mixing chamber 88, outlet port valve 92, and wired 96 or wireless connections of the coffee dispenser 10, 10a described in the '470 Application. The coffee maker 300 may further include any of the other features described in relation to the coffee dispenser 10, 10a of the '470 Application. The coffee maker 300 may differ from the coffee dispenser 10, 10a in that the coffee concentrate port 42, coffee concentrate container 44, and coffee port valve 53 may be replaced with a mouth 317 for receiving one or more formed soluble coffee products 120 (and/or formed soluble flavor or creamer additive products, which may also be referred to as formed soluble coffee products 120 herein) and a lid 315 for covering the mouth 317. As schematically shown in FIG. 19, the mouth 317 may provide access to the mixing chamber 388. The coffee maker 300 may further differ from the coffee dispenser 10, 10a in the design of the mixing chamber 388 as described in relation to FIGS. 20 and 21.

A person wishing to make a cup of coffee using the coffee maker 300 may simply remove the lid 315 (e.g. the lid 315 may be left covering the mouth 317 to prevent dust from entering the coffee maker 300 while it is not in use), drop one or more formed soluble coffee products 120 into the mixing chamber 388 via the mouth 317, replace the lid 315 (to prevent splashing and reduce noise during the coffee making process), and initiate the coffee making process using the controls of the coffee maker 300 as described in relation to the coffee dispenser 10, 10a of the '470 Application. Prior to initiating the coffee making process, the person may optionally add flavor or creamer from the flavor concentrate container 348 and cream concentrate container 352 in the same way as described in the '470 Application in relation to the coffee dispenser 10, 10a. Water from the water reservoir 368 is heated by the heater 386 and pumped by the pump 382 into the mixing chamber 388, where it dissolves the formed soluble coffee product 120 and any formed soluble flavor or creamer additive products (the soluble contents of the mixing chamber 388) and mixes with any flavor or creamer concentrates dispensed from the flavor concentrate container 348 or cream concentrate container 352. The fully dissolved contents then fall into the user's cup 312. As in the case of the coffee maker 200 described above, the coffee making process may have a first part where the heated water dissolves all of the soluble coffee (along with any soluble additives) and a second part where the heated water continues to flow through the mixing chamber 388 to rinse out and disinfect the mixing chamber 388. During the second part of the coffee making process, any remaining coffee that remains in the mixing chamber 388 may be forced out of the mixing chamber 388 by the flow of water.

Figure 20:
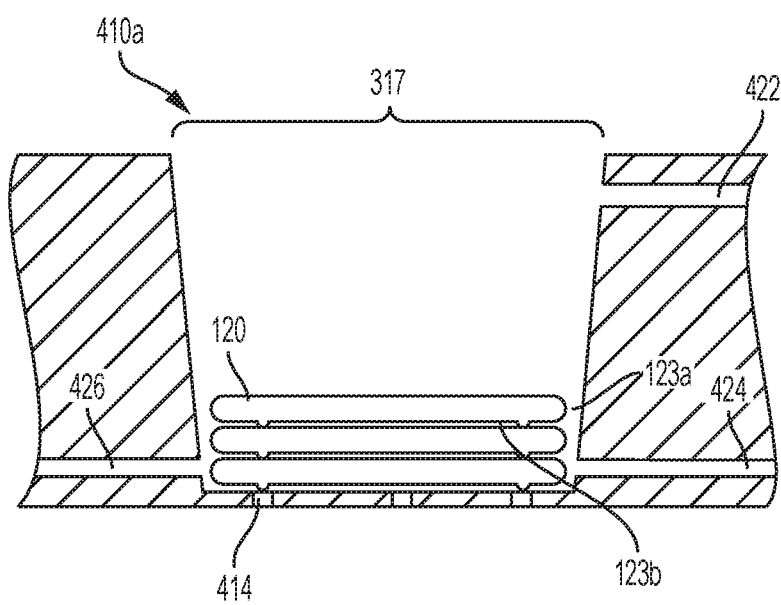
FIG. 20 is a cross-sectional view of a variant of the food grade paper container of FIGS. 11A, 11B, and 11C that may be integrally disposed within the coffee maker of FIG. 18.

FIG. 20 is a cross-sectional view of a container 410a, which may be integrally disposed within the coffee maker 300 to serve as the mixing chamber 388. The container 410a may be the same as the food grade paper container 110 of FIGS. 11A, 11B, and 11C, including having an internal shape that is the same as that of the body 112 of the food grade paper container 110 and having one or more holes 414 that are the same as the one or more holes 114 of the food grade paper container 110, with the following differences related to its integration in the coffee maker 300. In particular, the container 410a may or may not have the same external shape as the food grade paper container 110, since the container 410a may be fixed within the coffee maker 300 and need not be handled by the user. The container 410a may, for example, be formed as a passageway through the coffee maker 300 from the mouth 317 of the coffee maker 300 to the holes 414.

Another difference from the food grade paper container 110 is that the container 410a may be connected to the tubing or piping 356 of the coffee maker 300 by a water input line 422, a cream concentrate input line 424, and a flavor concentrate input line 426. As shown in FIG. 20, the water input line 422, which may be connected to the tubing or piping 356 leading to the water reservoir 368, pump 382, and heater 386, may be disposed in an upper portion (e.g. top half or top quarter) of the container 410a, while the cream concentrate input line 424 and flavor concentrate input line 426, which may be connected to the tubing or piping 356 leading to the cream port valve 355 and flavor port valve 354 respectively, may be disposed in a lower portion (e.g. bottom half or bottom quarter) of the container 410a. By entering the container 410a in an upper portion, the heated water for dissolving the soluble contents of the container 410a may have the most opportunity to dissolve the soluble contents of the container 410a (i.e. the formed soluble coffee product 120 and any formed soluble flavor or creamer additive products) as it passes through gaps 123a, 123b around and between the soluble contents as described above in relation to the food grade paper container 110. As a result, even in the case of a high stack of soluble contents, the heated water will not pass through the holes 414 and out of the container 410a without first flowing along the soluble contents to further the dissolving process. In some cases, the water may be pumped by the pump 382 at a high enough pressure to cause the water to shoot out from the water input line 422 and land on the soluble contents at or near the middle of the container 410a. In this way, the container 410a can be arranged so that water flows against the soluble contents once as it flows from the middle of the container 410a to the periphery of the container 410a, along the side of the soluble contents as it flows down, and then again as it flows from the periphery of the container 410a inward toward the holes 414 at the bottom of the container before exiting the container 410a, further improving the efficiency of dissolving as described above in relation to the food grade paper container 110. Meanwhile, since the cream concentrate and flavor concentrate need not be dissolved and need only be mixed, the cream concentrate input line 424 and flavor concentrate input line 426 may be disposed in the lower portion of the container 410a. If the cream/flavor concentrate quickly arrives at the holes 414, that is not a problem as the mixing of the concentrates with the heated water (with dissolved coffee) can still occur in the user's cup 312. By disposing the cream concentrate input line 424 and flavor concentrate input line 426 in the lower portion of the container 410a, the room temperature concentrates can be prevented from prematurely cooling the heated water while the heated water is dissolving the soluble contents of the container 410a. In particular, the cream and flavor liquid which are not heated may have a shorter distance out of the container so that the heated water can be as hot as possible.

Figure 21:
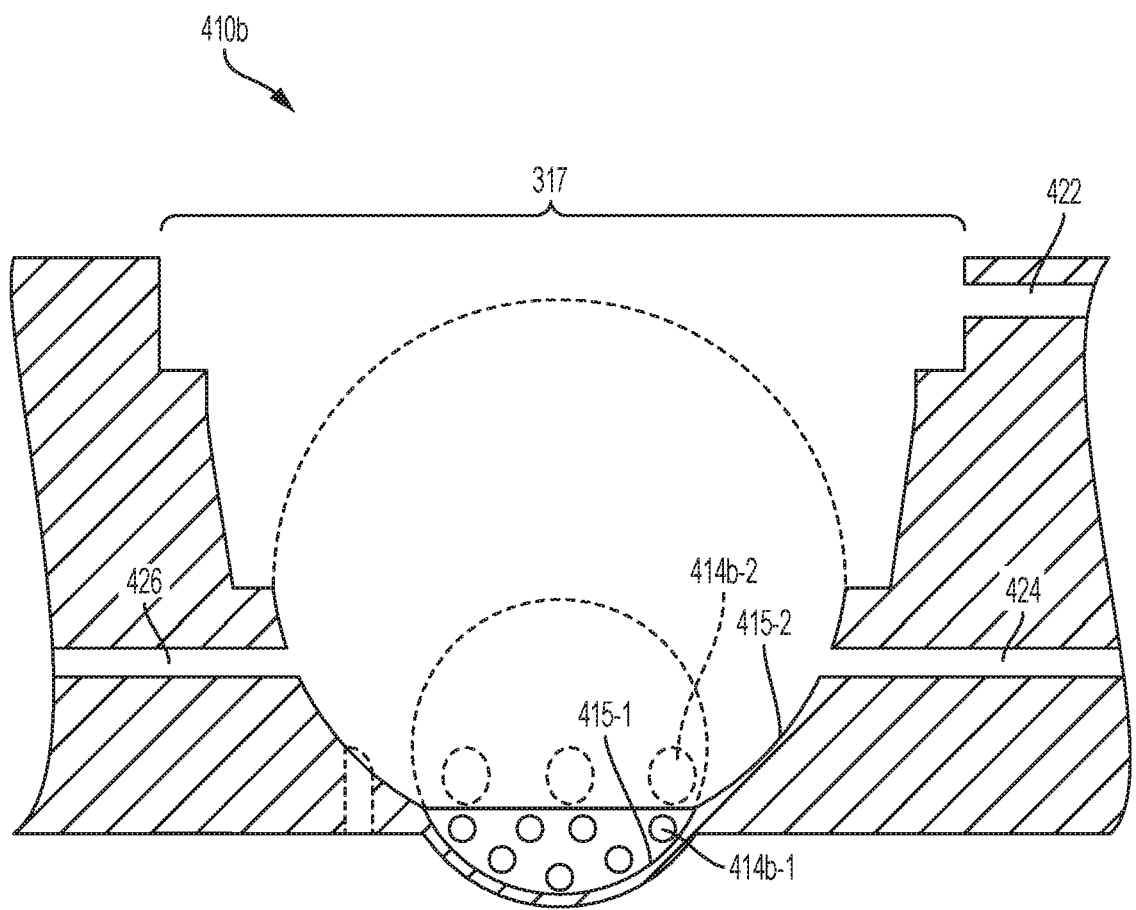
FIG. 21 is a cross-sectional view of a variant of the food grade paper container of FIG. 17 that may be integrally disposed within the coffee maker of FIG. 18.

FIG. 21 is a cross-sectional view of a container 410b, which may be integrally disposed within the coffee maker 300 to serve as the mixing chamber 388. The container 410b may be the same as the food grade paper container 110b of FIG. 17, including having an internal shape that is the same as that of the body 112 of the food grade paper container 110b (including two or more nested receptacles 115) and having one or more holes 414b that are the same as the one or more holes 114b of the food grade paper container 110 (and may similarly be arranged in sets corresponding to the nested receptacles 115), with the following differences related to its integration in the coffee maker 300. In particular, the container 410b may or may not have the same external shape as the food grade paper container 110b, since the container 410b may be fixed within the coffee maker 300 and need not be handled by the user. The container 410b may, for example, be formed as a passageway through the coffee maker 300 from the mouth 317 of the coffee maker 300 to the holes 414b.

Another difference from the food grade paper container 110b, is that, just like the container 410a, the container 410b may be connected to the tubing or piping 356 of the coffee maker 300 by a water input line 422, a cream concentrate input line 424, and a flavor concentrate input line 426. The water input line 422, cream concentrate input line 424, and flavor concentrate input line 426 may be structured and function in relation to the container 410b in the same way as described above in relation to the container 410a. For example, the water input line 422 may be disposed in an upper portion (e.g. top half or top quarter) of the container 410a to improve the efficiency of dissolving as described above, while the cream concentrate input line 424 and flavor concentrate input line 426 may be disposed in a lower portion (e.g. bottom half or bottom quarter) of the container 410a to prevent premature cooling of the heated water as described above.

In the above examples of FIGS. 20 and 21, it is described that the container 410a and container 410b may be integrally formed with the coffee maker 300 to function as the mixing chamber 388 thereof. However, the disclosed embodiments are not intended to be so limited. It is also contemplated, for example, that the container 410a and container 410b may be insertable and removable from the coffee maker 300, or that the food grade paper container 110, 110b may be insertable and removable from the coffee maker 300. In this case, a user may, for example, freely insert the food grade paper container 110, 410a for use with wafer-shaped formed soluble coffee products and insert the food grade paper container 110b, 410b for use with spherical formed soluble coffee products (e.g. coffee balls). The mixing chamber 388 of the coffee maker 300 may, for example, be a cavity connected to the tubing or piping 356 that leads to the water reservoir 368, pump 382, and heater 386, the tubing or piping 356 that leads to the cream port valve 355, and the tubing or piping 356 that leads to the flavor port valve 354. The cavity of the mixing chamber 388 may also include means of locating the food grade paper container 110, 110b, 410a, 410b within the mixing chamber 388, such as an annular ledge around the periphery of the mixing chamber 388 on which the one or more stoppers 116 of the food grade paper container 110, 110b may rest. When the coffee maker 300 is operated, the heated water, cream concentrate, and/or flavor concentrate may flow into the mixing chamber 388 at a position higher than the food grade paper container 110, 110b, 410a, 410b via the tubing or piping 356. The heated water, cream concentrate, and/or flavor concentrate may thus flow into the food grade paper container 110, 110b, 410a, 410b to prepare a cup of coffee as described above.

Referring now to FIGS. 22-34, a method of making a formed soluble coffee product 120 is shown. The formed soluble coffee product described in FIGS. 22-34 will be referred to as reference numeral 420. The method used to make the formed soluble coffee product 420 may be used to make the formed soluble coffee product 120. The formed soluble coffee product 120, 420 fabricated from this method may quickly dissolve in water having a temperature between slightly above freezing and 200 degrees F. Preferably, the formed soluble coffee product 120, 420 quickly dissolves (i.e., 1-15 seconds, under 10 seconds, or under 5 seconds) in hot water above 100 degrees Fahrenheit. The formed soluble coffee product 120, 320 has minimal or no waste. As such, it does not pollute the environment similar to a coffee pod sold by Keurig. Rather, there may be only a thin wrapper to help protect the formed soluble coffee product 120, 420 from contamination. The formed soluble coffee product 120, 420 may also be used in conjunction with a single serve coffee making machine. If so, then the formed soluble coffee product completely dissolves in the holder (e.g., traditional coffee pod holder) of the formed soluble coffee product before the serving of hot water finishes dispensing from the single serve coffee machine so that the remainder of the serving of hot water can clean and sanitize the holder.

Figure 22:
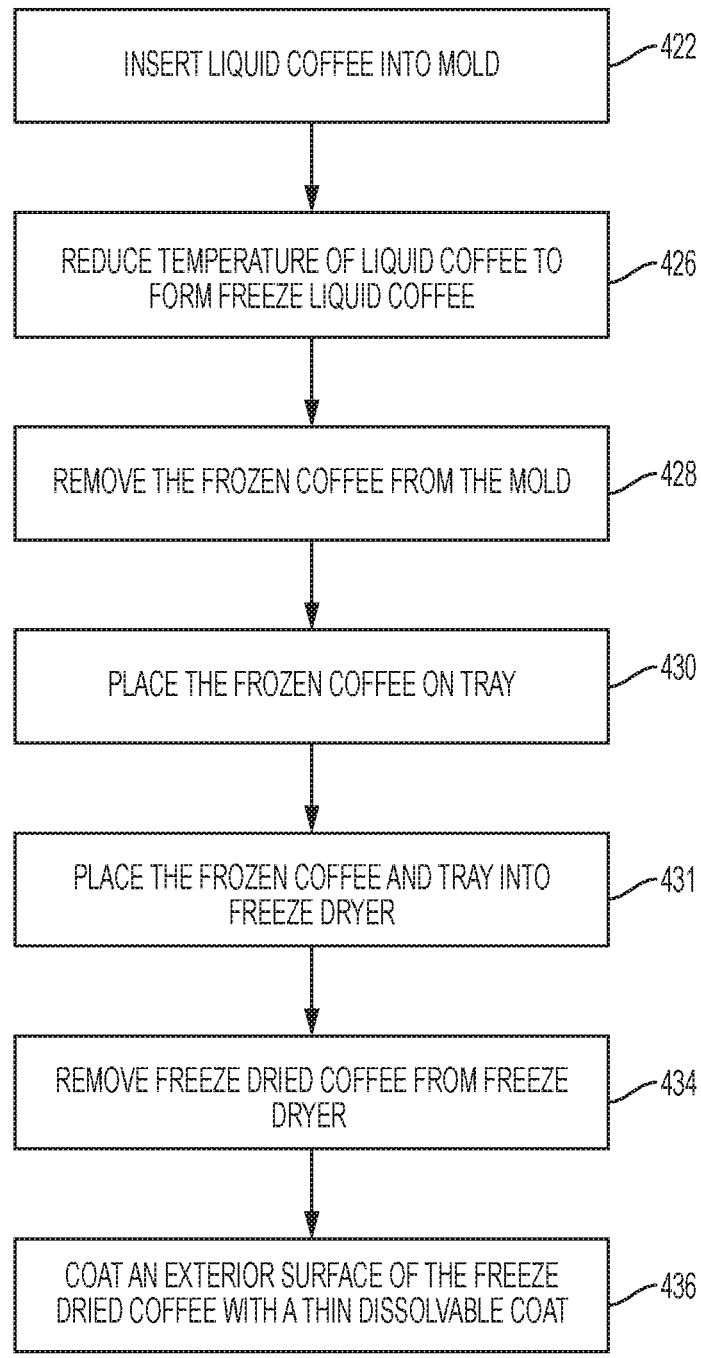
FIG. 22 illustrates a flow chart for freeze drying liquid coffee concentrate and forming a formed soluble coffee product.

As shown in FIG. 22, the method may comprise a step of inserting 422 a liquid coffee concentrate into a cavity 422 of a mold 424, 424A. The liquid coffee concentrate discussed herein may have a water content of about 1% to 10% by weight but preferably has a water content of about 2-5% by weight. Next, the liquid coffee concentrate may be transitioned into a solid form, or simply put, frozen. This is accomplished by reducing 426 the temperature of the liquid coffee concentrate. The temperature of the liquid coffee concentrate can be reduced by placing the mold 424, 424a into a refrigeration unit or a refrigerator. The refrigeration unit may be set to about 6 degree Fahrenheit.

From room temperature (e.g., 80 degrees Fahrenheit) to freezing temperature (e.g., 32 degree Fahrenheit), the length of time that it takes for the liquid coffee concentrate to freeze may be about four hours. At the time the molds are placed in the refrigeration unit, a freeze-drying machine 426 may be turned on in order to prepare the machine to receive the frozen liquid coffee concentrate after it has been frozen. The refrigeration unit brings the temperature of the liquid coffee product at least below a temperature (e.g., 40 degrees Fahrenheit) of the freeze-drying machine at a start of the freeze-drying process. After the liquid coffee concentrate freezes, the mold may be removed 428 from the refrigeration unit. The frozen liquid coffee concentrate may also be removed from the cavity 422 of the mold 424, 424a. Freezing the liquid coffee concentrate to a shape and placing the frozen liquid coffee concentrate in a corresponding shaped cavity of a tray 432 helps to maintain the shape of the formed liquid coffee product 420 when the product is processed in the freeze dryer.

When the liquid coffee concentrate was being frozen in the refrigeration unit, the mold 424, 424a encapsulated the entire frozen liquid coffee concentrate. However, in order to prepare the frozen liquid coffee concentrate for freeze-drying in the freeze-drying machine 426, the frozen coffee may now be placed 430 on a tray 432 so that entire frozen coffee is not entirely covered by the mold 424, 424a but exposed to air. The tray 432 is now placed 431 in the freeze-drying machine 426. At the start of the freeze-drying process of the freeze-drying machine, the freeze-drying machine may receive the frozen liquid coffee concentrate in a cavity which has been brought down to about 40 degrees Fahrenheit. The freeze-drying process may heat and freeze the frozen liquid coffee concentrate. The length of time for freeze-drying the frozen coffee may be adjusted so that the formed soluble coffee product forms an outer crust which is harder than an interior of the formed soluble coffee product. For example, for a freeze dryer sold under the brand HARVESTRIGHT, the freeze-drying process may be set to nine (9) hours to form the harden outer crust which is harder than the interior portion. This is for a 1-inch spherical ball of liquid coffee concentrate sold under the brand FOLGERS 100% COLUMBIAN.

The hard-outer crust makes the formed soluble coffee more durable for transportation and handling by the end user. After freeze-drying the frozen coffee, the freeze-dried coffee is now removed 434 from the freeze-drying machine 426. After the freeze-dried coffee is removed 434 from the freeze-drying machine 426, an exterior surface of the freeze-dried coffee may be coated 436 with a thin layer of dissolvable, edible layer.

Figure 23:
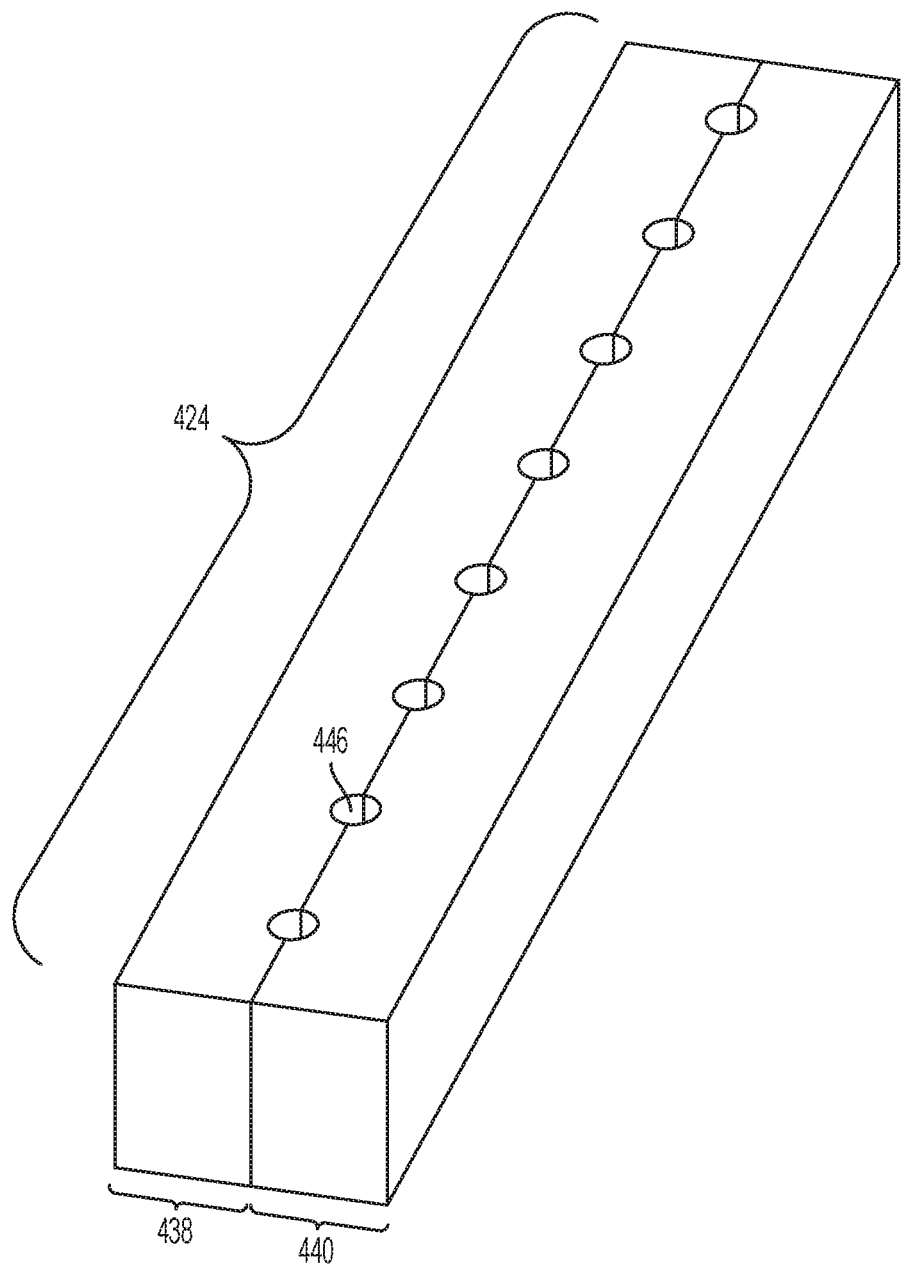
FIG. 23 is a perspective view of a first embodiment of a mold having cavities that give shape to the formed soluble coffee product.
Figure 24:
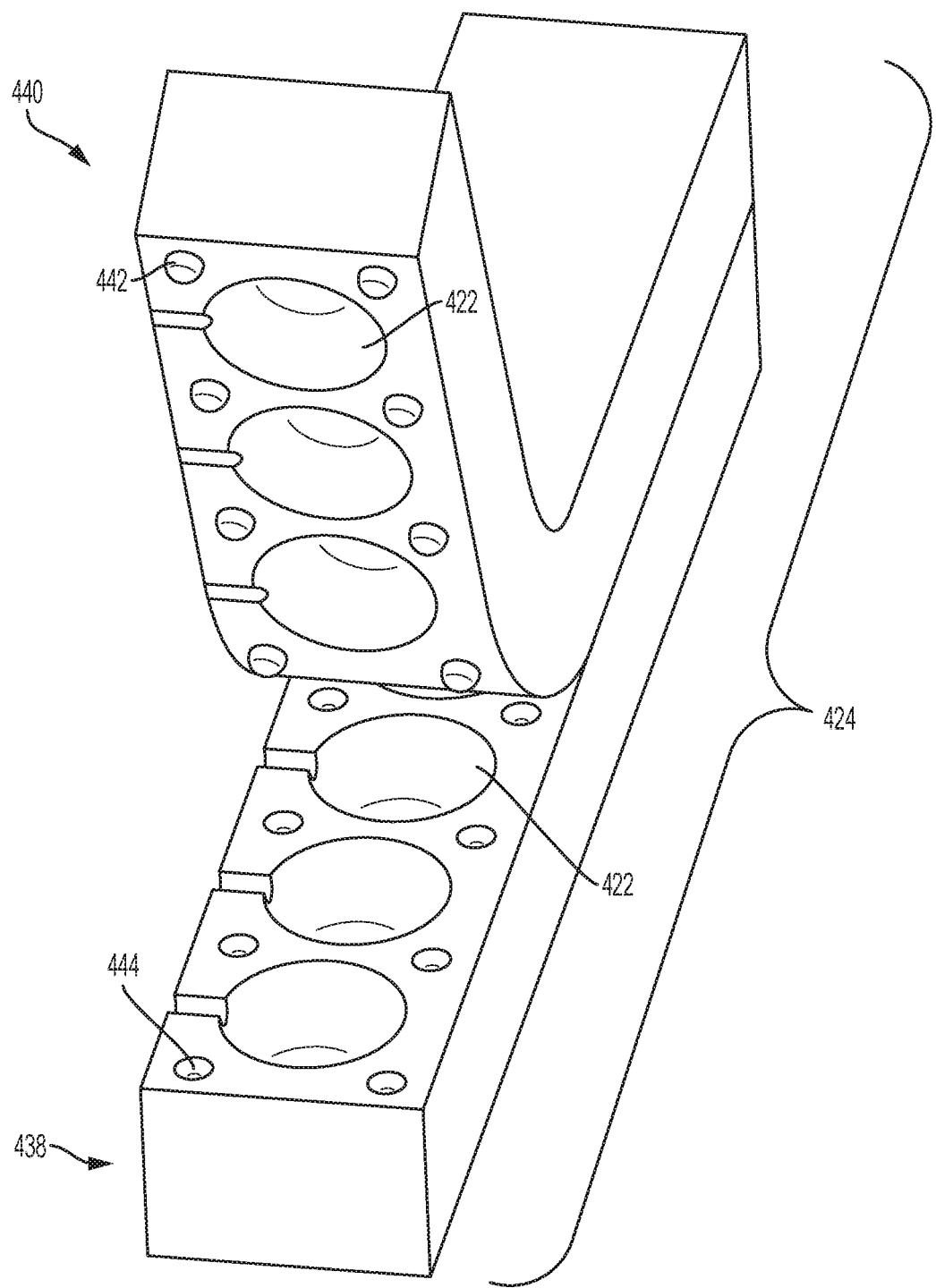
FIG. 24 illustrates the first embodiment of the mold and it being flexible to remove or attach two halves of the first embodiment of the mold.
Figure 25:
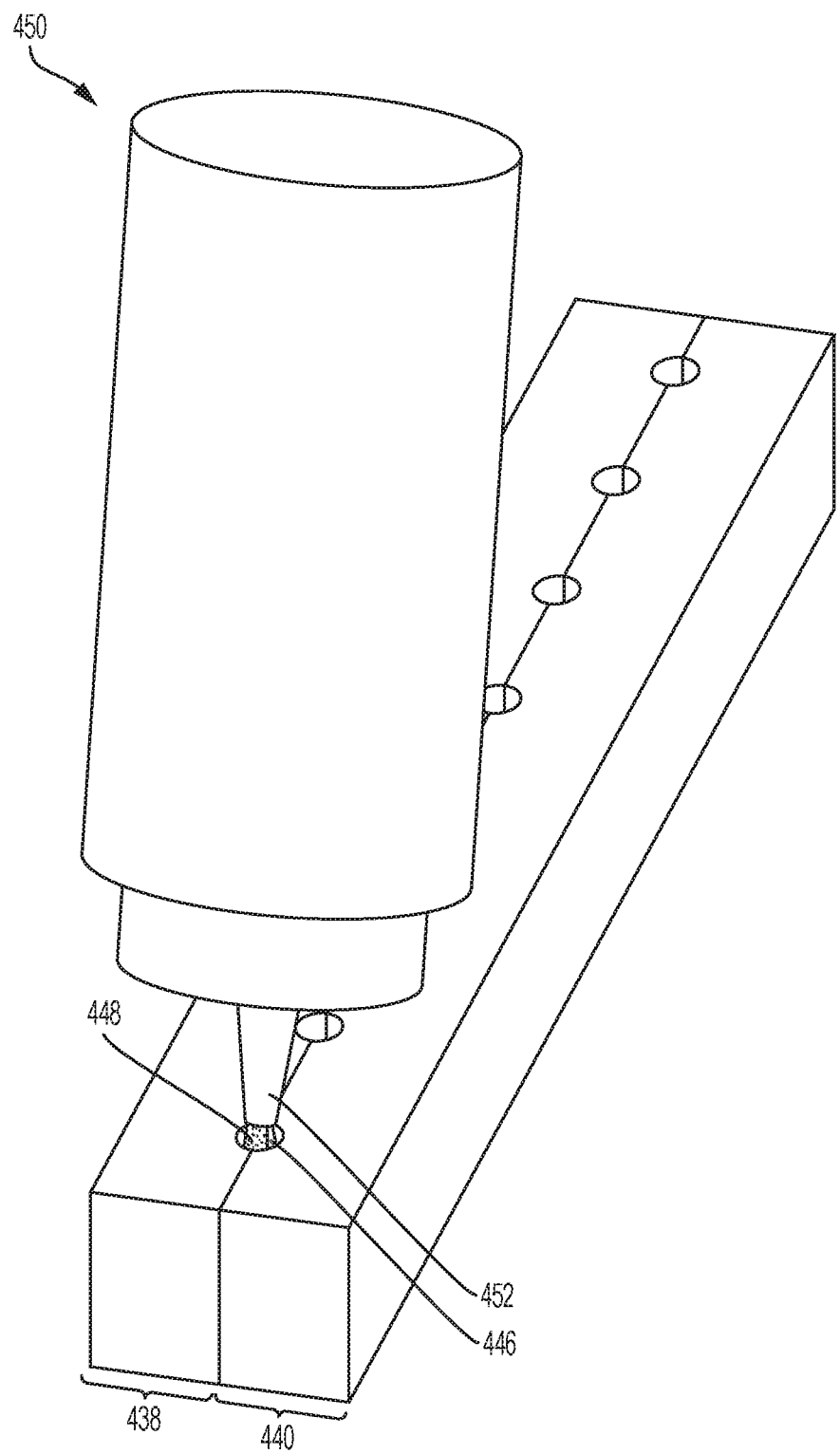
FIG. 25 illustrates a step of filling cavities of the mold shown in FIG. 23.

Referring now to FIG. 23, the mold 424 is shown. The mold 424 may be fabricated from a silicone material so that it is bendable and flexible, as shown in FIG. 24. The silicone mold 424 may have a plurality of cavities 422. The mold 424 may have a first and second halves 438, 440. Each of the first and second halves may have the plurality of cavities 422. The plurality of cavities 422 in the first half 438 may match up with the plurality of cavities 422 in the second half 440 to form a solid. The cavities 422 of the first and second halves 438, 440 may be any shape such as spherical, cube, pyramid, heart, bunny shape, smiley face, etc. More particularly, when the first and second halves 438, 440 are attached to each other as shown in FIG. 23, the cavities 422 in the first and second halves 438, 440 matches up with each other and form a solid object. The cavities 422 may have any shape desired by the manufacturer. For example, the cavities 422 in the first and second halves are semi-spherical so as to form a spherical frozen coffee product. However, other shapes are also contemplated such as cube, pyramidal, egg shaped, heart shaped, etc. The cavities 422 may have any shape in order to form any shape of freeze-dried coffee. The formed soluble coffee product 420 may be solid and formed in the shape of the cavities 422. In the example shown in FIGS. 22-33, the shape is spherical.

The mold 424 may have a different configuration. By way of example and not limitation, referring now to FIG. 27, the mold 424a is shown. The mold 424a may have first and second halves 438a, 440a. The first and second halves 438A, 440A may have or may each have a plurality of cavities 422A, which made up to form the shape of the frozen coffee or freeze-dried coffee product. The mold 424A may be fabricated from a rigid material such as a plastic material that could withstand low temperatures. Referring back to FIGS. 23-25, the first and second halves 438, 440 may be attached to each other as shown in FIG. 23.

In order to attach the first and second halves 438, 440 to each other, each of the halves 438, 440 may have a mating knobs 442 and holes 444. The plurality of knobs 442 may mate with and engage the receiving holes 444 in the first half 438. Preferably, when the knobs 442 are engaged to the cavities 444, the first and second halves mate with each other and form a generally water tight enclosure, so that when liquid coffee concentrate is placed inside of the mated cavities 422, the liquid coffee concentrate does not spill out and through between the mating surfaces of the first and second halves 438, 440.

Moreover, if a better seal between the mating surfaces of the first and second halves 438, 440 is required, the first and second halves 438, 440 may be coated with a temporary adhesive or sealant so that when the first and second halves 438, 440 are pushed together the adhesive or sealant forms a generally water tight barrier therebetween. Moreover, because the liquid coffee concentrate may have a consistency or viscosity similar to that of molasses, the liquid coffee concentrate may not seep between the surfaces of the first and second halves 438, 440 as easily as water. Also, the liquid coffee concentrate may be flash frozen so that the liquid coffee concentrate hardens or freezes in the refrigeration unit before the liquid coffee concentrate can seep through between the mating surfaces of the first and second halves 438, 440. It is also contemplated that in lieu of or in addition to the temporary adhesive or on the mating surfaces, the sealant or adhesive may be placed at the outer periphery of the mold at the joint of the mating surfaces so that the liquid coffee concentrate does not seep out of the mold 424, 424a.

Once the first and second halves 438, 440 are engaged to each other as shown in FIG. 23, the mold 424 is positioned so that an aperture 446 formed by the first and second halves 438, 440 is disposed on the top side of the mated first and second halves 438, 400. The aperture 446 may be utilized to pour the liquid coffee concentrate 448 into the mating cavities 422 in the first and second halves 438, 440. By way of examples and not limitation, the liquid coffee concentrate may be disposed within a squeeze bottle 450 (see FIG. 25). A nozzle 452 may be placed adjacent to the aperture 446, and the liquid coffee concentrate may be squeezed into the aperture 446 to fill the mating cavities 422. Once the mating cavities 422 is filled, the user then fills the next mating cavities 422 until the entire mold 424 is filled with the liquid coffee concentrate. The same process may also be used in relation to the mold 424A shown in FIG. 27.

Figure 26:
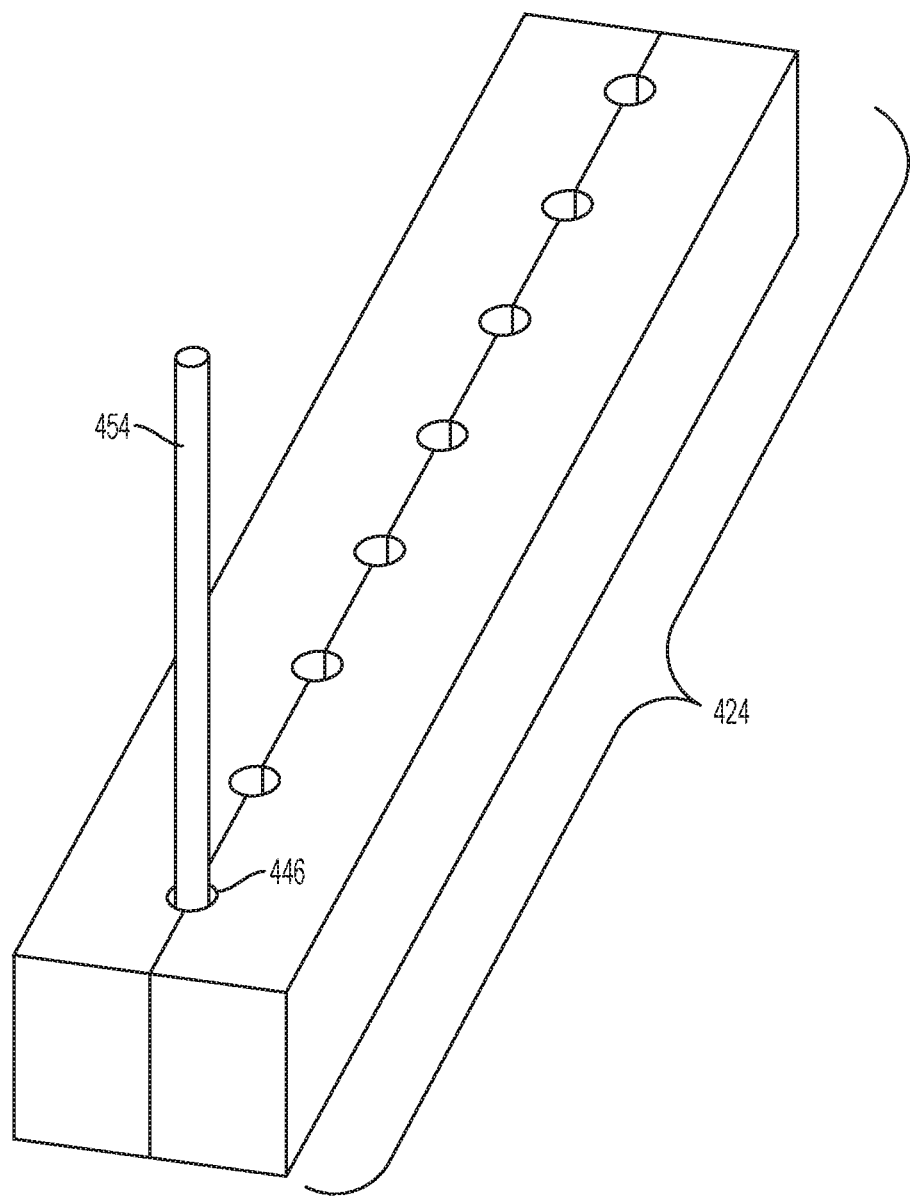
FIG. 26 illustrates a step of inserting a stick into the liquid coffee concentrate in the mold shown in FIG. 25.
Figure 27:
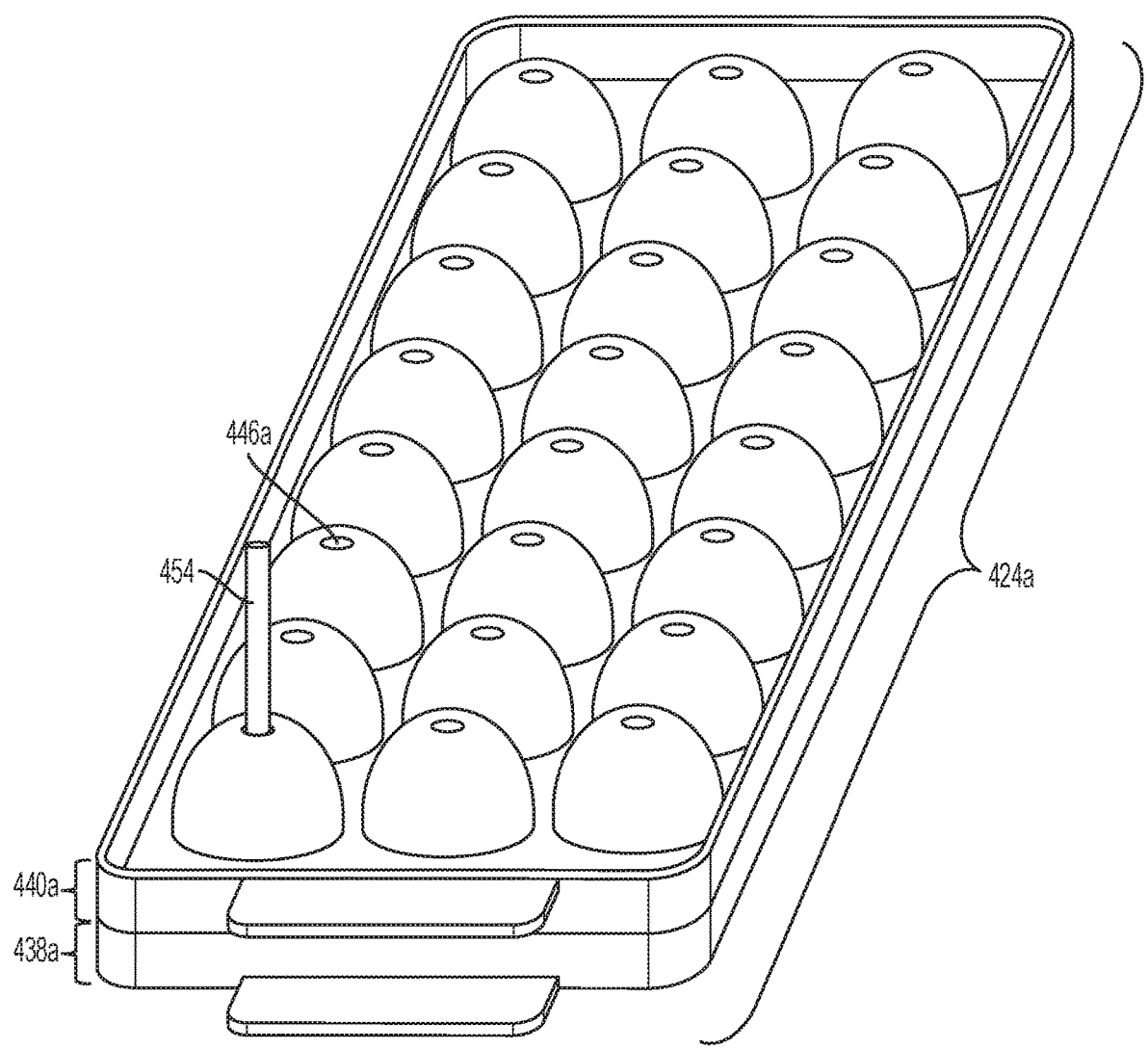
FIG. 27 is a perspective view of a second embodiment of the mold having cavities that give shape to the formed soluble coffee product.
Figure 28:
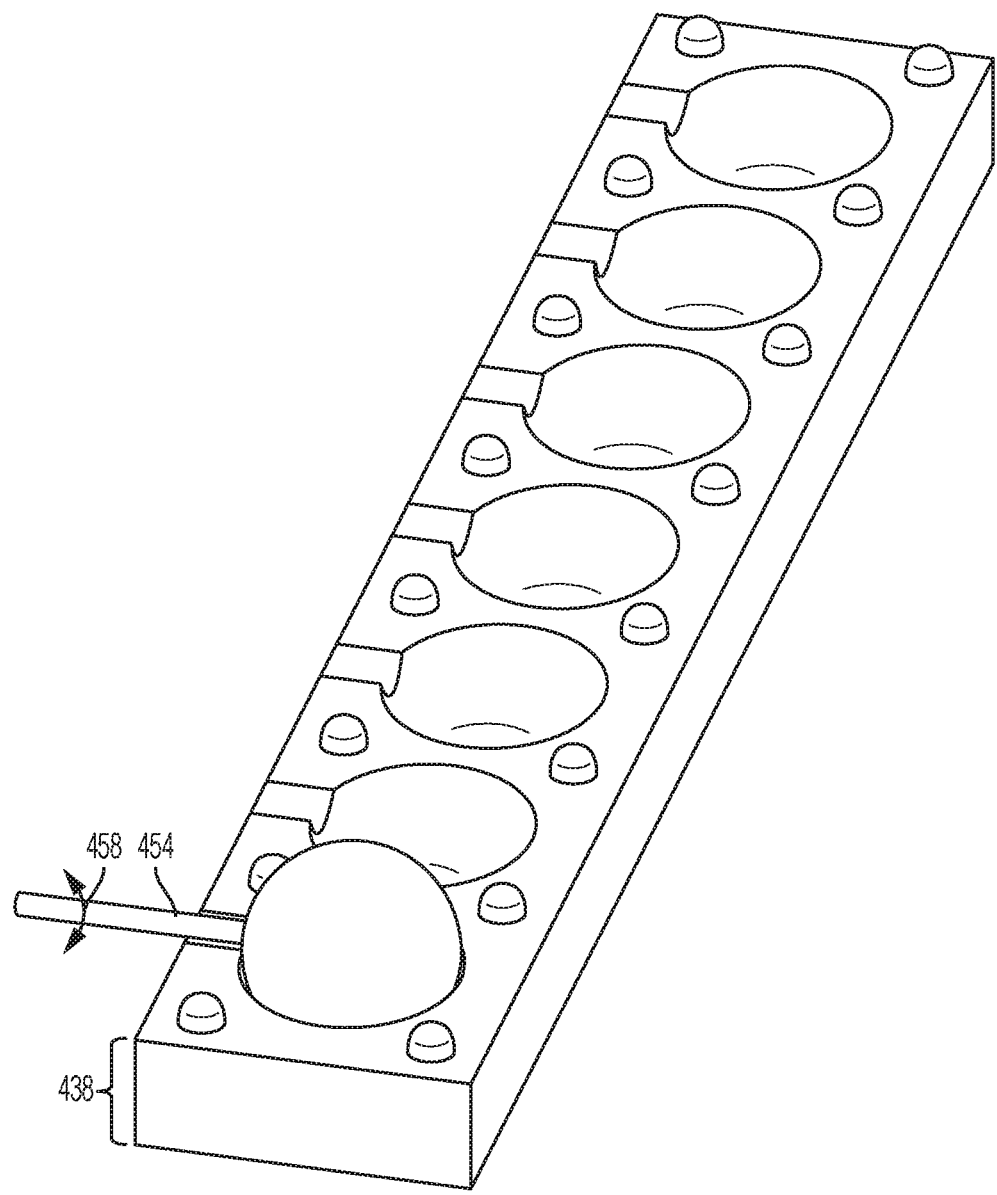
FIG. 28 illustrates a frozen liquid coffee concentrate before freeze drying and after removal of a part of the mold shown in FIG. 23.

Referring now to FIG. 26, an optional stick 454 may be placed into the aperture 446, 446a with a distill end portion of the stick 454 being inserted into the liquid coffee concentrate disposed within the mating cavities 422. The stick 454 may be between about one inch and 10 inches, and if preferably about four inches. The distill end portion of the stick 454 may also have a roughened exterior surface 456 so that the freeze-dried coffee product does not slip off of the stick 454 after the freeze-drying process, and while the user manipulates the freeze-dried coffee product during use.

Figure 32:
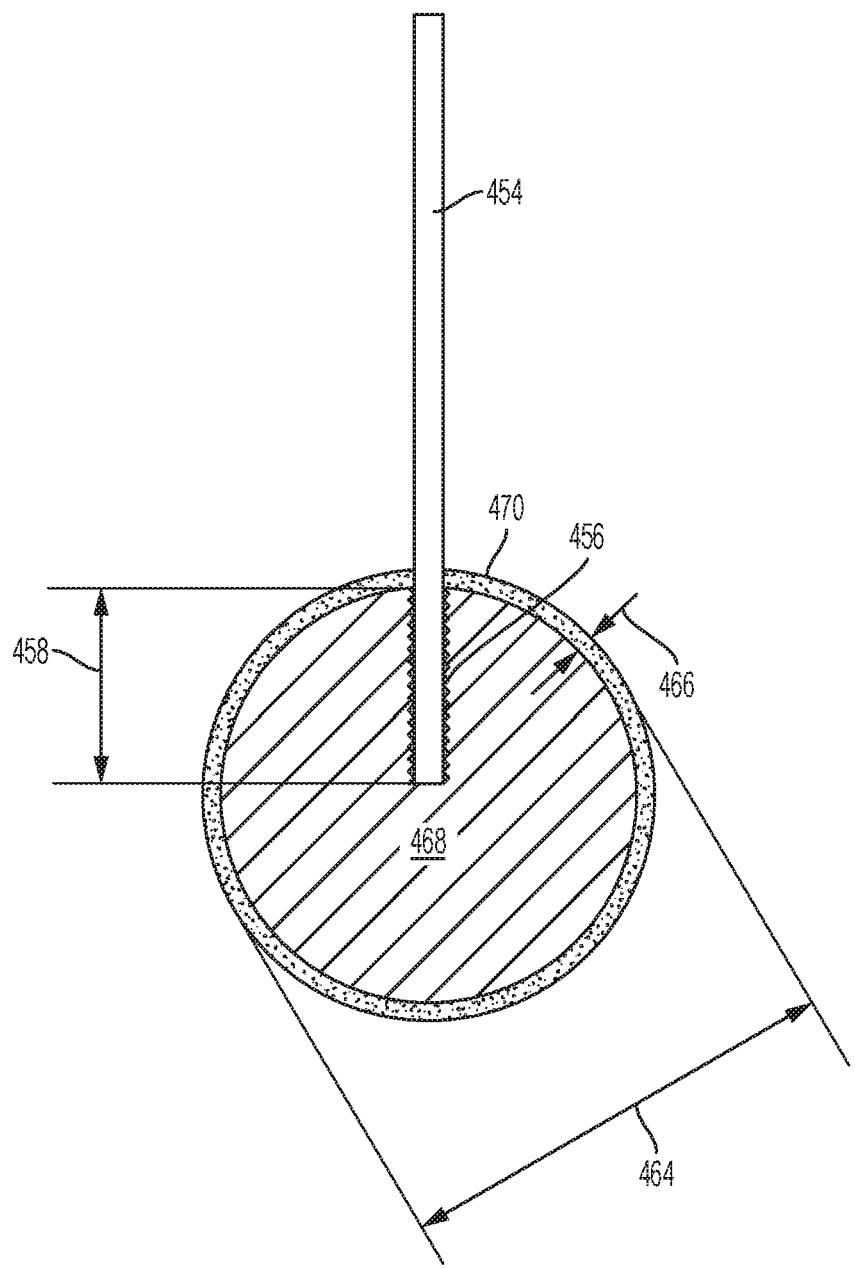
FIG. 32 illustrates a cross sectional view of a freeze dried formed soluble coffee product after it has been frozen and freeze dried.

The distill end portion 458 of the stick 454 may be roughened as shown in FIG. 32, but it is also contemplated that the distill end portion 458 may be cavitated so that the liquid coffee concentrate is locked inside of the cavitation to prevent the freeze-dried coffee product from falling off of the stick 454 during use and before the freeze-dried coffee product is being dissolved in hot water. Other configurations are also contemplated for the distal end portion 458 of the stick 454 such as an enlarged distill end portion (e.g., bulbous configuration, ball). These other configurations would also mitigate the freeze-dried coffee product from falling off of the stick 454. The stick 454 may be placed in each of the apertures 446 in the mold 424. Optionally, it is not necessary for the stick 454 to be used. If it is not used, then the freeze-dried coffee product would be handled by hand, spoon or dropped in hot water then stirred with a spoon or fork in lieu of the stick 454.

At this point, the mold 424, 424a, liquid coffee concentrate and the stick 454 are set up to be placed within the refrigeration unit to freeze the liquid coffee concentrate. The mold, 424, liquid coffee concentrate disposed within the cavities 422 of the mold 424 and the stick 454 are placed in the refrigeration unit to begin the freezing process of the liquid coffee concentrate. Preferably, the liquid coffee concentrate is brought to a freezing temperate as fast as possible. Typically, if the refrigeration is set to between zero degrees Fahrenheit and 32 degrees Fahrenheit (preferably 6 degrees Fahrenheit), it may take the liquid coffee concentrate about four hours to go from a liquid state at room temperature (e.g., 80 F) to a frozen state.

The mold 424, 424a with the liquid coffee concentrate may be left in the freezer for about four hours. Thereafter, the mold 424, 424a is removed from the refrigeration unit. The second half 440 of the mold 424, 424a is removed from the first half 438 of the mold 424, 424a. The frozen liquid coffee concentrate may be slightly stuck to the inner surfaces of the cavities 422 of the mold 438, 440. Removing the first half 438 from the second half 440 will detach the frozen liquid coffee concentrate from one of the halves 438, 440. At this point, the user may grab the stick 454 and twist the stick 454 in the direction of the arrow 458. By twisting the stick 458, the frozen liquid coffee concentrate is detached from the inner surface of the cavity 422 of the other half 438, 440 of the mold 424.

Figure 29:
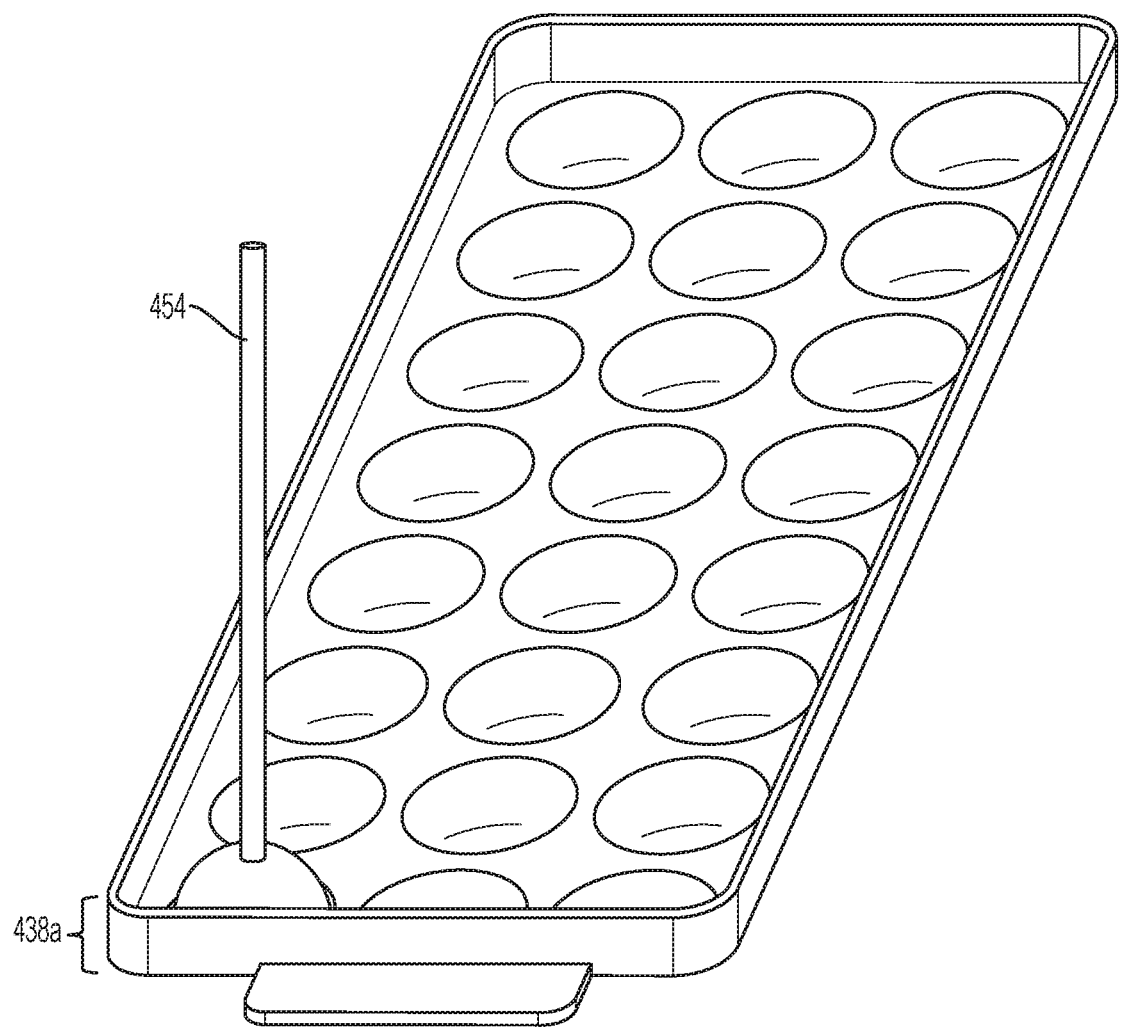
FIG. 29 illustrates a frozen liquid coffee concentrate before freeze drying and after removal of a part of the mold shown in FIG. 27.

The same is true with the mold 424a is used. Referring to FIG. 29, when the second half 440a is removed from the first half 438a, the sticks 454 are pointing straight up. The user grips the stick 454 and rotates the stick 454 to detach the liquid coffee product from the surface of the first half 438a of the tray to the tray mold of 424a.

Figure 30:
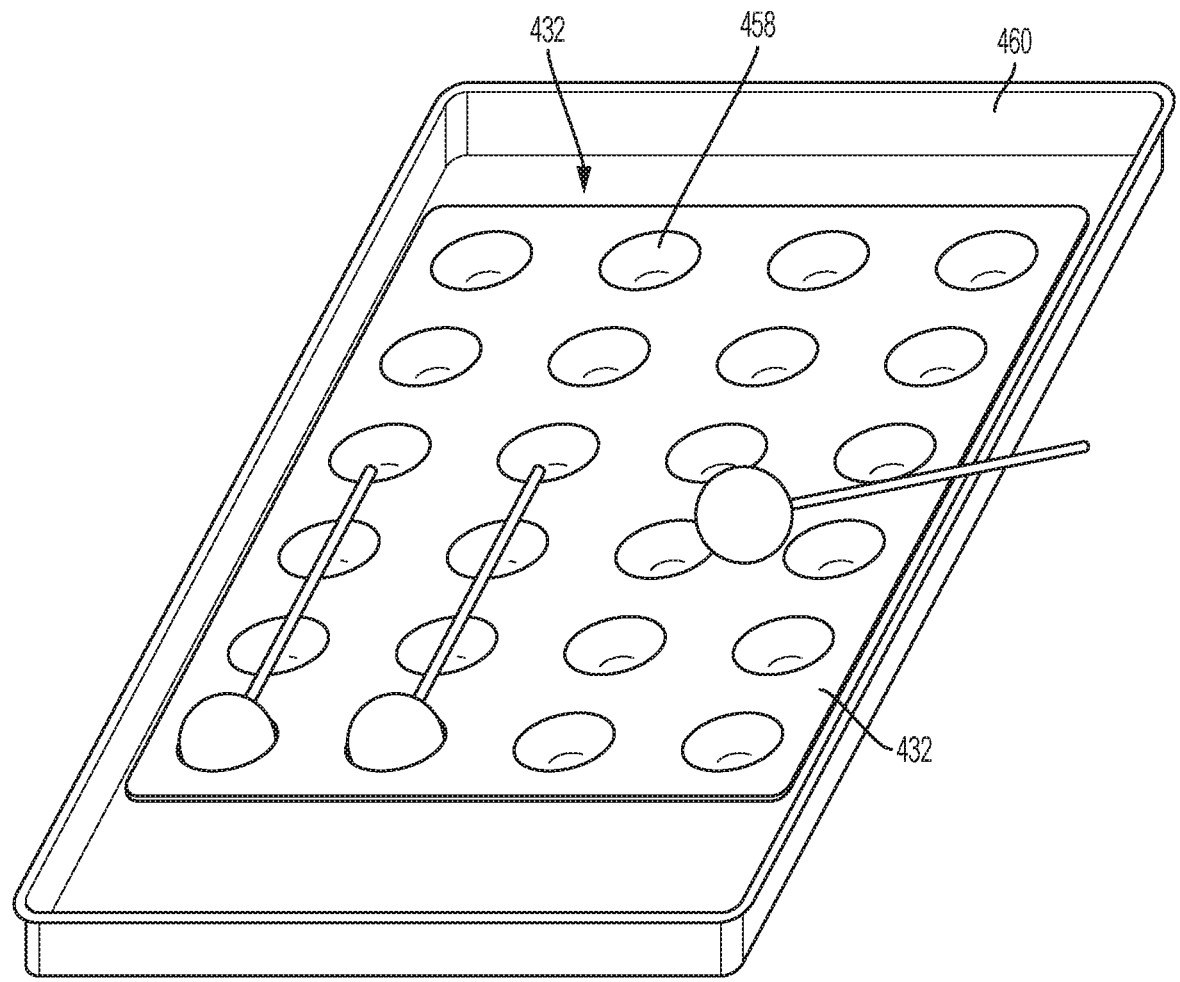
FIG. 30 illustrates a plurality of frozen liquid coffee concentrate laid in a silicone tray having cavities that correspond to the shape of the frozen liquid coffee concentrate.
Figure 31:
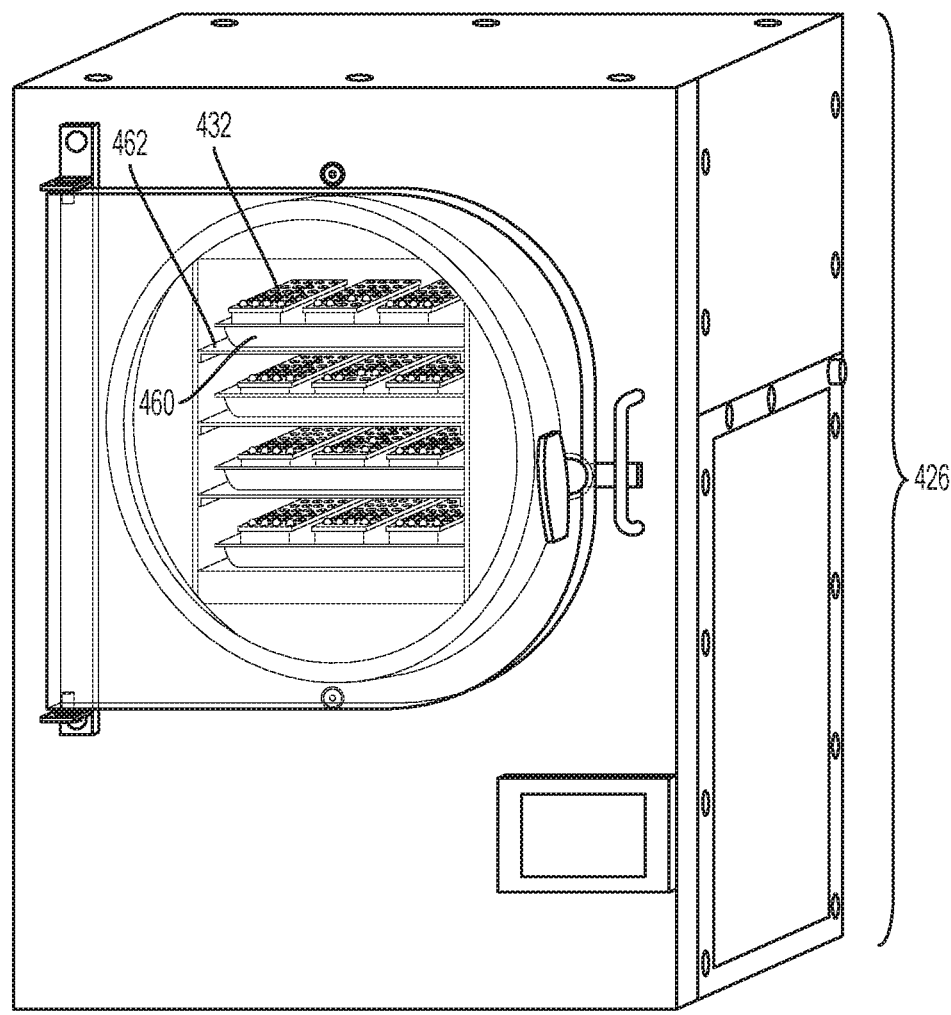
FIG. 31 illustrates a freeze drying machine for freeze drying the plurality of frozen liquid coffee concentrate.

Referring now to FIG. 30, a low temperature silicone tray 432 is shown. The low temperate silicone mold or tray 432 may be able to withstand the low temperatures experienced or imposed upon it by the freeze-drying machine 426. The tray 432 may have a plurality of cavities 458. These cavities 458 may correspond to an outer configuration of the frozen coffee product so that as the frozen coffee product goes through the freeze-drying process, the shape of the frozen coffee product is retained. By way of example and not limitation, the frozen coffee product shown in FIG. 30 has a spherical configuration of a certain diameter. The cavities 458 may have a semi-spherical configuration having a diameter equal to the certain diameter of the frozen coffee product. Beneficially, because the frozen coffee product has been removed from its original mold 424, 424A, the surface of the frozen coffee product can now out-gas the liquid within the frozen coffee product during the freeze-drying process in the freeze-drying machine. Moreover, the tray 432 is not covered so that at least half of the frozen coffee product may be exposed to the air within the freeze-drying machine during the freeze-drying process to help with the out gassing of the liquid in the frozen freeze-drying process.

The process of removing the frozen liquid coffee concentrate from the mold 424, 424a and placing them onto the tray 32 and placing the tray with the frozen liquid coffee concentrate into the freeze-drying machine is time sensitive because when the mold 424, 424a is removed from the refrigeration unit, the frozen liquid coffee concentrate will heat up and tend to melt. As such, the entire process after removable of the mold to inserting the frozen liquid coffee concentrate into the freeze-drying machine must be accomplished before the frozen liquid coffee concentrate melts too much so that the shape has excessively degraded. The tray 432 may be placed on a metallic or rigid member 460, which is used to support the flexible silicone tray 432 during transport from outside of the freeze-drying machine 426 to one of the levels or supports in the freeze-drying machine 426. The frozen liquid coffee concentrate and the tray 432 are now placed 431 into the freeze-drying machine 426. The door of the freeze-drying machine is opened. The rigid member 460 holding the tray 432 is now placed onto the support 462 of the freeze-drying machine 426.

The freeze-drying machine is now placed into its cycle and allowed to run through its freeze-drying process until the frozen coffee product is now freeze-dried. Preferably, the process is allowed to run until the frozen liquid coffee concentrate has the structure shown in FIG. 32. In particular, the liquid coffee or freeze-dried coffee product may have an overall outer diameter 464 of about one inch. The freeze-drying process may form a crust at the outer peripheral portion 466. The thickness of the crust portion 466 may be about 0.005 of an inch thick to about $\frac{3}{16}$ths of an inch. For example, the length of time is preferably about 9 hours for a freeze dryer machine sold under the brand HARVEST-RIGHT and the liquid coffee concentrate is FOLGERS 100% Columbian. The freeze dryer removes the moisture but preferably leaves the coffee oil in the formed soluble coffee product 420. More preferably, the freeze-drying time is set so that the oil of the liquid coffee concentrate is disposed or trapped in the outer peripheral portion or crust of the formed soluble coffee product.

By way of exampling not limitation, after the freeze drying process has run its full nine (9) hour course, the freeze dried soluble coffee product 420 may be left in the freeze drying machine 426 about one hour to six hours more so that moisture in the freeze drying machine may be reabsorbed into the outer peripheral portion or crust of the formed soluble coffee product 420 to help form the crust and also to help retain the oil of the coffee in the outer peripheral portion of the formed soluble coffee product.

The hardness of the outer peripheral portion or crust may be greater than the hardness of its interior portion 468. Preferably, the outer peripheral portion can withstand a pressure of about $\frac{1}{16}$th of a pound to one pound. For example, if a freeze-dried coffee product (as shown in FIG. 32) is placed on the table, a bar weighing $\frac{1}{16}$th of a pound weight can be placed on the freeze-dried coffee product without crushing the freeze-dried coffee product.

The transition between the outer peripheral portion having a greater hardness than that of the interior portion 468 may not be a specific defined line but may be a gradation. In this instance, the outer peripheral portion 466 is measured by the outer surface 470 of the outer peripheral portion to one half way between the gradation of the hardness levels between the outer peripheral portion 466 and the interior portion 468. For example, if the crust had a hardness level of 9 and the interior portion 468 has a hardness level of 5, then the thickness of the outer peripheral portion 466 is defined as the thickness from the outer surface 470 to a place in the freeze-dried coffee product having a hardness of 7.

The size of the coffee ball (i.e., formed soluble coffee product) shown in the figures is about 1 inch in diameter. However, the size of the coffee ball may be between about 0.5 inch to 2 inches and preferably about 0.75 inch to 1.5 inch.

After freeze drying the formed soluble coffee product 420, optionally, the exterior surface of the formed soluble coffee product 420 may be coated with a layer or coating of cellulose gum. The cellulose gum may have a consistency of that of molasses and in order to reduce the viscosity to the appropriate level, an edible alcohol may be added to the cellulose gum. The cellulose gum maybe atomized into the air (i.e., sprayed as a mist) and the formed soluble coffee products 420 which has been freeze dried may be hung on a conveyor chain and passed through the atomized cellulose gum in order to coat or form a layer over the exterior of the formed soluble coffee product 420. Although the coating may be cellulose gum, it is also contemplated that the coating may be pullulan, pectin, starch, polyvinyl acetate, sodium alginate or combinations thereof including a combination of cellulose and anyone of the other listed materials.

Other methods of forming the thin layer of cellulose gum on the exterior surface of the formed soluble coffee product 420 are also contemplated. By way of example not limitation, the formed soluble coffee product 420 may be dipped in a container of liquid cellulose gum that has been mixed with an edible alcohol to bring down the viscosity of the cellulose gum to a proper level, in order to form a thin layer of cellulose gum. The layer of cellulose gum being coated or formed over the formed soluble coffee product 420 may have a thickness of 0.001 inch to 0.010 inch. Although the material in which the product 420 is dipped in is described as a cellulose gum, the material in which the product 420 is dipped in may be pullulan, pectin, starch, polyvinyl acetate, sodium alginate or combinations thereof including a combination of cellulose and anyone of the other listed materials.

Figure 33:
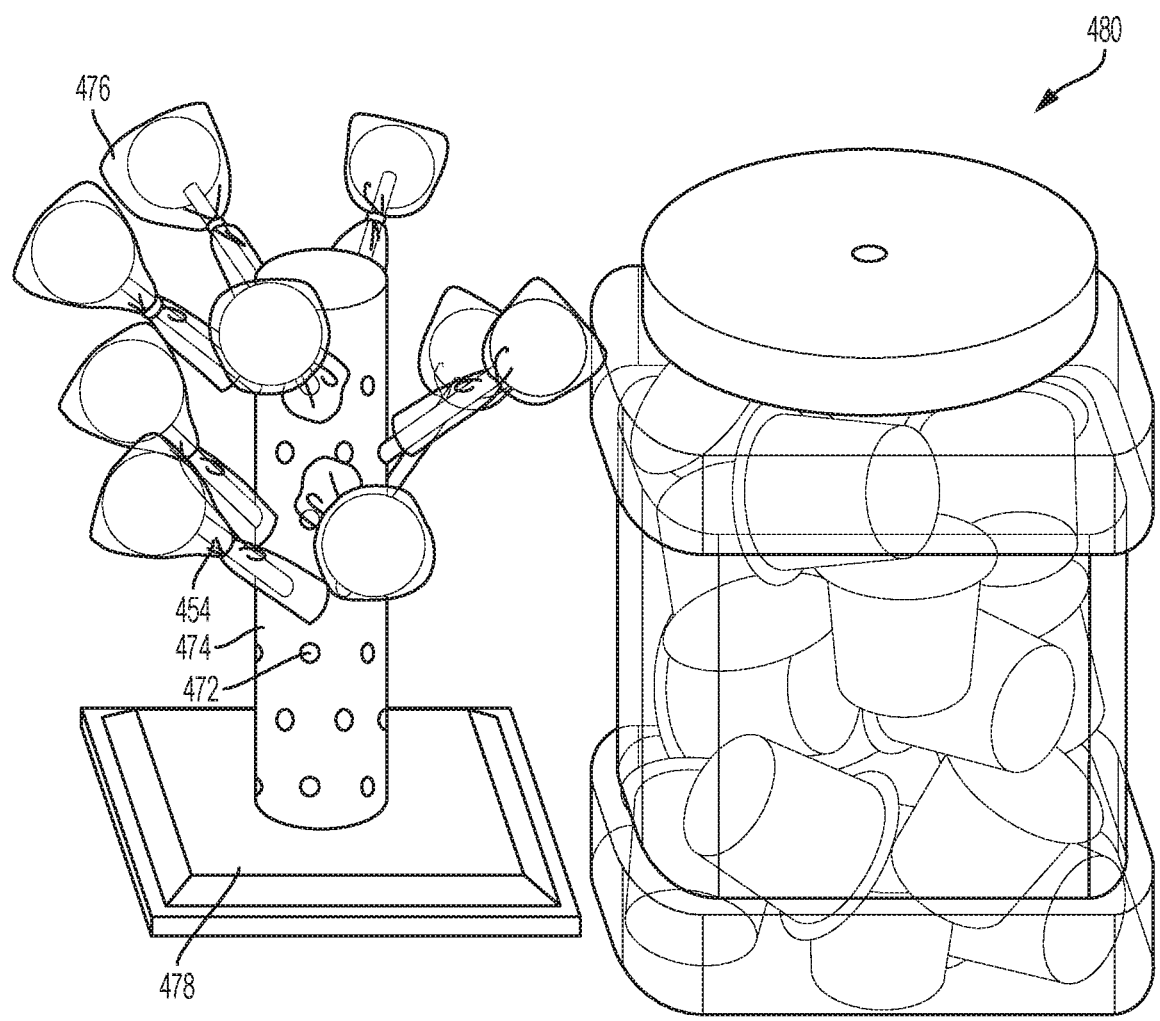
FIG. 33 illustrates a size comparison between freeze dried formed soluble coffee product on a stick and a plurality of coffee pods for a single serve coffee machine (e.g., Keurig)
Figure 34:
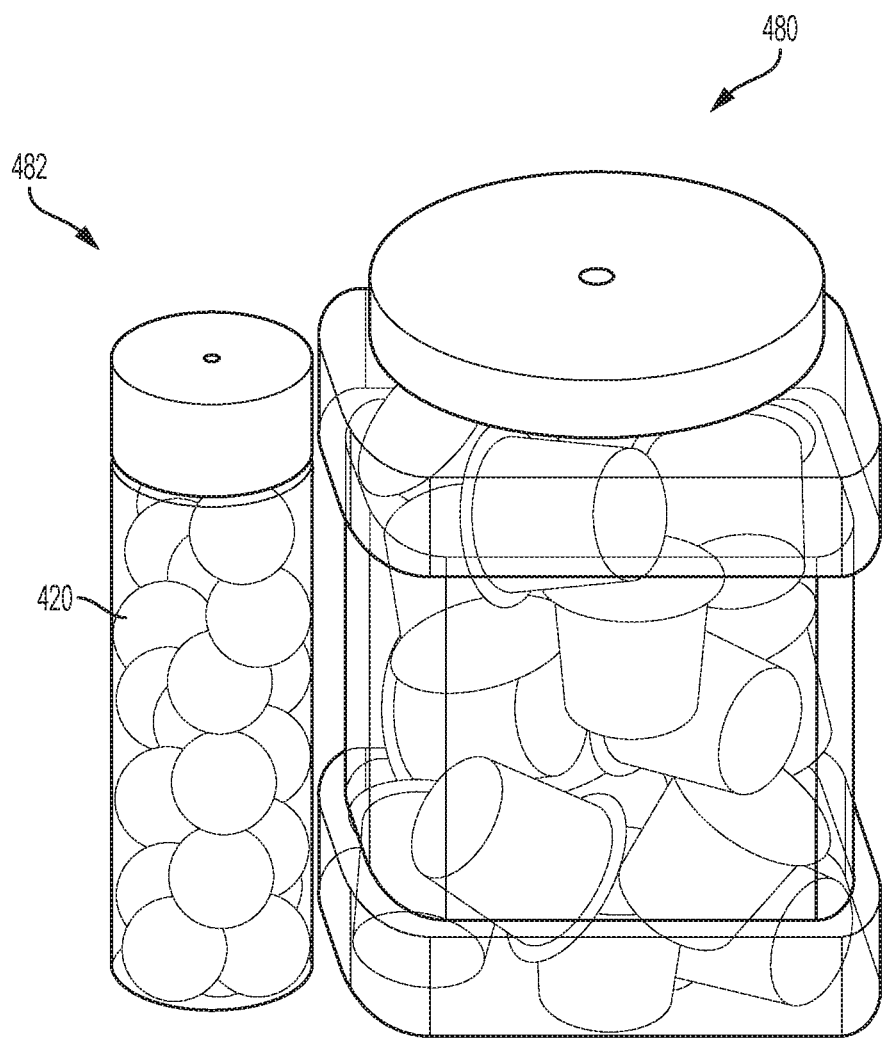
FIG. 34 illustrates a size comparison between freeze dried formed soluble coffee product without the stick and a plurality of coffee pods for a single serve coffee machine (e.g., Keurig).

Referring now to FIGS. 33 and 34, FIG. 33 illustrates the formed soluble coffee product 420 which has a stick 544 placed in a post 474 having a plurality of holes 472. The sticks 454 of the formed soluble coffee product 420 may be placed in the holes 472 so that the formed soluble coffee products 420 extend outwardly from the post 474. Each of the formed soluble coffee products may be wrapped with a wrapper 476. The wrapper 476 may protect the formed soluble coffee product 420 from contamination. The post 474 maybe held upright by way of a base 478.

In contrast, a prior art container 480 may have a plurality of prior art coffee pods similar to ones that are used in a traditional single serve coffee machine such as KEURIG machine. Even though the formed soluble product 420 is placed on a post 472, more formed soluble coffee products 420 may be stored in the same volume as that of the container 480. There less waste when using the formed soluble coffee product 420 on a mass market scale when preparing a cup of coffee. The only waste would be the wrapper 476, and the stick 474, which in contrast to the coffee pod, would be significantly less in volume compared to the coffee pod of the prior art single serve coffee machine using a Keurig coffee pod shown in FIG. 33.

Referring now to FIG. 34, a plurality of formed soluble coffee products 420 may be placed in a container 482. The container 482 may be substantially smaller in volume compared to the container 480, but nonetheless may hold an equal number of formed soluble coffee products 420 as the container 480 holds coffee pods for a single serve coffee machine (e.g. Keurig). The formed soluble coffee product shown in FIG. 34 does not have a wrapper 476 and does not have a stick 454. This means that there is even less waste when using the formed soluble coffee products 420 shown in FIG. 34.

The formed soluble coffee product 420 may be provided with a stick 454 and wrapper 476 as shown in FIG. 33 or without as shown in FIG. 34. The formed soluble coffee product 420 on a stick 454 may be shipped as shown in FIG. 33 or may be boxed up side by side so that formed soluble coffee products 420 are laid adjacent to each other in the box. Fortunately, the hard crust or outer peripheral portion of the formed soluble coffee product 420 mitigates breaking of the formed soluble coffee product 420 during shipping. Moreover, the wrapper 476 that surrounds the formed soluble coffee product 420 also acts as cushion to protect the formed soluble coffee product 420 from rupturing or any damage because of vibration or other hard impact during shipment, storage and handling by the consumer.

To prepare a cup of coffee, the user may remove the formed soluble coffee product 420 from the post 474 or from the box, unwrap or remove the wrapper 476, and while gripping the stick 454 submerse the formed soluble coffee product 420 in a cup of water, and more preferably a hot cup of water. The formed soluble coffee product is a quick dissolve so that once the formed soluble coffee product 420 is submersed in hot water, it will dissolve within seconds. The user may then use the stick 454 to mix the coffee completely, and also use the stick 454 to mix any cream or sugar that might be added to the prepared coffee.

Referring now to FIG. 34, to prepare a cup of coffee, the user may unscrew the cap from the container 482 and remove one ball 420 of the formed soluble coffee product from the container 482. The formed soluble coffee product 420 may be dropped into a cup of water, preferably a hot cup of water. The user may then use a spoon or other stirring instrument to mix the dissolved formed soluble coffee product in the water.

The container has been described as a food grade paper container. However, containers fabricated from other types of materials are also contemplated. By way of example and not limitation, the container may be fabricated from a plastic material, synthetic material or combinations thereof. Food grade paper container may include paper used in milk cartons.

The detailed description set forth above in connection with the appended drawings is intended as a description of the several presently contemplated embodiments of these systems and methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of fabricating a dissolvable coffee, the method comprising the steps of:
providing a mold having a cavity, the cavity having an interior surface which forms a shape of the dissolvable coffee;
filling a liquid coffee concentrate in the cavity of the mold;
placing the liquid coffee concentrate which was filled in the mold in a freezer to freeze the liquid coffee concentrate from a liquid state in the mold to form a formed and completely frozen liquid coffee concentrate to a solid state in the mold;
removing the mold from the freezer;
placing the formed frozen liquid coffee concentrate in a chamber of a freeze drying machine for a prescribed period of time by a freeze dryer machine manufacturer to freeze dry the formed frozen liquid coffee concentrate;
turning off the freeze drying machine;
while the freeze drying machine is turned off, leaving the freeze-dried coffee concentrate in the chamber of the freeze drying machine between about one to six hours after a freezing drying process has run its full course so that an outer peripheral portion of the freeze dried coffee has a hardness greater than a hardness of an interior portion of the freeze dried coffee.

2. The method of claim 1 wherein the step of providing the mold, the mold having at least two halves with each half having a cavity portion and mating cavity portions define the cavity.

3. The method of claim 1 further comprising a step of freezing the liquid coffee concentrate to 6 degrees Fahrenheit.

4. The method of claim 1 further comprising the steps of:
removing the frozen liquid coffee concentrate from the mold;
placing the frozen liquid coffee concentrate in the freeze drying machine; and
retaining a shape of the shaped and frozen liquid coffee concentrate to the shape of the interior surface of the cavity.

5. The method of claim 1 placing the formed frozen liquid coffee concentrate on a tray having a plurality of indentations corresponding to the shape of the frozen liquid coffee concentrate to retain the shape of the frozen liquid coffee concentrate.

6. The method of claim 5 further comprising the step of transferring the frozen liquid coffee concentrate from the mold to the tray before the frozen liquid coffee concentrate melts by 5% by volume.

7. The method of claim 1 further comprising a step of forming a protective edible layer on an exterior surface of the freeze dried coffee.

8. The method of claim 7 wherein the forming the protective edible layer includes a step of atomizing a cellulose gum, polyvinyl acetate or a combination thereof and passing the freeze dried coffee through a mist formed by the atomized cellulose gum, polyvinyl acetate, liquid coffee or the combination thereof.

9. The method of claim 7 wherein the forming the protective edible layer includes a step of forming a layer of cellulose gum, polyvinyl acetate or a combination thereof on an exterior surface of the freeze dried coffee.

10. The method of claim 7 wherein the layer is less than 0.010 inches thick.

11. The method of claim 1 wherein the freeze dried coffee is spherical and has a diameter between 1.5 inch and 0.75 inch.

12. The method of claim 1 wherein the freeze drying step traps oil in the outer peripheral portion of the freeze dried coffee.

* * * * *